United States Patent
Fujiwara et al.

(10) Patent No.: US 12,015,361 B2
(45) Date of Patent: Jun. 18, 2024

(54) MOTOR CONTROL DEVICE

(71) Applicants: Mitsubishi Electric Corporation, Tokyo (JP); JAPAN AEROSPACE EXPLORATION AGENCY, Tokyo (JP)

(72) Inventors: Kenji Fujiwara, Tokyo (JP); Hisatoshi Fukumoto, Tokyo (JP); Tomoki Takegami, Tokyo (JP); Tetsuya Kojima, Tokyo (JP); Akihiko Iwata, Tokyo (JP); Masahiro Sugahara, Tokyo (JP); Hiroshi Kobayashi, Tokyo (JP); Mari Nishiyama, Tokyo (JP); Akira Nishizawa, Tokyo (JP)

(73) Assignees: MITSUBISHI ELECTRIC CORPORATION, Tokyo (JP); JAPAN AEROSPACE EXPLORATION AGENCY, Tokyo (JP)

( * ) Notice: Subject to any disclaimer, the term of this patent is extended or adjusted under 35 U.S.C. 154(b) by 185 days.

(21) Appl. No.: 17/796,682

(22) PCT Filed: Mar. 4, 2020

(86) PCT No.: PCT/JP2020/009044
§ 371 (c)(1),
(2) Date: Aug. 1, 2022

(87) PCT Pub. No.: WO2021/176580
PCT Pub. Date: Sep. 10, 2021

(65) Prior Publication Data
US 2023/0057522 A1 Feb. 23, 2023

(51) Int. Cl.
*H02P 27/06* (2006.01)
*B60L 50/52* (2019.01)
(Continued)

(52) U.S. Cl.
CPC .............. *H02P 27/06* (2013.01); *B60L 50/52* (2019.02); *H02K 11/33* (2016.01); *H02M 3/158* (2013.01); *H02M 7/537* (2013.01); *B60L 2200/10* (2013.01)

(58) Field of Classification Search
CPC ......... H02P 27/06; H02K 11/33; B60L 50/52; B60L 2200/10; H02M 3/158; H02M 7/537
(Continued)

(56) References Cited

U.S. PATENT DOCUMENTS 9,998,058 B2 6/2018 Takahashi
2014/0197681 A1* 7/2014 Iwashima ............... B60L 53/56
307/9.1
(Continued)

FOREIGN PATENT DOCUMENTS

DE 10 2018 206 213 A1 10/2019
DE 10 2019 005 462 A1 2/2020
(Continued)

OTHER PUBLICATIONS

Anton (DE 102018206213 A)Method For Operating An Inverter, Arrangement With An Inverter And Aircraft With A Converter Date Published Oct. 24, 2019 (Year: 2019).*
(Continued)

*Primary Examiner* — Jorge L Carrasquillo
(74) *Attorney, Agent, or Firm* — XSENSUS LLP

(57) ABSTRACT

A motor control device includes: a step-down device including a DC-output power conversion device having a first mode for outputting first voltage and a second mode for outputting second voltage lower than the first voltage; a power supply device; and a control device, and controls a motor. When a flying object takes off, the control device controls the power conversion device in the first mode.
(Continued)

When the control device judges that flight information which is one or both of information of a motor parameter obtained along with control for the motor and information of an environmental factor relevant to the flight altitude of satisfies a predetermined condition, or when the control device has received an mode signal for which the second mode is selected on the basis of the flight information during control for the motor, the control device controls the power conversion device in the second mode.

15 Claims, 46 Drawing Sheets

(51) Int. Cl.
  *H02K 11/33* (2016.01)
  *H02M 3/158* (2006.01)
  *H02M 7/537* (2006.01)
(58) Field of Classification Search
  USPC .......................................................... 318/801
  See application file for complete search history.

(56) References Cited

U.S. PATENT DOCUMENTS

| | | | |
|---|---|---|---|
| 2015/0183385 A1* | 7/2015 | Iwashima | B60L 53/53 307/9.1 |
| 2017/0201186 A1 | 7/2017 | Yuasa et al. | |
| 2017/0264228 A1 | 9/2017 | Kazuno | |
| 2019/0152617 A1 | 5/2019 | Anton et al. | |
| 2020/0052642 A1 | 2/2020 | Kuroki | |

FOREIGN PATENT DOCUMENTS

| | | |
|---|---|---|
| JP | 2009-247174 A | 10/2009 |
| JP | 2011-188655 A | 9/2011 |
| JP | 2017-50977 A | 3/2017 |
| WO | 2016/035209 A1 | 3/2016 |
| WO | 2017/137537 A1 | 8/2017 |

OTHER PUBLICATIONS

International Search Report and Written Opinion mailed on Jun. 2, 2020, received for PCT Application PCT/JP2020/009044, filed on Mar. 4, 2020, 8 pages including English Translation.

Akturk et al., "Single Event Effects in Si and SiC Power MOSFETs Due to Terrestrial Neutrons", IEEE Transactions on Nuclear Science, vol. 64, No. 1, Jan. 2017, pp. 529-535.

European Search Report issued Apr. 5, 2023 in corresponding European Patent Application No. 20923510.0, 12 pages.

He Jiangbiao et al: "Recent Advances of Power Electronics Applications in More Electric Aircrafts", 2018 AIAA/IEEE Electric Aircraft Technologies Symposium (EATS), AIAA, Jul. 12, 2018 (Jul. 12, 2018), pp. 1-8, XP033460742, [retrieved on Nov. 29, 2018].

Forouzesh Mojtaba et al: "Step-Up DC-DC Converters: A Comprehensive Review of Voltage-Boosting Techniques, Topologies, and Applications", EPO Form 1703 01 .91 TRI IEEE Transactions on Power Electronics, Institute of Electrical and Electronics Engineers, USA, vol. 32, No. 12, Dec. 1, 2017 (Dec. 1, 2017), pp. 9143-9178, XP011658038, ISSN: 0885-8993, DOI: 10.11 09/TPEL.2017. 2652318 [retrieved on Aug. 3, 2017].

* cited by examiner

FIG. 14

| Environmental information | Information type | Threshold X | Threshold Y |
|---|---|---|---|
| Altitude information | Convex upward | X1 | Y1 |
| Outside air pressure information | Convex downward | X2 | Y2 |
| Air component concentration information | Convex downward | X3 | Y3 |
| Oxygen concentration information | Convex downward | X3a | Y3a |
| Nitrogen concentration information | Convex downward | X3b | Y3b |
| Carbon dioxide concentration information | Convex downward | X3c | Y3c |
| Outside air temperature information | Convex downward | X4 | Y4 |
| Radiation dose information | Convex upward | X5 | Y5 |

FIG. 44
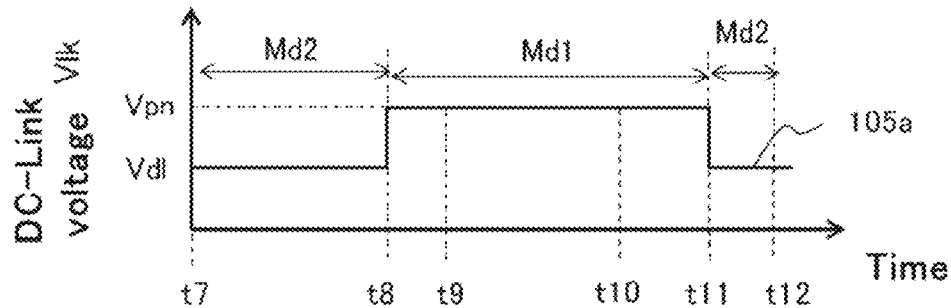
FIG. 45
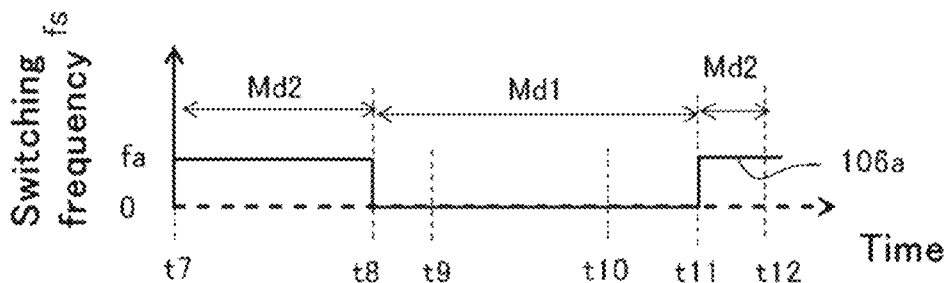
FIG. 46
| Motor parameter command | Threshold Za | Threshold Wa |
|---|---|---|
| Motor AC voltage command | Za1 | Wa1 |
| Motor speed command | Za2 | Wa2 |
| Motor output command | Za3 | Wa3 |
| Motor torque command | Za4 | Wa4 |
| Motor current command | Za5 | Wa5 |

FIG. 52
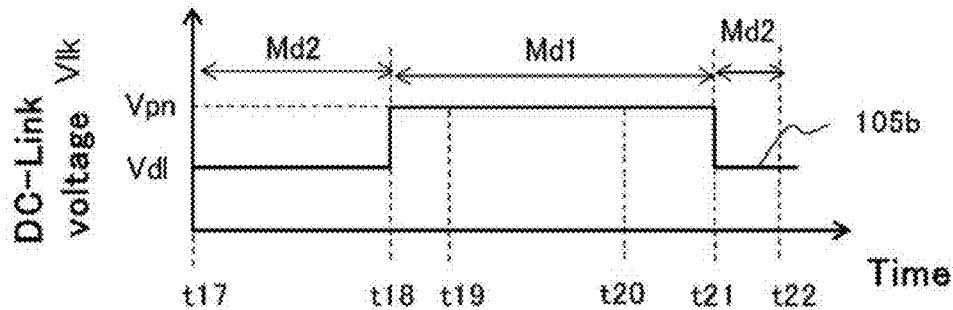
FIG. 53
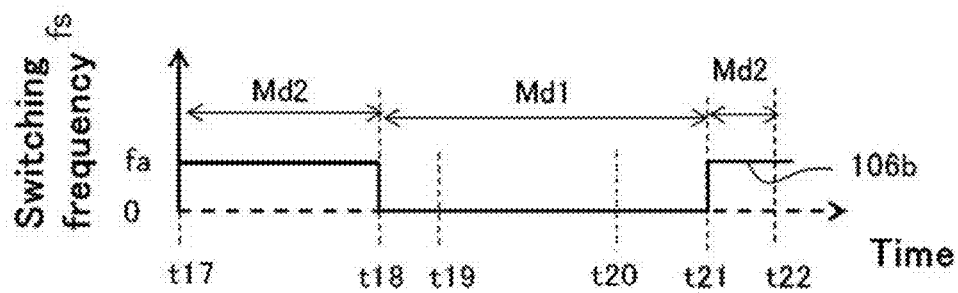
FIG. 54
| Detected motor parameter information | Threshold Zb | Threshold Wb |
|---|---|---|
| Detected motor AC voltage information | Zb1 | Wb1 |
| Detected motor speed information | Zb2 | Wb2 |
| Detected motor output information | Zb3 | Wb3 |
| Detected motor torque information | Zb4 | Wb4 |
| Detected motor current information | Zb5 | Wb5 |

| Estimated motor parameter information | Threshold Zc | Threshold Wc |
|---|---|---|
| Estimated motor speed information | Zc1 | Wc1 |
| Estimated motor output information | Zc2 | Wc2 |
| Estimated motor torque information | Zc3 | Wc3 |

FIG. 73

| Environmental information | Priority | Detected value | Threshold X* | Threshold Y* |
|---|---|---|---|---|
| Altitude information | 1 | dataA | X1 | Y1 |
| Outside air pressure information | 2 | dataB | X2 | Y2 |
| Air component concentration information | | | X3 | Y3 |
| Oxygen concentration information | | | X3a | Y3a |
| Nitrogen concentration information | | | X3b | Y3b |
| Carbon dioxide concentration information | | | X3c | Y3c |
| Outside air temperature information | 3 | dataC | X4 | Y4 |
| Radiation dose information | | | X5 | Y5 |

FIG. 87
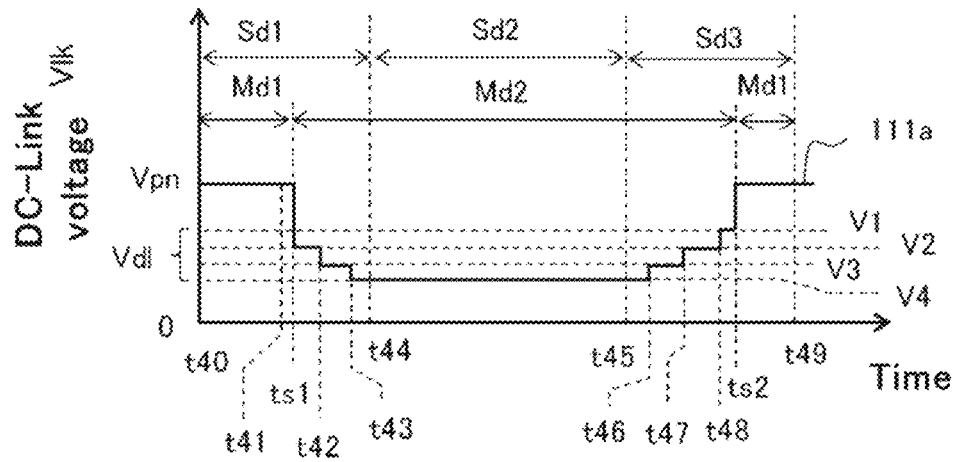
FIG. 88
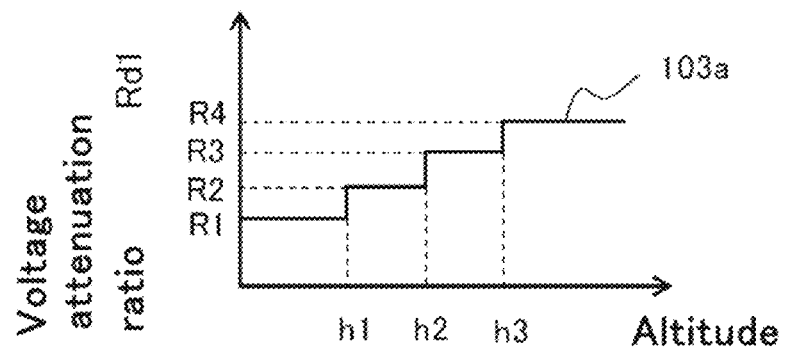
FIG. 89

MOTOR CONTROL DEVICE

CROSS-REFERENCE TO RELATED APPLICATION

The present application is based on PCT filing PCT/JP2020/009044, filed Mar. 4, 2020, the entire contents of which are incorporated herein by reference.

TECHNICAL FIELD

The present disclosure relates to a motor control device.

BACKGROUND ART

In recent years, an electrification system such as motor driving from an engine is increasingly spreading in electric vehicles, ships, and the like, and further, also for aircrafts, studies for electrification are being pursued worldwide in an attempt of reducing $CO_2$. Patent Document 1 discloses a DC/AC power conversion control device which performs power conversion from DC power to AC power to drive a motor. A boost chopper circuit in the DC/AC power conversion control device of Patent Document 1 performs 2-level operation in low-speed operation of the motor and performs 3-level operation in high-speed operation, so as to improve efficiency of the boost chopper circuit.

CITATION LIST

Patent Document

Patent Document 1: Japanese Laid-Open Patent Publication No. 2011-188655 (FIG. 1 and FIG. 2)

Non-Patent Document

Non-Patent Document 1: A. Akturk, et al., "Single Event Effects in Si and SiC Power MOSFETs Due to Terrestrial Neutrons", IEEE TRANSACTIONS on NUCLEAR SCIENCE, Vol. 64, No. 1, 2017

SUMMARY OF INVENTION

Problems to be Solved by Invention

In the DC/AC power conversion control device of Patent Document 1, AC output voltage of an inverter in high-speed operation of the motor is set to be higher than the AC output voltage in low-speed operation. As in the DC/AC power conversion control device of Patent Document 1, it is general that the AC output voltage of the inverter for motor driving increases in accordance with output power. In addition, an electrification system using power supplied from a DC distribution network without having an individual power source is being developed. In particular, when voltage of the DC distribution network is high, current can be reduced, and accordingly, an electrification system that is supplied with high-voltage power from the DC distribution network has an advantage that the weight of wiring of the DC distribution network can be reduced. Therefore, in a case where input voltage from the DC distribution network is received as DC-link voltage of a DC-link capacitor provided on the input side of the inverter, high voltage is constantly applied to the inverter. However, as described in Non-Patent Document 1, if the DC-link voltage is constantly set in a high-voltage state, cosmic ray resistance is reduced because of voltage dependency of long term DC stability (LTDS) against cosmic rays (proton beam, electron beam, neutron beam, etc.) to semiconductor elements composing the inverter, so that accidental failure (single event) becomes more likely to occur. In particular, the influence of the neutron beam which readily penetrates metal is great. In the troposphere, it is general that the dose of cosmic rays showering from space increases as the altitude above sea level becomes higher.

Such a motor control device that controls a motor using an inverter has a problem that, in a case of operating at a high altitude where the cosmic ray dose is high, the failure rate due to a single event on semiconductor elements increases and thus the reliability is lowered.

An object of the present disclosure is to improve reliability of a motor control device even in a case of operating at a high altitude where the cosmic ray dose is high.

Solution to the Problems

A motor control device according to one aspect of the present disclosure controls a motor of a flying object that takes off from a ground and flies. The motor control device includes: a step-down device which receives DC power supplied from a DC distribution network as input power and outputs DC power having voltage equal to or smaller than distribution network voltage of the DC distribution network; a power supply device which converts the DC power to AC power and outputs the AC power to the motor; and a control device for controlling the step-down device and the power supply device. The step-down device includes a DC-output power conversion device which converts the input power to DC power having voltage equal to or smaller than the distribution network voltage of the DC distribution network, and an output capacitor for smoothing output voltage of the DC-output power conversion device. The DC-output power conversion device has a first operation mode for outputting first voltage and a second operation mode for outputting second voltage lower than the first voltage. When the flying object takes off from the ground, the control device controls the DC-output power conversion device in the first operation mode. When the control device judges that flight information which is one or both of information of a motor parameter obtained along with control for the motor and information of an environmental factor relevant to a flight altitude of the flying object satisfies a predetermined condition, or when the control device has received an operation 5 mode signal for which the second operation mode is selected on the basis of the flight information during control for the motor, the control device controls the DC-output power conversion device in the second operation mode.

Effect of Invention

In the motor control device according to one aspect of the present disclosure, while the DC-output power conversion device is controlled in the first operation mode, when the flight information is judged to satisfy a predetermined condition or when the operation mode signal for which the second operation mode is selected on the basis of the flight information is received during control for the motor, the DC-output power conversion device is controlled in the second operation mode. Thus, even in a case of operating at a high altitude where the cosmic ray dose is high, reliability of the motor control device is improved.

BRIEF DESCRIPTION OF THE DRAWINGS

FIG. 14 shows environmental information and thresholds according to embodiment 1.

FIG. 44 shows timings of DC-link voltage in a second example for explaining operation of the motor control device in FIG. 34.

FIG. 45 shows timings of the switching frequency in a second example for explaining operation of the motor control device in FIG. 34.

FIG. 46 shows motor parameter commands and thresholds according to embodiment 7.

FIG. 52 shows timings of DC-link voltage in a second example for explaining operation of the motor control device in FIG. 48.

FIG. 53 shows timings of the switching frequency in a second example for explaining operation of the motor control device in FIG. 48.

FIG. 54 shows detected motor parameter information and thresholds according to embodiment 7.

FIG. 73 shows priority information according to embodiment 10.

FIG. 87 shows timings of DC-link voltage in a second example for explaining operation of the motor control device according to embodiment 13.

FIG. 88 shows a data map of a voltage attenuation ratio according to embodiment 13.

FIG. 89 shows voltage attenuation ratio characteristics according to embodiment 13.

DESCRIPTION OF EMBODIMENTS

Embodiment 1

Figure 1:
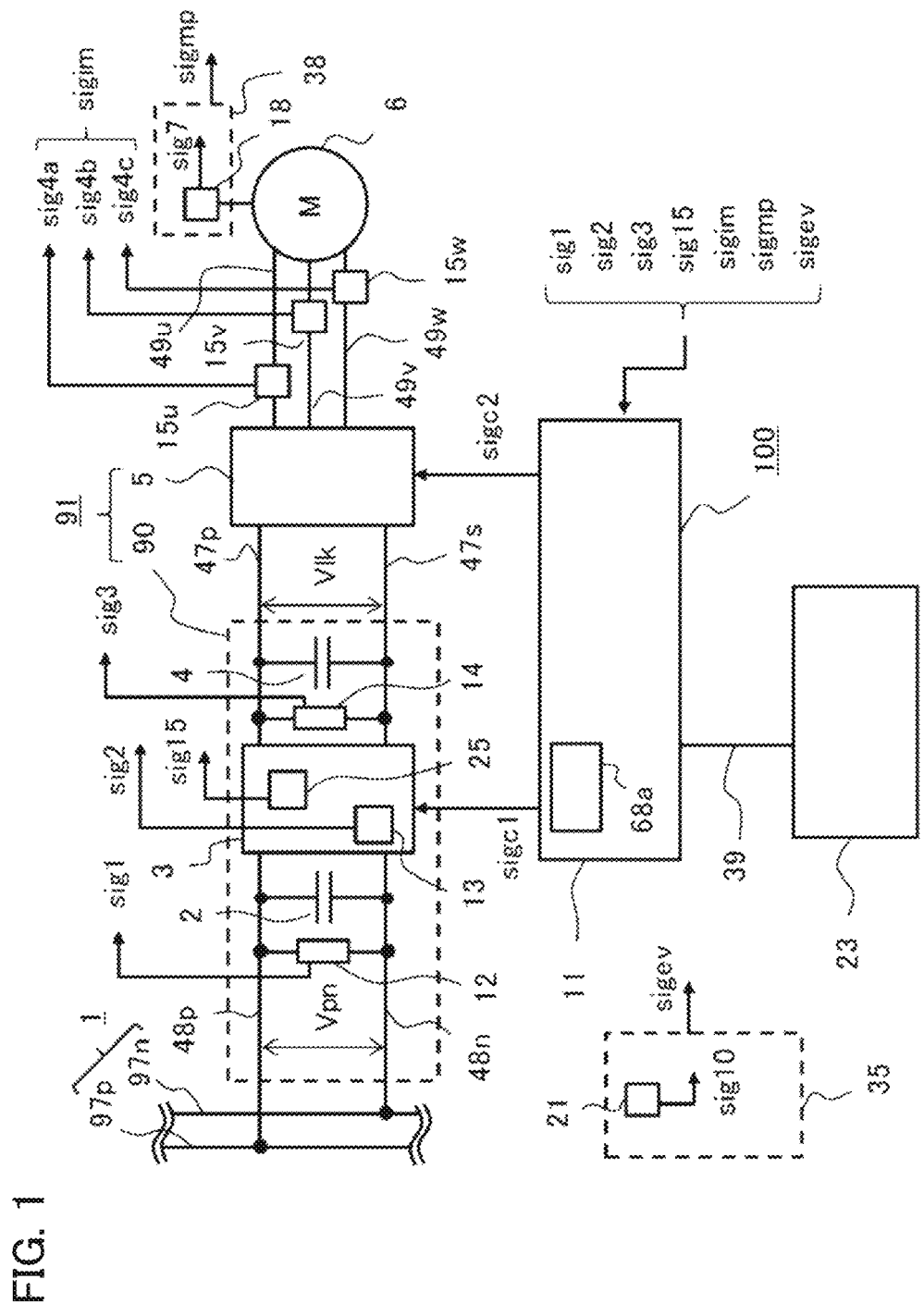
FIG. 1 shows a first example of a motor control device according to embodiment 1.
Figure 2:
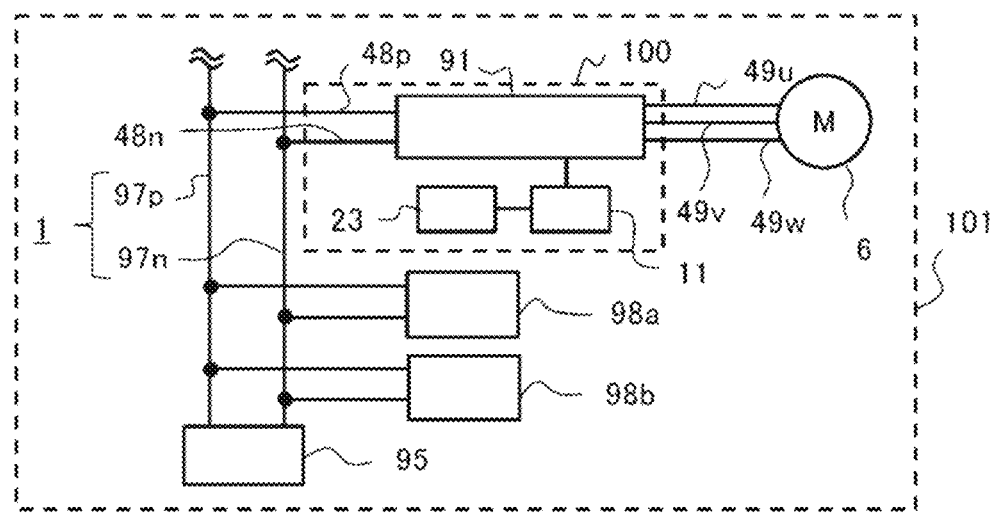
FIG. 2 shows devices connected to a DC distribution network in FIG. 1.
Figure 3:
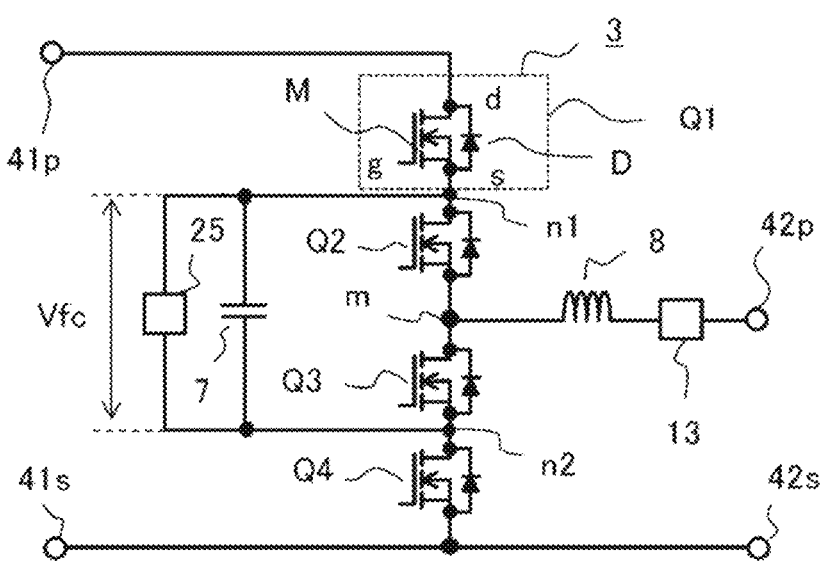
FIG. 3 shows a first example of a chopper in FIG. 1.
Figure 4:
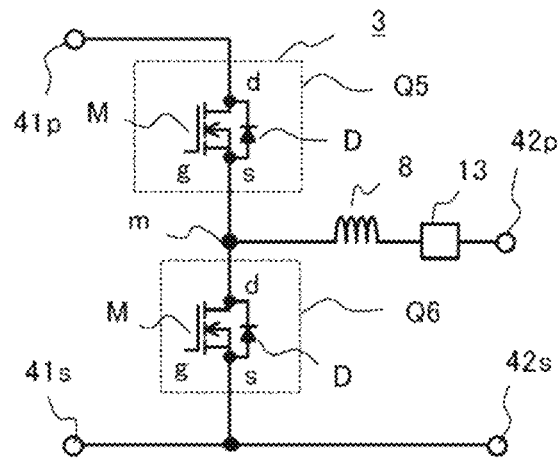
FIG. 4 shows a second example of the chopper in FIG. 1.
Figure 5:
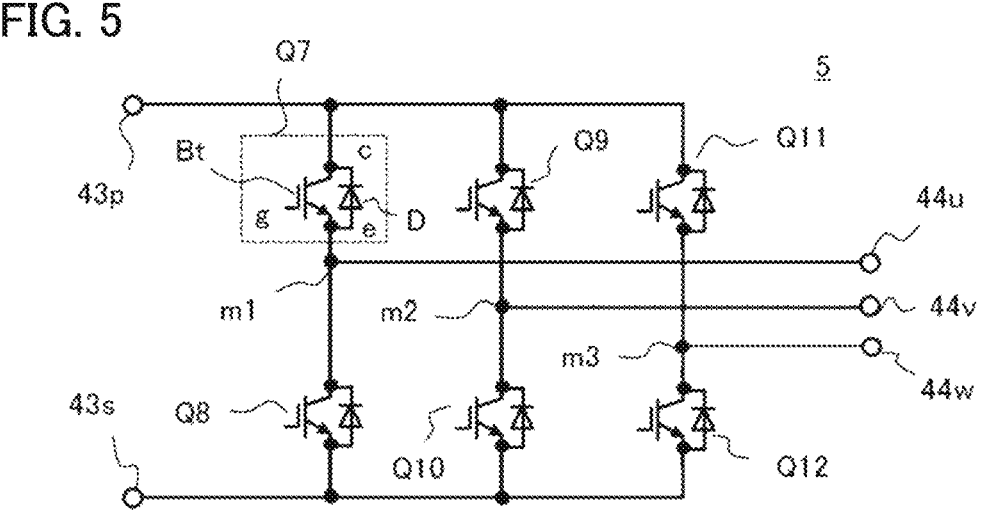
FIG. 5 shows the configuration of an inverter in FIG. 1.
Figure 6:
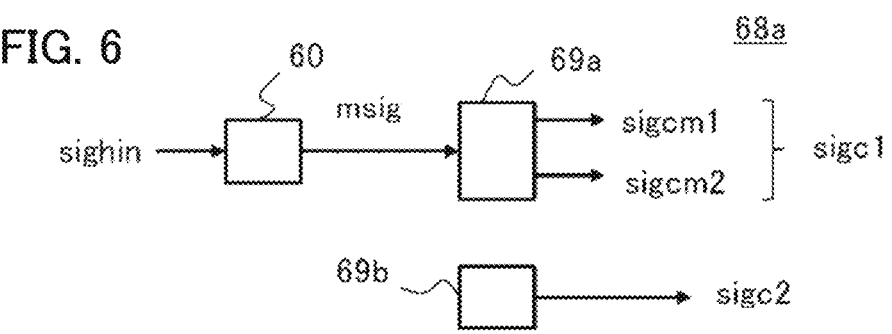
FIG. 6 shows the configuration of a control signal generation unit in FIG. 1.
Figure 7:
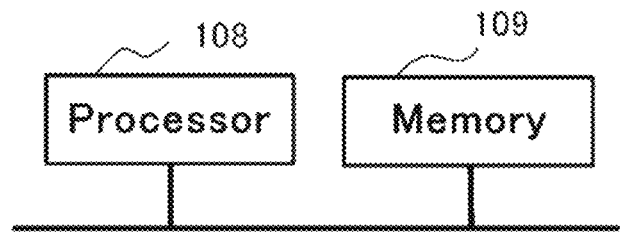
FIG. 7 shows a hardware configuration example for implementing the function of a control device in FIG. 1.
Figure 8:
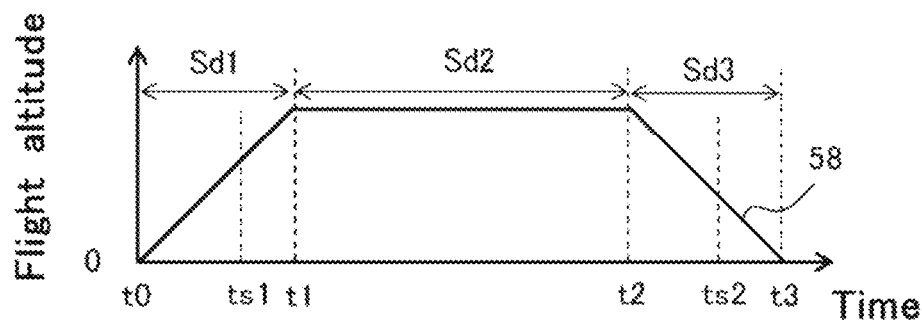
FIG. 8 shows timings for explaining operation of the motor control device according to embodiment 1.
Figure 9:
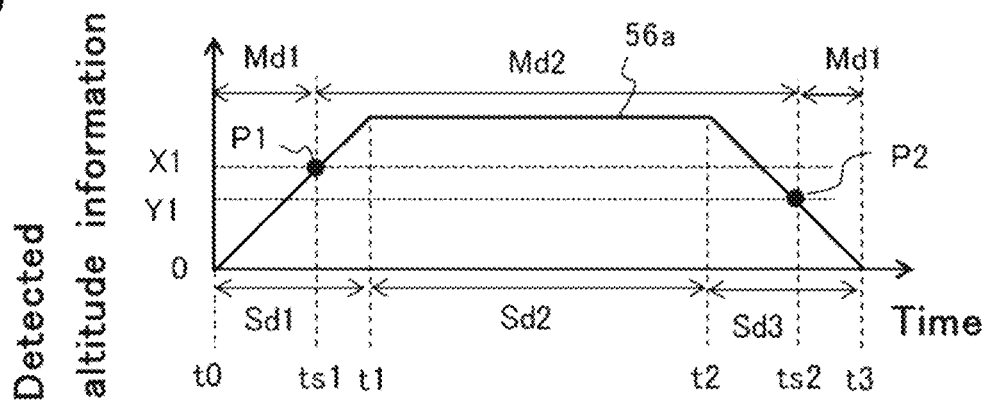
FIG. 9 shows timings for explaining operation of the motor control device according to embodiment 1.
Figure 10:
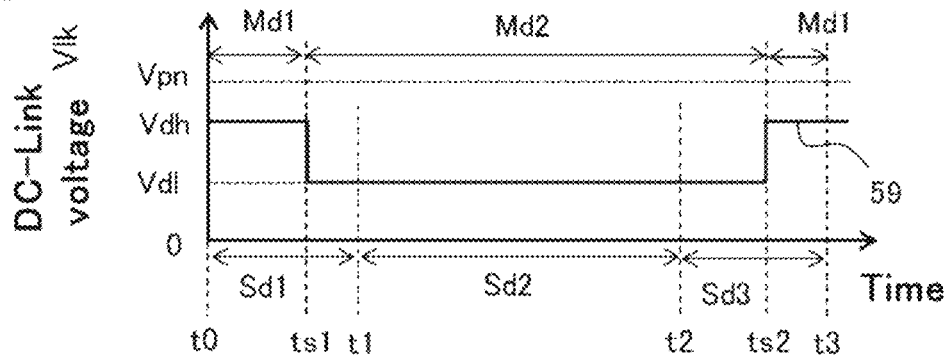
FIG. 10 shows timings of DC-link voltage in a first example for explaining operation of the motor control device according to embodiment 1.
Figure 11:
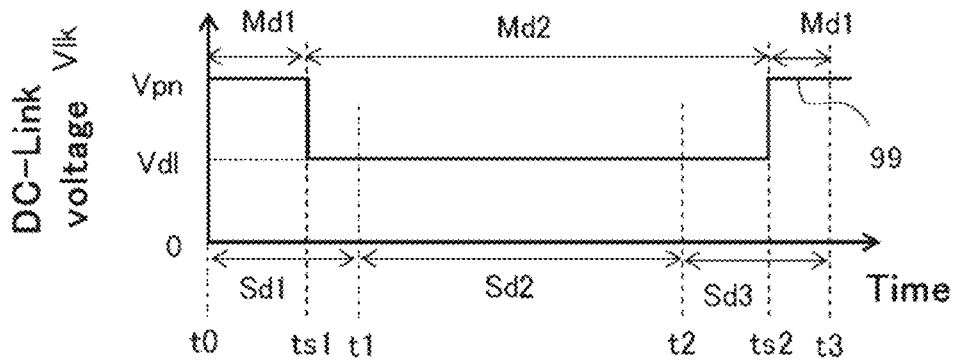
FIG. 11 shows timings of DC-link voltage in a second example for explaining operation of the motor control device according to embodiment 1.
Figure 12:
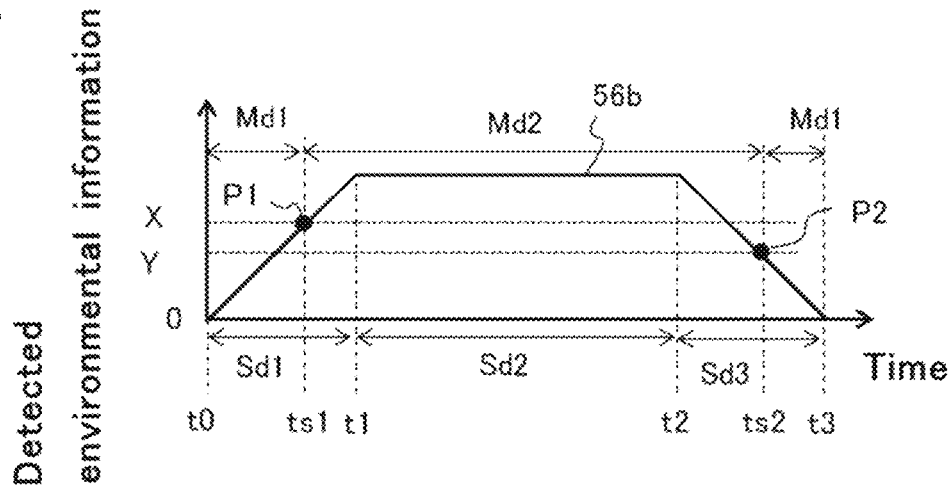
FIG. 12 shows timings in a first example of detected environmental information according to embodiment 1.
Figure 13:
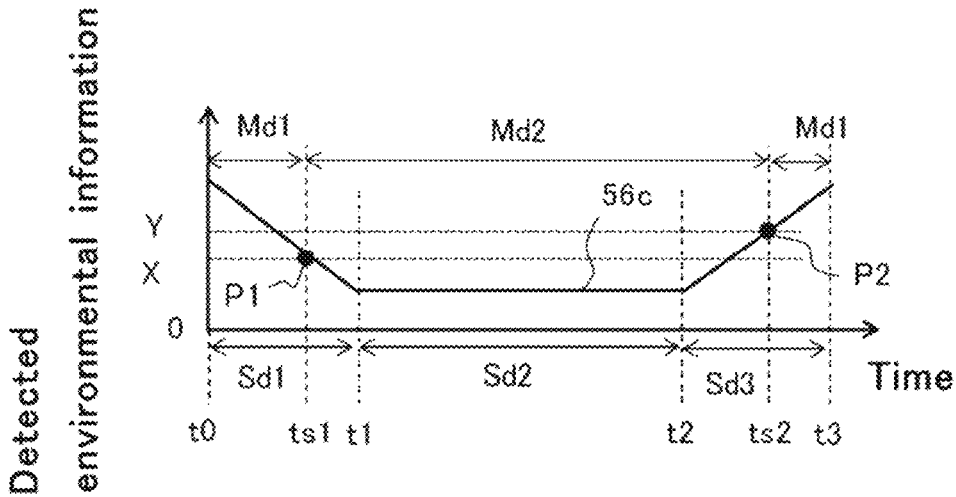
FIG. 13 shows timings in a second example of detected environmental information according to embodiment 1.
Figure 15:
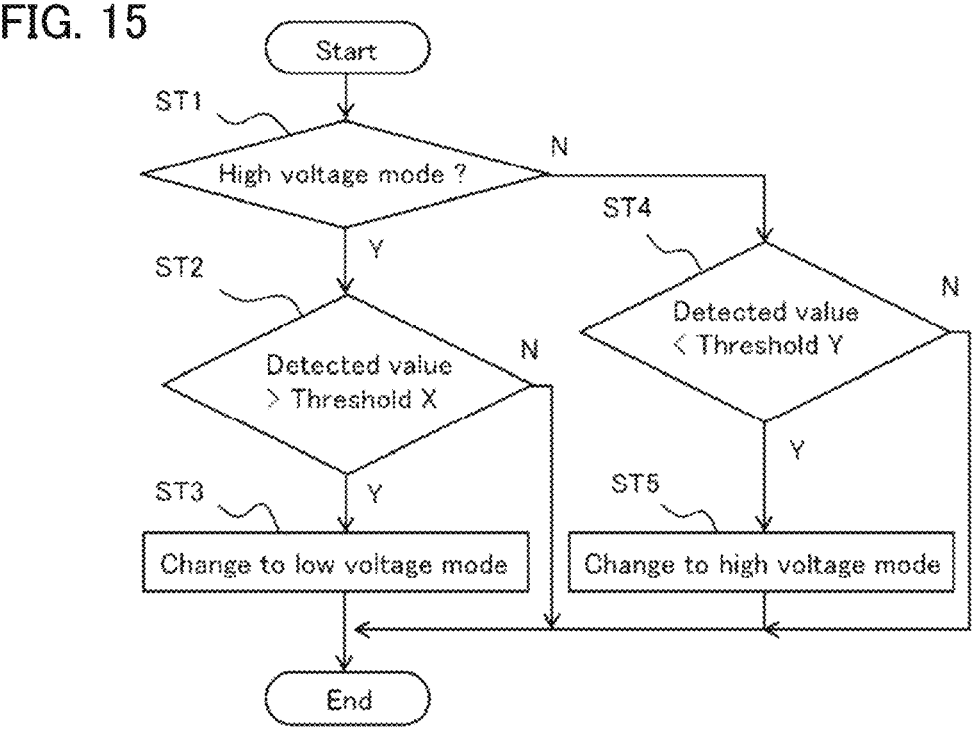
FIG. 15 shows a flowchart in a first example for explaining operation of an operation mode judgment unit in FIG. 6.
Figure 16:
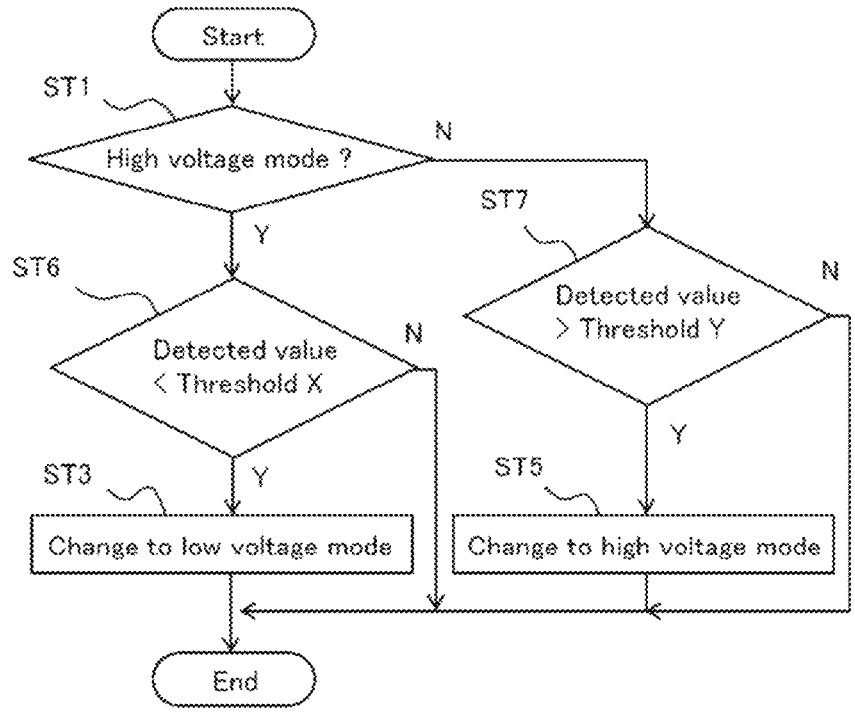
FIG. 16 shows a flowchart in a second example for explaining operation of the operation mode judgment unit in FIG. 6.
Figure 17:
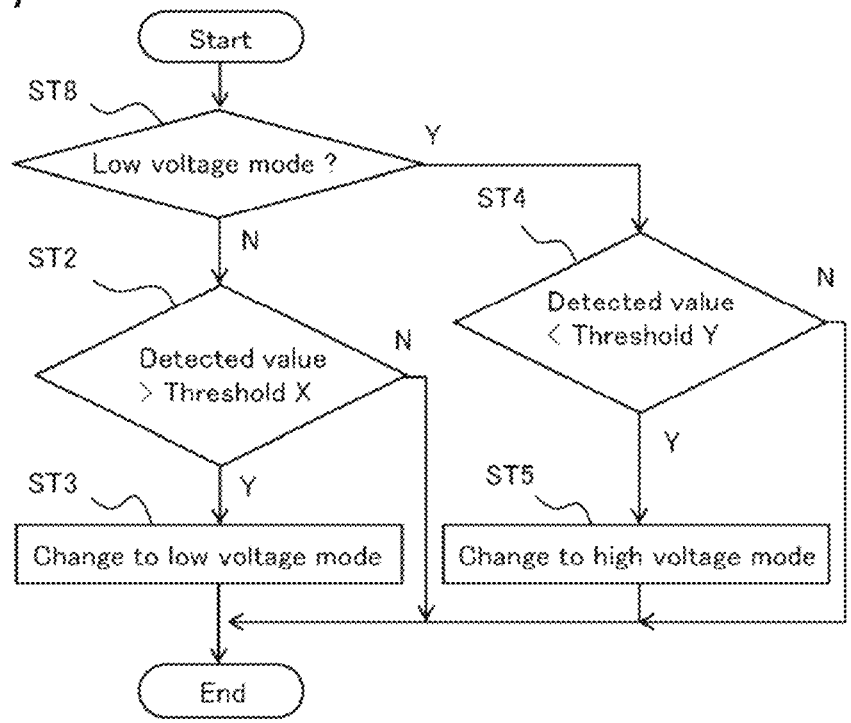
FIG. 17 shows a flowchart in a third example for explaining operation of the operation mode judgment unit in FIG. 6.
Figure 18:
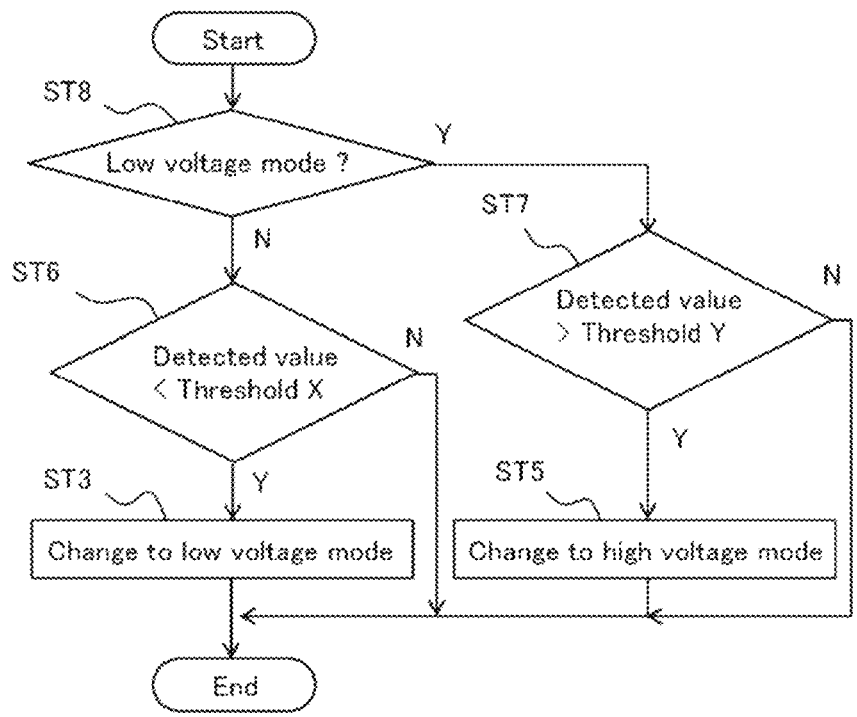
FIG. 18 shows a flowchart in a fourth example for explaining operation of the operation mode judgment unit in FIG. 6.
Figure 19:
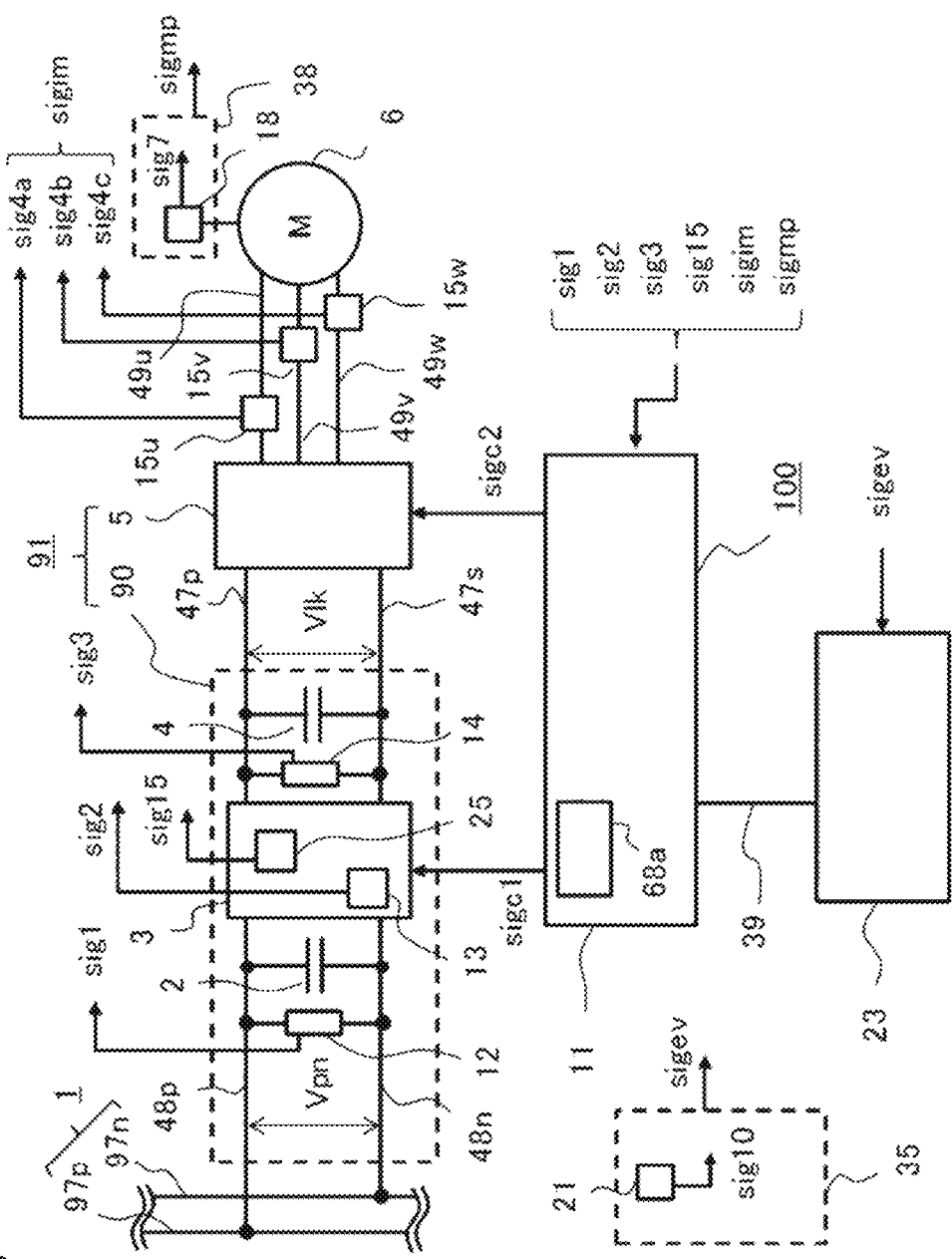
FIG. 19 shows a second example of the motor control device according to embodiment 1.
Figure 20:
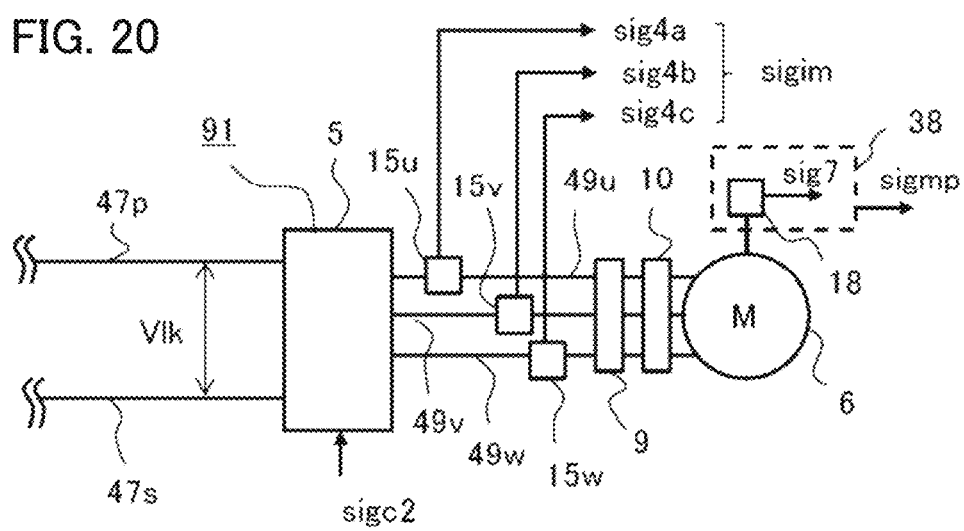
FIG. 20 shows a specific part in a second example of a driving device according to embodiment 1.

FIG. 1 shows a first example of a motor control device according to embodiment 1, and FIG. 2 shows devices connected to a DC distribution network in FIG. 1. FIG. 3 shows a first example of a chopper in FIG. 1, and FIG. 4 shows a second example of the chopper in FIG. 1. FIG. 5 shows the configuration of an inverter in FIG. 1, and FIG. 6 shows the configuration of a control signal generation unit in FIG. 1. FIG. 7 shows a hardware configuration example for implementing the function of a control device in FIG. 1. FIG. 8 and FIG. 9 show timings for explaining operation of the motor control device according to embodiment 1, and show timings of a flight altitude and timings of detected altitude information, respectively. FIG. 10 shows timings of DC-link voltage in a first example for explaining operation of the motor control device according to embodiment 1, and FIG. 11 shows timings of DC-link voltage in a second example for explaining operation of the motor control device according to embodiment 1. FIG. 12 shows timings in a first example of detected environmental information according to embodiment 1, and FIG. 13 shows timings in a second example of detected environmental information according to embodiment 1. FIG. 14 shows environmental information and thresholds according to embodiment 1. FIG. 15 shows a flowchart in a first example for explaining operation of an operation mode judgment unit in FIG. 6, and FIG. 16 shows a flowchart in a second example for explaining operation of the operation mode judgment unit in FIG. 6. FIG. 17 hows a flowchart in a third example for explaining operation of the operation mode judgment unit in FIG. 6, and FIG. 18 shows a flowchart in a fourth example for explaining operation of the operation mode judgment unit in FIG. 6. FIG. 19 shows a second example of the motor control device according to embodiment 1, and FIG. 20 shows a specific part in a second example of a driving device according to embodiment 1.

A motor control device 100 according to embodiment 1 includes a driving device 91, a control device 11, and an operating panel 23, and controls a motor 6. The motor control device 100 is provided to a flying object 101 such as an aircraft, for example. The motor 6 is an AC motor such as an induction motor or a permanent magnet synchronous motor (PMSM). The driving device 91 includes a step-down device 90 for outputting DC power having voltage equal to or smaller than distribution network voltage Vpn of a DC distribution network 1 from input power which is DC power supplied from the DC distribution network 1, and an inverter 5 which is a power supply device for converting DC power to AC power and outputting the AC power to the motor 6. The control device 11 controls the step-down device 90 and the inverter 5. The flying object 101 is provided with a power source 95 for supplying main power, the DC distribution network 1 for distributing DC power from the power source 95 to a plurality of devices, the motor control device 100 for controlling the motor 6, and devices 98a, 98b which are power conversion devices for supplying power to loads such as a light. The DC distribution network 1 includes a positive-side distribution line 97p and a negative-side distribution line 97n. FIG. 2 shows an example in which three devices, i.e., the motor control device 100 and the devices 98a, 98b, are connected to the DC distribution network 1.

The step-down device 90 includes a positive-side power line 48p and a negative-side power line 48n respectively connected to the positive-side distribution line 97p and the negative-side distribution line 97n of the DC distribution network 1, a capacitor 2 connected between the positive-side power line 48p and the negative-side power line 48n, a non-isolated step-down chopper 3 for stepping down input voltage to voltage equal to or smaller than the distribution network voltage Vpn of the DC distribution network 1, and a DC-link capacitor 4 connected between output terminals of the chopper 3. The chopper 3 is a DC-output power conversion device for converting input power which is DC power supplied from the DC distribution network 1 to DC power having voltage equal to or smaller than the distribution network voltage Vpn of the DC distribution network 1, and the capacitor 4 is an output capacitor for smoothing output voltage of the chopper 3. The chopper 3 has a first operation mode Md1 for outputting step-down voltage Vdh or distribution network voltage Vpn which is first voltage, and a second operation mode Md2 for outputting step-down voltage Vdl which is second voltage lower than the first voltage. The step-down device 90 further includes a high-potential-side power line 47p connecting a high-potential-side output terminal 42p of the chopper 3 and a high-potential-side input terminal 43p of the inverter 5, a low-potential-side power line 47s connecting a low-potential-side output terminal 42s of the chopper 3 and a low-potential-side input terminal 43s of the inverter 5, a distribution network voltage sensor 12 for detecting the distribution network voltage Vpn which is voltage between the positive-side power line 48p and the negative-side power line 48n, and a DC-link voltage sensor 14 for detecting the DC-link voltage Vlk of the capacitor 4 which is voltage between the high-potential-side power line 47p and the low-potential-side power line 47s. The high-potential-side power line 47p and the low-potential-side power line 47s are DC bus bars of the inverter 5.

The motor 6 is a three-phase AC motor, for example, and the inverter 5 is an inverter of a three-phase inverter type as shown in FIG. 5, for example. The inverter 5 is an inverter applicable to variable-speed driving for the motor 6. The inverter 5 converts the DC-link voltage Vlk to three-phase AC power having such voltage and a frequency that achieve required torque and rotational speed of the motor 6, and outputs the three-phase AC power to the motor 6. A U-side output terminal 44u, a V-side output terminal 44v, and a W-side output terminal 44w of the inverter 5 are respectively connected to input terminals for U phase, V phase, and W phase of the motor 6 via a U-phase power line 49u, a V-phase power line 49v, and a W-phase power line 49w.

The chopper 3 may be, for example, a chopper in a first example shown in FIG. 3, a chopper in a second example shown in FIG. 4, or the like. The chopper 3 in the first example is a DC/DC converter of a multilevel chopper type composed of four semiconductor switching elements Q1, Q2, Q3, Q4, a reactor 8, and a flying capacitor 7. The chopper 3 in the second example is a DC/DC converter composed of two semiconductor switching elements Q5, Q6 and a reactor 8. Hereinafter, the DC/DC converter of a multilevel chopper type is referred to as multilevel-type chopper. The multilevel-type chopper 3 shown in FIG. 3 can output multilevel voltages and can perform multilevel voltage conversion. The semiconductor switching elements Q1 to Q6 are self-turn-off power semiconductor elements such as insulated gate bipolar transistors (IGBTs) or metal-oxide-semiconductor field-effect transistors (MOSFETs). In this example, the semiconductor switching elements Q1 to Q6 are MOSFETs. Terminals of each semiconductor switching element Q1 to Q6 are a drain terminal d, a source terminal s, and a gate terminal g. Each semiconductor switching element Q1 to Q6 has a MOS transistor M and a diode D. The diode D may be an element separate from the MOS transistor M, or may be a parasitic diode.

In the examples shown in FIG. 3 and FIG. 4, a reactor current sensor 13 for detecting current flowing through the reactor 8 is connected between the high-potential-side output terminal 42p and the reactor 8, and a flying capacitor voltage sensor 25 for detecting flying capacitor voltage Vfc which is voltage across the flying capacitor 7 is connected. In the chopper 3 in the first example, the semiconductor switching elements Q1, Q2, Q3, Q4 are connected in series, and the reactor 8 is connected between the high-potential-side output terminal 42p and a connection point m between the semiconductor switching elements Q2, Q3. The flying capacitor 7 is connected between a connection point n1 between the semiconductor switching elements Q1, Q2 and a connection point n2 between the semiconductor switching elements Q3, Q4. The drain terminal d of the semiconductor switching element Q1 is connected to a high-potential-side input terminal 41p, and the source terminal s of the semiconductor switching element Q4 is connected to a low-potential-side input terminal 41s and a low-potential-side output terminal 42s. The source terminal s of the semiconductor switching element Q1 is connected to the drain terminal d of the semiconductor switching element Q2. The source terminal s of the semiconductor switching element Q2 is connected to the drain terminal d of the semiconductor switching element Q3. The source terminal s of the semiconductor switching element Q3 is connected to the drain terminal d of the semiconductor switching element Q4. The multilevel-type chopper 3 includes, between the high-potential-side input terminal 41p, and the low-potential-side input terminal 41s and the low-potential-side output terminal 42s, a high-potential-side series unit composed of a plurality of semiconductor switching elements Q1, Q2 connected in series, and a low-potential-side series unit composed of a plurality of semiconductor switching elements Q3, Q4 connected in series, and includes the reactor 8 between the high-potential-side output terminal 42p and the connection point m between the high-potential-side series unit and the low-potential-side series unit.

In the chopper 3 in the second example, the reactor 8 is connected between the high-potential-side output terminal 42p and a connection point m between the semiconductor switching elements Q5, Q6 connected in series. The drain terminal d of the semiconductor switching element Q5 is connected to the high-potential-side input terminal 41p, and the source terminal s of the semiconductor switching element Q6 is connected to the low-potential-side input terminal 41s and the low-potential-side output terminal 42s. The source terminal s of the semiconductor switching element Q5 is connected to the drain terminal d of the semiconductor switching element Q6.

The inverter 5 includes, for example, six semiconductor switching elements Q7, Q8, Q9, Q10, Q11, Q12. The semiconductor switching elements Q7 to Q12 are self-turn-off power semiconductor elements such as IGBTs or MOS-FETs. In this example, the semiconductor switching elements Q7 to Q12 are IGBTs. Terminals of each semiconductor switching element Q7 to Q12 are a collector terminal c, an emitter terminal e, and a gate terminal g. Each semiconductor switching element Q7 to Q12 has a transistor Bt which is an IGBT, and a diode D. The collector terminals c of the semiconductor switching elements Q7, Q9, Q11 are connected to the high-potential-side input terminal 43p, and the emitter terminals e of the semiconductor switching elements Q8, Q10, Q12 are connected to the low-potential-side input terminal 43s. The semiconductor switching elements Q7, Q8 are connected in series, and the emitter terminal e of the semiconductor switching element Q7 and the collector terminal c of the semiconductor switching element Q8 are connected to each other. The semiconductor switching elements Q9, Q10 are connected in series, and the emitter terminal e of the semiconductor switching element Q9 and the collector terminal c of the semiconductor switching element Q10 are connected to each other. The semiconductor switching elements Q11, Q12 are connected in series, and the emitter terminal e of the semiconductor switching element Q11 and the collector terminal c of the semiconductor switching element Q12 are connected to each other. A connection point m1 between the semiconductor switching elements Q7, Q8 is connected to the U-side output terminal 44u. A connection point m2 between the semiconductor switching elements Q9, Q10 is connected to the V-side output terminal 44v, and a connection point m3 between the semiconductor switching elements Q11, Q12 is connected to the W-side output terminal 44w.

The motor control device 100 includes, besides the distribution network voltage sensor 12, the reactor current sensor 13, the DC-link voltage sensor 14, and the flying capacitor voltage sensor 25 connected to the step-down device 90, a U phase current sensor 15u, a V phase current sensor 15v, a W phase current sensor 15w, a motor parameter sensor 38 such as a position sensor 18, and an environmental information detection sensor 35 such as an altitude sensor 21. The distribution network voltage sensor 12 outputs detected information sig1 which is information of the distribution network voltage Vpn. The reactor current sensor 13 outputs detected information sig2 which is information of current flowing through the reactor 8. The DC-link voltage sensor 14 outputs detected information sig3 which is information of the DC-link voltage Vlk. The flying capacitor voltage sensor 25 outputs detected information sig15 which is information of voltage of the flying capacitor 7, i.e., information of the flying capacitor voltage Vfc. The U phase current sensor 15u outputs detected information sig4a which is information of current flowing through the U-phase power line 49u. The V phase current sensor 15v outputs detected information sig4b which is information of current flowing through the V-phase power line 49v, and the W phase current sensor 15w outputs detected information sig4c which is information of current flowing through the W-phase power line 49w. The detected information sig4a, sig4b, sig4c is motor current detected information sigim.

The motor parameter sensor 38 outputs motor parameter detected information sigmp which is state information of the motor 6. The environmental information detection sensor 35 is a sensor for detecting information of an environmental factor, and outputs environmental detected information sigev which is environmental information of the flying object 101 such as the aircraft provided with the motor control device 100. The position sensor 18 outputs detected information sig7 which is information of the magnetic pole position of the motor 6. In a case where the motor parameter sensor 38 is the position sensor 18, the motor parameter detected information sigmp is the detected information sig7. The altitude sensor 21 outputs detected information sig10 which is information of the altitude of the flying object 101 provided with the motor control device 100. In a case where the environmental information detection sensor 35 is the altitude sensor 21, the environmental detected information sigev is the detected information sig10. It is noted that, depending on the motor control type, the U phase current sensor 15u, the V phase current sensor 15v, the W phase current sensor 15w, and the motor parameter sensor 38 such as the position sensor 18 need not be provided.

The operating panel 23 is provided with a device for a pilot of the flying object 101 to perform operation, and the control device 11 and the operating panel 23 are connected via a signal line 39. The control device 11 receives the detected information sig1, sig2, sig3, sig15, the motor current detected information sigim, the motor parameter detected information sigmp, and the environmental detected information sigev. On the basis of the detected information sig1, sig2, sig3, sig15, the motor current detected information sigim, the motor parameter detected information sigmp, the environmental detected information sigev, and an input signal from the operating panel 23, the control device 11 outputs a control signal sigc1 for controlling the chopper 3 and a control signal sigc2 for controlling the inverter 5. The control device 11 includes a control signal generation unit 68a. The control signal generation unit 68a includes an operation mode judgment unit 60, a first signal generation unit 69a, and a second signal generation unit 69b.

The operation mode judgment unit 60 performs judgment about two operation modes of the chopper 3 described later on the basis of input information sighin, and outputs an operation mode signal msig. For example, the first operation mode is an operation mode in which, for the DC-link voltage Vlk, DC rated voltage determined from AC voltage specifications required for maximum load operation of the motor 6 which is a load is set as step-down voltage Vdh which is first DC target voltage, and power having the step-down voltage Vdh stepped down through step-down operation is transmitted to the capacitor 4. That is, the first operation mode is an operation mode in which the DC-link voltage Vlk is controlled to be the step-down voltage Vdh stepped down from the distribution network voltage Vpn of the DC distribution network 1. The second operation mode is an operation mode in which, for the DC-link voltage Vlk which is voltage across the capacitor 4, voltage that is approximately equal to or smaller than half the step-down voltage Vdh which is the first DC target voltage is set as step-down voltage Vdl which is second DC target voltage, and power having the step-down voltage Vdl stepped down through step-down operation is transmitted to the capacitor 4. That is, the second operation mode is an operation mode in which the DC-link voltage Vlk is controlled to be the step-down voltage Vdl stepped down from the distribution network voltage Vpn of the DC distribution network 1. Therefore, the first operation mode is a high voltage mode, and the second operation mode is a low voltage mode. For example, in a case where the operation mode signal msig is at a high level, the operation mode signal msig indicates the first operation mode, and in a case where the operation mode signal msig is at a low level, the operation mode signal msig indicates the second operation mode. The high level corresponds to voltage of the control device 11, and the low level corresponds to the voltage of the ground of the control device 11. In response to the operation mode signal msig at a high level, the first signal generation unit 69a outputs, as the control signal sigc1, a first mode control signal sigcm1 for controlling the chopper 3 in the first operation mode. In response to the operation mode signal msig at a low level, the first signal generation unit 69a outputs, as the control signal sigc1, a second mode control signal sigcm2 for controlling the chopper 3 in the second operation mode. The second signal generation unit 69b outputs a control signal sigc2 for controlling the inverter 5 on the basis of the detected information sig1 sig2, sig3, sig15 and the motor current detected information sigim.

In the motor control device 100 of embodiment 1, the input information sighin is the environmental detected information sigev. The function of the control device 11 is implemented by a processor 108 such as a central processing unit (CPU) and a field programmable gate array (FPGA), and a memory 109, as shown in FIG. 7, for example. The function blocks of the operation mode judgment unit 60, the first signal generation unit 69a, the second signal generation unit 69b, and the like are implemented by the processor 108 executing a program stored in the memory 109. A plurality of processors 108 and a plurality of memories 109 may execute functions in cooperation with each other.

Operations of the chopper 3 and the control device 11 will be described. In the first operation mode, the chopper 3 performs power conversion through switching operations of the semiconductor elements so that the DC-link voltage Vlk which is the voltage across the capacitor 4 becomes the step-down voltage Vdh determined from the AC voltage specifications of the motor 6. In the second operation mode, the chopper 3 performs power conversion through switching operations of the semiconductor elements so that the DC-link voltage Vlk which is the voltage across the capacitor 4 becomes predetermined step-down voltage Vdl which is approximately half the value of the step-down voltage Vdh. These power conversion controls are executed by the control signal sigc1 from the control device 11. It is noted that "approximately half" means, for example, "0.25 times or more and 0.75 times or less", and preferably, "0.4 times or more and 0.6 times or less". That is, the step-down voltage Vdl is, for example, 0.25 times or more and 0.75 times or less of the step-down voltage Vdh, and preferably, 0.4 times or more and 0.6 times or less of the step-down voltage Vdh.

In a case where the distribution network voltage Vpn is equal to the voltage determined from the AC voltage specifications of the motor 6, in the first operation mode, the chopper 3 may stop switching operations of the semiconductor switching elements and directly transmit power from the DC distribution network 1 to the capacitor 4 without performing voltage conversion. Specifically, in the chopper 3 in the first example, the semiconductor switching elements Q3, Q4 are turned off and the semiconductor switching elements Q1, Q2 are turned on. In the chopper 3 in the second example, the semiconductor switching element Q6 is turned off and the semiconductor switching element Q5 is turned on. In this case, the first voltage in the first operation mode is the distribution network voltage Vpn, and the second voltage in the second operation mode is the predetermined step-down voltage Vdl which is approximately half the value of the distribution network voltage Vpn. In the first operation mode, without using synchronous rectification, the semiconductor switching elements may be all turned off and current may be conducted through the diodes D of the semiconductor switching elements Q1, Q2 or the diode D of the semiconductor switching element Q5. The step-down voltage Vdl is, for example, 0.25 times or more and 0.75 times or less of the distribution network voltage Vpn, and preferably, 0.4 times or more and 0.6 times or less of the distribution network voltage Vpn. The first operation mode in the case where switching operations of the semiconductor switching elements in the chopper 3 are stopped may be expressed as bypass mode.

The chopper 3 in the first example includes, between the high-potential-side input terminal 41p, and the low-potential-side input terminal 41s and the low-potential-side output terminal 42s, the high-potential-side series unit composed of the plurality of semiconductor switching elements Q1, Q2 connected in series and the low-potential-side series unit composed of the plurality of semiconductor switching elements Q3, Q4 connected in series, and includes the reactor 8 between the high-potential-side output terminal 42p and the connection point m between the high-potential-side series unit and the low-potential-side series unit. In the chopper 3 in the first example, when the first voltage is outputted in the first operation mode, the high-potential-side series unit is controlled to be on or off and the low-potential-side series unit is controlled to be off. The chopper 3 in the second example includes, between the high-potential-side input terminal 41p, and the low-potential-side input terminal 41s and the low-potential-side output terminal 42s, the high-potential-side semiconductor switching element Q5 and the low-potential-side semiconductor switching element Q6 connected in series, and includes the reactor 8 between the high-potential-side output terminal 42p and the connection point m between the high-potential-side semiconductor switching element Q5 and the low-potential-side semiconductor switching element Q6. In the chopper 3 in the second example, when the first voltage is outputted in the first operation mode, the high-potential-side semiconductor switching element Q5 is controlled to be on or off and the low-potential-side semiconductor switching element Q6 is controlled to be off.

In the first operation mode, the chopper 3 outputs the first voltage which is the distribution network voltage Vpn or the step-down voltage Vdh determined from the AC voltage specifications of the motor 6. In the second operation mode, the chopper 3 outputs the second voltage which is the predetermined step-down voltage Vdl corresponding to approximately half the first voltage. Characteristics of the DC-link voltage Vlk in the case where the first voltage is the step-down voltage Vdh are the DC-link voltage characteristics in the first example, and characteristics of the DC-link voltage Vlk in the case where the first voltage is the distribution network voltage Vpn are the DC-link voltage characteristics in the second example.

In the motor control device 100 of embodiment 1, the operation mode of the chopper 3 is changed using the altitude sensor 21 as the environmental information detection sensor 35. It is assumed that the flight altitude of the aircraft which is the flying object 101 provided with the motor control device 100 changes as in flight altitude characteristics 58 shown in FIG. 8. In FIG. 8, the horizontal axis indicates time, and the vertical axis indicates the flight altitude. The aircraft starts to ascend at time t0, and cruises at a constant altitude from time t1 to time t2. The aircraft starts to descend at time t2 and lands on the ground at time t3. A state from time t0 to time t1 is a first flight state Sd1, a state from time t1 to time t2 is a second flight state Sd2, and a state from time t2 to time t3 is a third flight state Sd3. In the case where the aircraft provided with the motor control device 100 flies as shown in FIG. 8, characteristics of detected altitude information calculated from the detected information sig10 outputted from the altitude sensor 21 are as shown by detected altitude information characteristics 56*a* in FIG. 9, and the DC-link voltage Vlk of the chopper 3 changes as in DC-link voltage characteristics 59 shown in FIG. 10 or DC-link voltage characteristics 99 shown in FIG. 11. In FIG. 9, the horizontal axis indicates time, and the vertical axis indicates the detected altitude information. In FIG. 10 and FIG. 11, the horizontal axis indicates time, and the vertical axis indicates the DC-link voltage Vlk.

First, a case of controlling the chopper 3 as in the DC-link voltage characteristics 59 shown in FIG. 10 will be described. At time t0, the control device 11 operates the chopper 3 in the first operation mode Md1, i.e., the high voltage mode. That is, at time t0, the chopper 3 operates in the first operation mode Md1, i.e., the high voltage mode. In the first flight state Sd1, when the detected altitude information inputted from the altitude sensor 21 indicates a value exceeding a threshold X1, the control device 11 changes the operation mode to the second operation mode Md2, i.e., the low voltage mode, to start operation of the chopper 3 in the low voltage mode, i.e., low voltage operation, thus reducing the DC-link voltage Vlk from the step-down voltage Vdh to the step-down voltage Vdl. The detected altitude information exceeds the threshold X1 at time ts1, and the DC-link voltage Vlk changes from the step-down voltage Vdh to the step-down voltage Vdl at time ts1. In the second flight state Sd2 from time t1 to time t2, the control device 11 keeps the low voltage operation of the chopper 3. During operation in the second operation mode Md2, i.e., the low voltage mode, if, in the third flight state Sd3, the detected altitude information inputted from the altitude sensor 21 indicates a value lower than a threshold Y1, the control device 11 changes the operation mode to the first operation mode Md1, i.e., the high voltage mode, to start operation of the chopper 3 in the high voltage mode, i.e., high voltage operation, thus increasing the DC-link voltage Vlk to the step-down voltage Vdh. When the detected altitude information becomes lower than the threshold Y1 at time ts2, the DC-link voltage Vlk changes from the step-down voltage Vdl to the step-down voltage Vdh at time ts2. An operation in the low voltage mode may be referred to as low voltage operation, and operation in the high voltage mode may be referred to as high voltage operation. An action in the low voltage mode may be referred to as low voltage action, and an action in the high voltage mode may be referred to as high voltage action. The first operation mode Md1 and the second operation mode Md2 may be simply referred to as first operation mode and second operation mode.

In a case of controlling the chopper 3 as in the DC-link voltage characteristics 99 shown in FIG. 11, the step-down voltage Vdh is replaced with the distribution network voltage Vpn. A unit of the detected altitude information may be a unit representing a length, such as meter or foot, or may be a unit that can be compared by a relative value as in a per-unit (PU) system. In embodiment 1, the threshold X1 is greater than the threshold Y1. A point where the detected altitude information in the detected altitude information characteristics 56*a* in the first flight state Sd1 becomes the threshold X1 is a mode change point P1, and a point where the detected altitude information in the detected altitude information characteristics 56*a* in the third flight state Sd3 becomes the threshold Y1 is a mode change point P2.

In the above description, the example in which the environmental information detection sensor 35 is the altitude sensor 21 has been shown. However, the environmental information detection sensor 35 is not limited to the altitude sensor 21. In the case where the environmental information detection sensor 35 is the altitude sensor 21, characteristics of detected environmental information calculated from the environmental detected information sigev outputted from the environmental information detection sensor 35 are as shown by detected environmental information characteristics 56*b* in FIG. 12. As described in embodiment 2 later, in a case where the environmental information detection sensor 35 is an outside air pressure sensor 20, characteristics of detected outside air pressure information calculated from detected information sig9 outputted from the outside air pressure sensor 20 are as shown by detected outside air pressure information characteristics 56*d* in FIG. 22. That is, in the case where the environmental information detection sensor 35 is the outside air pressure sensor 20, characteristics of detected environmental information calculated from the environmental detected information sigev outputted from the environmental information detection sensor 35 are as shown by detected environmental information characteristics 56*c* in FIG. 13. In FIG. 12 and FIG. 13, the horizontal axes indicate time, and the vertical axes indicate the detected environmental information. The detected environmental information characteristics 56*b* shown in FIG. 12 exhibit change similar to the flight altitude characteristics 58 in FIG. 8, and have, as it were, an upward convex shape. The detected environmental information characteristics 56*c* shown in FIG. 13 exhibit change in the direction opposite to the flight altitude characteristics 58 in FIG. 8, and have, as it were, a downward convex shape.

The environmental detected information sigev is information of an environmental factor relevant to the flight altitude of the flying object 101, and is flight information. When the flying object 101 such as the aircraft takes off from the ground, the control device 11 controls the chopper 3 in the first operation mode Md1, and when the control device 11 judges that flight information which is information of an environmental factor relevant to the flight altitude of the flying object 101, i.e., the environmental detected information sigev, satisfies a predetermined condition, the control device 11 controls the chopper 3 in the second operation mode Md2.

Next, operation of the operation mode judgment unit 60 of the control device 11 will be described with reference to the flowcharts in FIG. 15 to FIG. 18. First, the case of controlling the chopper 3 as in the DC-link voltage characteristics 59 shown in FIG. 10 will be described. The flowchart in the first example shown in FIG. 15 is a flowchart corresponding to the detected environmental information characteristics 56*b* in the first example shown in FIG. 12. The detected environmental information characteristics 56*b* in the first example shown in FIG. 12 have a shape similar to the detected altitude information characteristics 56*a* in FIG. 9, the threshold at the mode change point P1 is X, and the threshold at the mode change point P2 is Y. At time t0, the control device 11 operates the chopper 3 in the first operation mode Md1, i.e., the high voltage mode. That is, at time t0, the chopper 3 operates in the first operation mode Md1, i.e., the high voltage mode. In the first flight state Sd1, when the detected environmental information inputted from the environmental information detection sensor 35 indicates a value exceeding the threshold X which is a first environmental threshold, the control device 11 changes the operation mode to the second operation mode Md2, i.e., the low voltage mode, to start low voltage operation of the chopper 3, thus reducing the DC-link voltage Vlk from the step-down voltage Vdh to the step-down voltage Vdl. The detected altitude information exceeds the threshold X at time ts1, and the DC-link voltage Vlk changes from the step-down voltage Vdh to the step-down voltage Vdl at time ts1. The control device 11 keeps the low voltage operation of the chopper 3 in the second flight state Sd2 from time t1 to time t2. During operation in the second operation mode Md2, i.e., the low voltage mode, if, in the third flight state Sd3, the detected environmental information inputted from the environmental information detection sensor 35 indicates a value lower than the threshold Y which is a second environmental threshold, the control device 11 changes the operation mode to the first operation mode Md1, i.e., the high voltage mode, to start high voltage operation of the chopper 3, thus increasing the DC-link voltage Vlk to the step-down voltage Vdh. When the detected environmental information becomes lower than the threshold Y at time ts2, the DC-link voltage Vlk changes from the step-down voltage Vdl to the step-down voltage Vdh at time ts2. In the case of controlling the chopper 3 as in the DC-link voltage characteristics 99 shown in FIG. 11, the step-down voltage Vdh is replaced with the distribution network voltage Vpn.

In step ST1, whether or not the chopper 3 is in the high voltage mode (first operation mode) is judged. Specifically, in step ST1, whether or not the operation mode signal msig indicates the high voltage mode, for example, whether or not the operation mode signal msig is at a high level, is judged. In step ST1, if it is judged that the chopper 3 is in the high voltage mode, the process proceeds to step ST2, and if it is judged that the chopper 3 is not in the high voltage mode, the process proceeds to step ST4. In step ST2, if the detected value of the detected environmental information is greater than the threshold X, i.e., if an operation mode change judgment criterion is satisfied, the process proceeds to step ST3, and if the detected value of the detected environmental information is not greater than the threshold X, i.e., if the operation mode change judgment criterion is not satisfied, the operation mode signal msig is kept in the high voltage mode and the process is ended. In step ST3, the operation mode signal msig is changed to the low voltage mode and the process is ended. In step ST4, if the detected value of the detected environmental information is smaller than the threshold Y, i.e., if the operation mode change judgment criterion is satisfied, the process proceeds to step ST5, and if the detected value of the detected environmental information is not smaller than the threshold Y, i.e., if the operation mode change judgment criterion is not satisfied, the operation mode signal msig is kept in the low voltage mode and the process is ended. In step ST5, the operation mode signal msig is changed to the high voltage mode and the process is ended.

The flowchart in the second example shown in FIG. 16 is a flowchart corresponding to the detected environmental information characteristics 56c in the second example shown in FIG. 13. The detected environmental information characteristics 56c in the second example shown in FIG. 13 have a shape reversed upside down from the detected altitude information characteristics 56a in FIG. 9 and the detected environmental information characteristics 56b in FIG. 12, the threshold at the mode change point P1 is X, and the threshold at the mode change point P2 is Y. In the detected environmental information characteristics 56c in the second example shown in FIG. 13, the detected value is reduced as the flight altitude becomes higher as in the detected outside air pressure information characteristics 56d, for example. First, the case of controlling the chopper 3 as in the DC-link voltage characteristics 59 shown in FIG. 10 will be described. At time t0, the control device 11 operates the chopper 3 in the first operation mode Md1, i.e., the high voltage mode. That is, at time t0, the chopper 3 operates in the first operation mode Md1, i.e., the high voltage mode. In the first flight state Sd1, when the detected environmental information inputted from the environmental information detection sensor 35 indicates a value lower than the threshold X, the control device 11 changes the operation mode to the second operation mode Md2, i.e., the low voltage mode, to start low voltage operation of the chopper 3, thus reducing the DC-link voltage Vlk from the step-down voltage Vdh to the step-down voltage Vdl. The detected environmental information becomes lower than the threshold X at time ts1, and the DC-link voltage Vlk changes from the step-down voltage Vdh to the step-down voltage Vdl at time ts1. In the second flight state Sd2 from time t1 to time t2, the control device 11 keeps the low voltage operation of the chopper 3. During operation in the second operation mode Md2, i.e., the low voltage mode, if, in the third flight state Sd3, the detected environmental information inputted from the environmental information detection sensor 35 indicates a value exceeding the threshold Y, the control device 11 changes the operation mode to the first operation mode Md1, i.e., the high voltage mode, to start high voltage operation of the chopper 3, thus increasing the DC-link voltage Vlk to the step-down voltage Vdh. When the detected environmental information exceeds the threshold Y at time ts2, the DC-link voltage Vlk changes from the step-down voltage Vdl to the step-down voltage Vdh at time ts2. In the case of controlling the chopper 3 as in the DC-link voltage characteristics 99 shown in FIG. 11, the step-down voltage Vdh is replaced with the distribution network voltage Vpn.

The flowchart in the second example shown in FIG. 16 is different from the flowchart in the first example shown in FIG. 15 in that steps ST2 and ST4 are replaced with steps ST6 and ST7, respectively. In step ST1, whether or not the chopper 3 is in the high voltage mode (first operation mode) is judged. Specifically, in step ST1, whether or not the operation mode signal msig indicates the high voltage mode, for example, whether or not the operation mode signal msig is at a high level, is judged. In step ST1, if it is judged that the chopper 3 is in the high voltage mode, the process proceeds to step ST6, and if it is judged that the chopper 3 is not in the high voltage mode, the process proceeds to step ST7. In step ST6, if the detected value of the detected environmental information is smaller than the threshold X, i.e., if the operation mode change judgment criterion is satisfied, the process proceeds to step ST3, and if the detected value of the detected environmental information is not smaller than the threshold X, i.e., if the operation mode change judgment criterion is not satisfied, the operation mode signal msig is kept in the high voltage mode and the process is ended. In step ST3, the operation mode signal msig is changed to the low voltage mode and the process is ended. In step ST7, if the detected value of the detected environmental information is greater than the threshold Y, i.e., if the operation mode change judgment criterion is satisfied, the process proceeds to step ST5, and if the detected value of the detected environmental information is not greater than the threshold Y, i.e., if the operation mode change judgment criterion is not satisfied, the operation mode signal msig is kept in the low voltage mode and the process is ended. In step ST5, the operation mode signal msig is changed to the high voltage mode and the process is ended.

In the examples shown in FIG. 15 and FIG. 16, whether or not the chopper 3 is in the high voltage mode is judged in step ST1 which is the first step from the start of the flowchart. However, as shown in FIG. 17 and FIG. 18, whether or not the chopper 3 is in the low voltage mode may be judged in step ST8 which is the first step. The flowchart in the third example shown in FIG. 17 is a flowchart corresponding to the detected environmental information characteristics 56b in the first example shown in FIG. 12. The flowchart in the fourth example shown in FIG. 18 is a flowchart corresponding to the detected environmental information characteristics 56c in the second example shown in FIG. 13. In the flowchart in the third example shown in FIG. 17, in step ST8, whether or not the chopper 3 is in the low voltage mode (second operation mode) is judged. Specifically, in step ST8, whether or not the operation mode signal msig indicates the low voltage mode, for example, whether or not the operation mode signal msig is at a low level, is judged. In step ST8, if it is judged that the chopper 3 is in the low voltage mode, the process proceeds to step ST4, and if it is judged that the chopper 3 is not in the low voltage mode, the process proceeds to step ST2. Operations in steps ST2 to ST5 are the same as those in the flowchart in the first example shown in FIG. 15, and therefore the description thereof is not repeated.

In the flowchart in the fourth example shown in FIG. 18, in step ST8, whether or not the chopper 3 is in the low voltage mode (second operation mode) is judged as described above. In step ST8, if it is judged that the chopper 3 is in the low voltage mode, the process proceeds to step ST7, and if it is judged that the chopper 3 is not in the low voltage mode, the process proceeds to step ST6. Operations in steps ST6, ST3, ST7, ST5 are the same as those in the second example shown in FIG. 16, and therefore the description thereof is not repeated.

FIG. 14 shows specific examples of the environmental detected information sigev to be inputted to the operation mode judgment unit 60 of the control device 11, and thresholds to be used in judgment. In a case where the altitude sensor 21 shown in FIG. 1 is used as a specific example of the environmental information detection sensor 35, information in the row of the altitude information shown in FIG. 14 is used. As the thresholds X and Y, thresholds X1 and Y1 are used, respectively. In a case where the outside air pressure sensor 20 (see FIG. 21) described later is used as a specific example of the environmental information detection sensor 35, information in the row of the outside air pressure information shown in FIG. 14 is used, and as the thresholds X and Y, thresholds X2 and Y2 are used, respectively. In a case where an air component concentration sensor 22 (see FIG. 23) described later is used as a specific example of the environmental information detection sensor 35, information in the row of the air component concentration information shown in FIG. 14 is used, and as the thresholds X and Y, thresholds X3 and Y3 are used, respectively.

In a case where an oxygen concentration sensor 55a is used as a specific example of the air component concentration sensor 22, information in the row of the oxygen concentration information shown in FIG. 14 is used, and as the thresholds X and Y, thresholds X3a and Y3a are used, respectively. In a case where a nitrogen concentration sensor 55b is used as a specific example of the air component concentration sensor 22, information in the row of the nitrogen concentration information shown in FIG. 14 is used, and as the thresholds X and Y, thresholds X3b and Y3b are used, respectively. In a case where a carbon dioxide concentration sensor 55c is used as a specific example of the air component concentration sensor 22, information in the row of the carbon dioxide concentration information shown in FIG. 14 is used, and as the thresholds X and Y, thresholds X3c and Y3c are used, respectively. In a case where an outside air temperature sensor 19 (see FIG. 28) described later is used as a specific example of the environmental information detection sensor 35, information in the row of the outside air temperature information shown in FIG. 14 is used, and as the thresholds X and Y, thresholds X4 and Y4 are used, respectively. In a case where a radiation sensor 24 (see FIG. 30) described later is used as a specific example of the environmental information detection sensor 35, information in the row of the radiation dose information shown in FIG. 14 is used, and as the thresholds X and Y, thresholds X5 and Y5 are used, respectively.

Regarding the threshold X which is the first environmental threshold and the threshold Y which is the second environmental threshold, depending on the kind of the environmental factor information, i.e., flight information, the detected environmental information characteristics are different (56b or 56c), i.e., the shape thereof is different (upward convex shape or downward convex shape). Therefore, using the threshold X which is the first environmental threshold and the threshold Y which is the second environmental threshold, operation of the control device 11 can be expressed as follows. In a state in which the chopper 3 is controlled in the first operation mode Md1, when the control device 11 judges that an information value based on information of an environmental factor has passed through the threshold X which is the first environmental threshold, the control device 11 controls the chopper 3 in the second operation mode Md2. In a state in which the chopper 3 is controlled in the second operation mode Md2, when the control device 11 judges that the information value based on the information of the environmental factor has passed through the threshold Y which is the second environmental threshold, the control device 11 controls the chopper 3 in the first operation mode Md1. The first environmental threshold and the second environmental threshold may be referred to as follows, in a case of discriminating them for each environmental factor information. If the information of the environmental factor, i.e., the flight information is altitude information of the flying object 101, the first environmental threshold and the second environmental threshold are referred to as first altitude threshold and second altitude threshold. If the information of the environmental factor, i.e., the flight information is outside air pressure information outside the flying object 101, the first environmental threshold and the second environmental threshold are referred to as first outside air pressure threshold and second outside air pressure threshold, respectively.

If the information of the environmental factor, i.e., the flight information is air component concentration information outside the flying object 101, the first environmental threshold and the second environmental threshold are referred to as first air component concentration threshold and second air component concentration threshold, respectively. If the information of the environmental factor is oxygen concentration information, the first environmental threshold and the second environmental threshold are referred to as first oxygen concentration threshold and second oxygen concentration threshold, respectively. If the information of the environmental factor is nitrogen concentration information, the first environmental threshold and the second environmental threshold are referred to as first nitrogen concentration threshold and second nitrogen concentration threshold, respectively. If the information of the environmental factor is carbon dioxide concentration information, the first environmental threshold and the second environmental threshold are referred to as first carbon dioxide concentration threshold and second carbon dioxide concentration threshold. If the information of the environmental factor, i.e., the flight information is outside air temperature information outside the flying object 101, the first environmental threshold and the second environmental threshold are referred to as first outside air temperature threshold and second outside air temperature threshold, respectively. If the information of the environmental factor, i.e., the flight information is radiation dose information of radiation showering to the flying object 101, the first environmental threshold and the second environmental threshold are referred to as first radiation dose threshold and second radiation dose threshold, respectively.

In operation of the flying object 101, the period of operation at a high altitude where the dose of cosmic rays showering from space is high, i.e., operation in the second flight state Sd2, is generally long as compared to an ascent period from takeoff, i.e., the period of the first flight state Sd1, and a descent period to land, i.e., the period of the third flight state Sd3. In the motor control device 100 of embodiment 1, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, so that reliability of the inverter 5 is improved. Owing to improvement in reliability of the inverter 5, the motor control device 100 of embodiment 1 is improved in reliability of the entire device.

FIG. 1 has shown the example in which the environmental detected information sigev is inputted to the control device 11. However, as shown in FIG. 19, the environmental detected information sigev may be inputted to the operating panel 23. In the case of FIG. 19, the environmental detected information sigev is inputted as the input information sighin to the operation mode judgment unit 60 of the control device 11 via the signal line 39.

FIG. 1 has shown the example in which no filters are provided between the inverter 5 and the motor 6. However, as shown in FIG. 20, a normal mode filter 9 for attenuating normal mode noise and a common mode filter 10 for attenuating common mode noise may be provided between the inverter 5 and the motor 6.

In the motor control device 100 of embodiment 1, since the DC-link voltage Vlk is reduced when the flying object 101 operates at a high altitude where the cosmic ray dose is high, the failure rate due to a single event on the semiconductor elements composing the inverter 5 during the high-altitude period can be reduced. In addition, since the high-altitude period occupies a most part of the operation cycle, the failure rate of the inverter 5 in terms of product cycle is significantly improved. This means that it is possible to use low-withstand-voltage elements without using semiconductor elements having withstand voltages higher than necessary, and the insulation parts of the inverter 5 and the motor 6 can be simplified. Thus, the motor control device 100 can be reduced in size and weight.

The LTDS against cosmic rays to the semiconductor elements composing the inverter are more influenced by a neutron beam, as described above. Examples of materials that can shield against a neutron beam include water and concrete. However, if these are used, the motor control device including the inverter is increased in size and weight. An electric device for high-altitude application such as a motor control device provided to the flying object 101 and supplied with power from the DC distribution network, is susceptible to cosmic rays. Therefore, it is important to take measures for protecting the motor control device from the influence of cosmic rays. However, if the component weight increases for shielding, energy efficiency of the flying object 101 is reduced, so that the fuel efficiency is deteriorated. In addition, in a low-air-pressure state as in a high-altitude environment where the flying object 101 operates, electric discharge is likely to occur, and therefore, it is necessary to take insulation measures for the inverter which uses high voltage and the motor which is a load, resulting in weight increase in electric devices. In contrast, in the motor control device 100 of embodiment 1, low-withstand-voltage elements can be used for the inverter 5, and the DC-link voltage Vlk is reduced during operation of the flying object 101 at a high altitude where the cosmic ray dose is high, whereby the insulation parts of the inverter 5 and the motor 6 can be simplified. Thus, the motor control device 100 can be reduced in size and weight. In the motor control device 100 of embodiment 1, voltage applied to the inverter 5 and the motor 6, i.e., the DC-link voltage Vlk is reduced during operation of the flying object 101 at a high altitude where the cosmic ray dose is high, whereby the failure rate due to a single event on the semiconductor elements composing the inverter 5 during the high-altitude period can be reduced and electric discharge in devices of the motor control device 100 can be suppressed, so that reliability of the motor control device 100 and the motor 6 is improved.

As described above, the motor control device 100 of embodiment 1 controls the motor 6 of the flying object 101 that takes off from the ground and flies. The motor control device 100 includes the step-down device 90 which receives DC power supplied from the DC distribution network 1 as input power and outputs DC power having voltage equal to or smaller than the distribution network voltage Vpn of the DC distribution network 1, the power supply device (inverter 5) which converts the DC power to AC power and outputs the AC power to the motor 6, and the control device 11 for controlling the step-down device 90 and the power supply device (inverter 5). The step-down device 90 includes the DC-output power conversion device (chopper 3) which converts the input power to DC power having voltage equal to or smaller than the distribution network voltage Vpn of the DC distribution network 1, and the output capacitor (capacitor 4) for smoothing the output voltage (DC-link voltage Vlk) of the DC-output power conversion device (chopper 3). The DC-output power conversion device (chopper 3) has the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). When the flying object 101 takes off from the ground, the control device 11 controls the DC-output power conversion device (chopper 3) in the first operation mode Md1, and when the control device 11 judges that flight information which is information of an environmental factor (environmental detected information sigev) relevant to the flight altitude of the flying object 101 satisfies a predetermined condition, the control device 11 controls the DC-output power conversion device (chopper 3) in the second operation mode Md2. With this configuration, in the motor control device 100 of embodiment 1, while the DC-output power conversion device (chopper 3) is controlled in the first operation mode Md1, when the flight information is judged to satisfy a predetermined condition, the DC-output power conversion device (chopper 3) is controlled in the second operation mode Md2. Thus, even in a case of operating at a high altitude where the cosmic ray dose is high, reliability of the motor control device is improved.

The motor control device 100 of embodiment 1 includes the environmental information detection sensor 35 for detecting the information of the environmental factor (environmental detected information sigev). Here, the case where "flight information satisfies the predetermined condition" corresponds to a case where, in a state in which the DC-output power conversion device (chopper 3) is controlled in the first operation mode Md1, the information value (detected value of environmental detected information sigev) based on the information of the environmental factor (environmental detected information sigev) has passed through the first environmental threshold (threshold X). In embodiment 1, in a state in which the DC-output power conversion device (chopper 3) is controlled in the first operation mode Md1, when the control device 11 judges that the information value (detected value of environmental detected information sigev) based on the information of the environmental factor (environmental detected information sigev) has passed through the first environmental threshold (threshold X), the control device 11 controls the DC-output power conversion device (chopper 3) in the second operation mode Md2. In embodiment 1, in a state in which the DC-output power conversion device (chopper 3) is controlled in the second operation mode Md2, when the control device 11 judges that the information value (detected value of environmental detected information sigev) based on the information of the environmental factor (environmental detected information sigev) has passed through the second environmental threshold (threshold Y), the control device 11 controls the DC-output power conversion device (chopper 3) in the first operation mode Md1.

In a case where the environmental information detection sensor 35 is the altitude sensor 21 for detecting the altitude information (detected information sig10) of the flying object 101, the control device 11 in embodiment 1 performs control as follows. In embodiment 1, in a state in which the DC-output power conversion device (chopper 3) is controlled in the first operation mode Md1, when the control device 11 judges that the detected value based on the altitude information (detected information sig10) is greater than the first altitude threshold (threshold X1) (change condition B1), the control device 11 controls the DC-output power conversion device (chopper 3) in the second operation mode Md2. In embodiment 1, in a state in which the DC-output power conversion device (chopper 3) is controlled in the second operation mode Md2, when the control device 11 judges that the detected value based on the altitude information (detected information sig10) is smaller than the second altitude threshold (threshold Y1) smaller than the first altitude threshold (threshold X1), the control device 11 controls the DC-output power conversion device (chopper 3) in the first operation mode Md1. With this configuration, in the motor control device 100 of embodiment 1, while the DC-output power conversion device (chopper 3) is controlled in the first operation mode Md1, when the flight information is judged to satisfy the predetermined condition, i.e., the change condition B1, the DC-output power conversion device (chopper 3) is controlled in the second operation mode Md2. Thus, even in a case of operating at a high altitude where the cosmic ray dose is high, reliability of the motor control device is improved.

Embodiment 2

Figure 21:
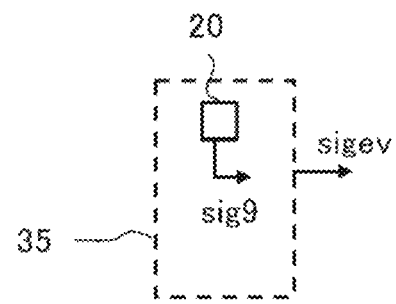
FIG. 21 shows an environmental information detection sensor according to embodiment 2.
Figure 22:
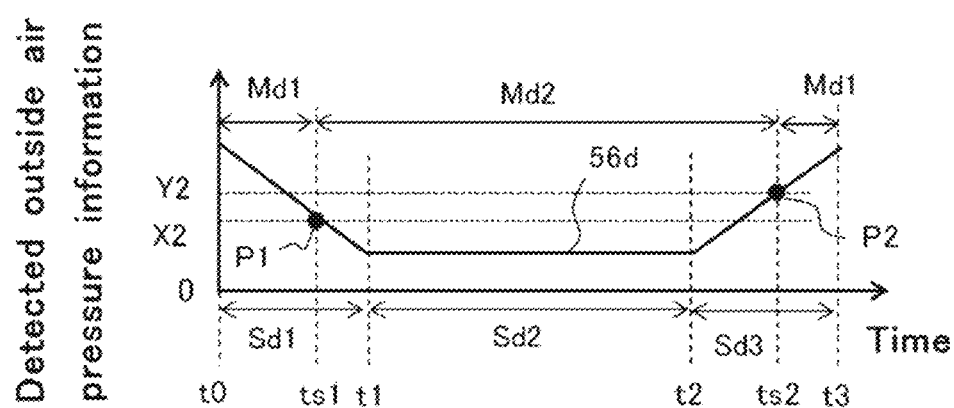
FIG. 22 shows timings for explaining operation of a motor control device according to embodiment 2.

FIG. 21 shows an environmental information detection sensor according to embodiment 2, and FIG. 22 shows timings for explaining operation of a motor control device according to embodiment 2. The motor control device 100 of embodiment 2 is different from the motor control device 100 of embodiment 1 in that the environmental information detection sensor 35 is the outside air pressure sensor 20. Differences from the motor control device 100 of embodiment 1 will be mainly described. The outside air pressure sensor 20 outputs detected information sig9 which is information of the air pressure outside the flying object 101 provided with the motor control device 100, i.e., outside air pressure information. In the case where the environmental information detection sensor 35 is the outside air pressure sensor 20, the environmental detected information sigev is the detected information sig9.

In the motor control device 100 of embodiment 2, the operation mode of the chopper 3 is changed using the outside air pressure information inputted from the outside air pressure sensor 20. It is assumed that the flight altitude of the aircraft which is the flying object 101 provided with the motor control device 100 changes as in the flight altitude characteristics 58 shown in FIG. 8. When the flight altitude becomes high, the air pressure becomes low, and when the flight altitude becomes low, the air pressure becomes high. Therefore, the flight altitude can be estimated from outside air pressure information. In many aircrafts, an altitude instrument having an altimeter using outside air pressure information is mounted in a cockpit. In a case where the flight altitude changes as in the flight altitude characteristics 58 shown in FIG. 8, the detected outside air pressure information characteristics 56*d* exhibit change as shown in FIG. 22, and the DC-link voltage Vlk of the chopper 3 changes as in the DC-link voltage characteristics 59 shown in FIG. 10 or the DC-link voltage characteristics 99 shown in FIG. 11. In FIG. 22, the horizontal axis indicates time, and the vertical axis indicates the detected outside air pressure information.

In the first flight state Sd1, when the detected outside air pressure information inputted from the outside air pressure sensor 20 indicates a value lower than the threshold X2, the control device 11 changes the operation mode to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage.

When the detected outside air pressure information becomes lower than the threshold X2 at time ts1, the DC-link voltage Vlk changes from the step-down voltage Vdh or the distribution network voltage Vpn which is the first voltage to the step-down voltage Vdl which is the second voltage, at time ts1. In the second flight state Sd2 from time t1 to time t2, the control device 11 keeps the low voltage operation of the chopper 3. During operation in the second operation mode Md2, i.e., the low voltage mode, if, in the third flight state Sd3, the detected outside air pressure information inputted from the outside air pressure sensor 20 indicates a value exceeding the threshold Y2, the control device 11 changes the operation mode to the first operation mode Md1, i.e., the high voltage mode, to start high voltage operation of the chopper 3, thus increasing the DC-link voltage Vlk to the step-down voltage Vdh or the distribution network voltage Vpn which is the first voltage. When the detected outside air pressure information exceeds the threshold Y2 at time ts2, the DC-link voltage Vlk changes from the step-down voltage Vdl which is the second voltage to the step-down voltage Vdh or the distribution network voltage Vpn which is the first voltage, at time ts2.

A unit of the detected outside air pressure information may be a unit representing a pressure, such as pascal or millimeter of mercury, or may be a unit that can be compared by a relative value as in a PU system. In embodiment 2, the threshold X2 is lower than the threshold Y2. A point where the detected outside air pressure information in the detected outside air pressure information characteristics 56d in the first flight state Sd1 becomes the threshold X2 is a mode change point P1, and a point where the detected outside air pressure information in the detected outside air pressure information characteristics 56d in the third flight state Sd3 becomes the threshold Y2 is a mode change point P2.

Since the detected outside air pressure information characteristics 56d have a downward convex shape, the operation mode judgment unit 60 of the control device 11 operates as in the flowchart in the second example shown in FIG. 16 or the flowchart in the fourth example shown in FIG. 18. The thresholds X and Y in the flowchart in the second example and the flowchart in the fourth example are replaced with the thresholds X2 and Y2.

The motor control device 100 of embodiment 2 is the same as the motor control device 100 of embodiment 1 except that the environmental information detection sensor 35 is the outside air pressure sensor 20. Therefore, the same effects as in the motor control device 100 of embodiment 1 are provided. In the motor control device 100 of embodiment 2, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved.

As described above, the motor control device 100 of embodiment 2 includes the step-down device 90, the power supply device (inverter 5), the control device 11, and the outside air pressure sensor 20 for detecting outside air pressure information (detected information sig9) outside the flying object 101. The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). In embodiment 2, in a state in which the DC-output power conversion device (chopper 3) is controlled in the first operation mode Md1, when the control device 11 judges that the detected value based on the outside air pressure information (detected information sig9) is smaller than the first outside air pressure threshold (threshold X2) (change condition B2), the control device 11 controls the DC-output power conversion device (chopper 3) in the second operation mode Md2. In embodiment 2, in a state in which the DC-output power conversion device (chopper 3) is controlled in the second operation mode Md2, when the control device 11 judges that the detected value based on the outside air pressure information (detected information sig9) is greater than the second outside air pressure threshold (threshold Y2) greater than the first outside air pressure threshold (threshold X2), the control device 11 controls the DC-output power conversion device in the first operation mode. With this configuration, in the motor control device 100 of embodiment 2, while the DC-output power conversion device (chopper 3) is controlled in the first operation mode Md1, when the flight information is judged to satisfy the predetermined condition, i.e., the change condition B2, the DC-output power conversion device (chopper 3) is controlled in the second operation mode Md2. Thus, even in a case of operating at a high altitude where the cosmic ray dose is high, reliability of the motor control device is improved.

Embodiment 3

Figure 23:
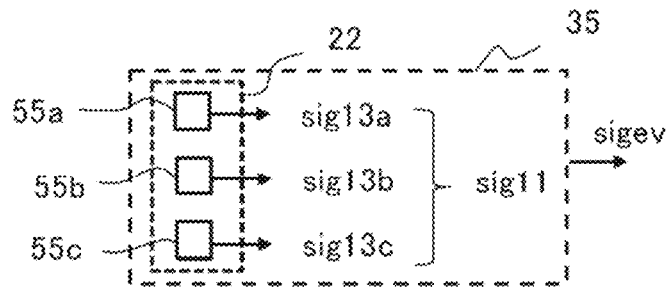
FIG. 23 shows an environmental information detection sensor according to embodiment 3.
Figure 24:
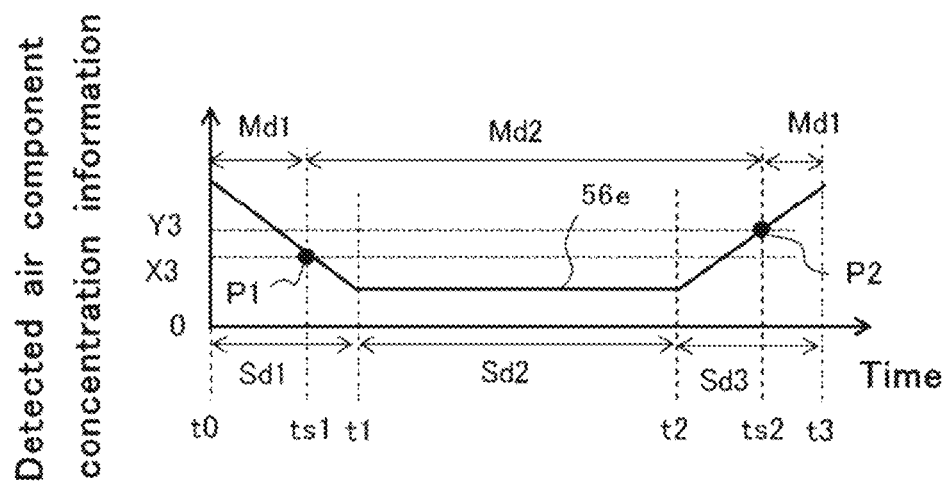
FIG. 24 shows timings for explaining operation of a motor control device according to embodiment 3.
Figure 25:
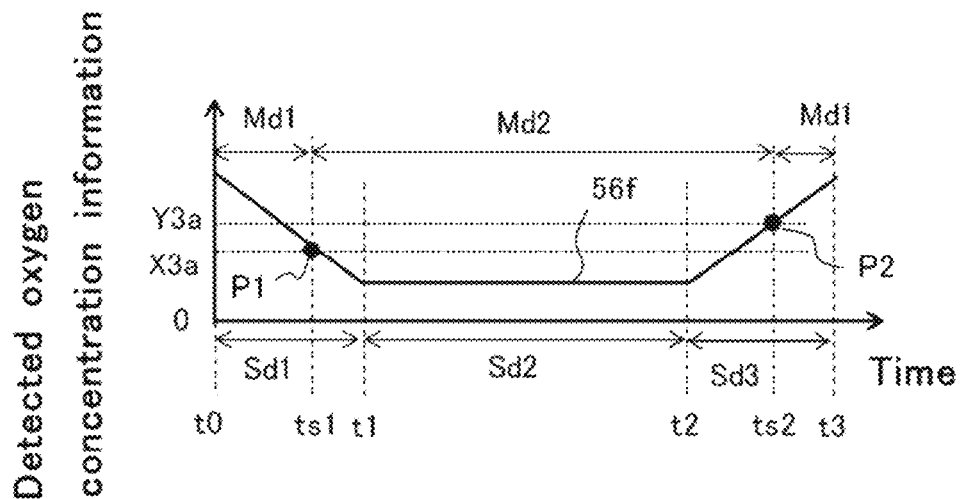
FIG. 25 shows timings in a first example of detected air component concentration information according to embodiment 3.
Figure 26:
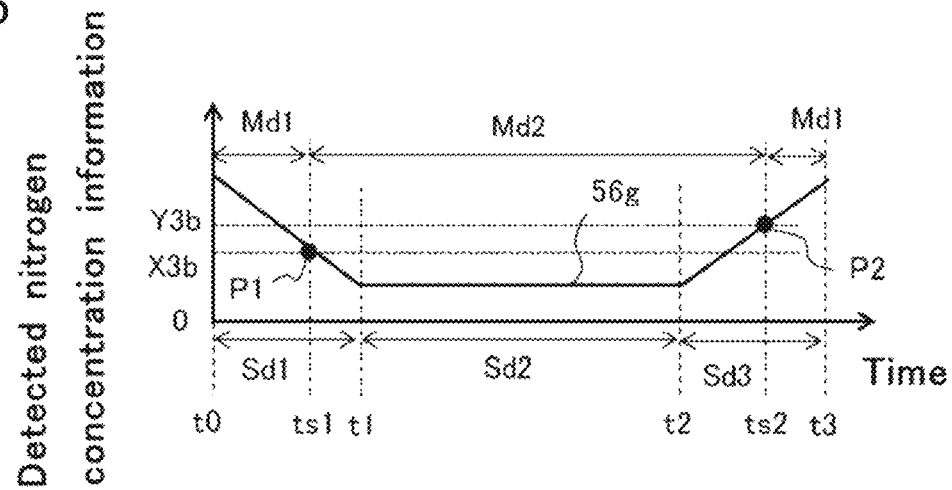
FIG. 26 shows timings in a second example of detected air component concentration information according to embodiment 3.
Figure 27:
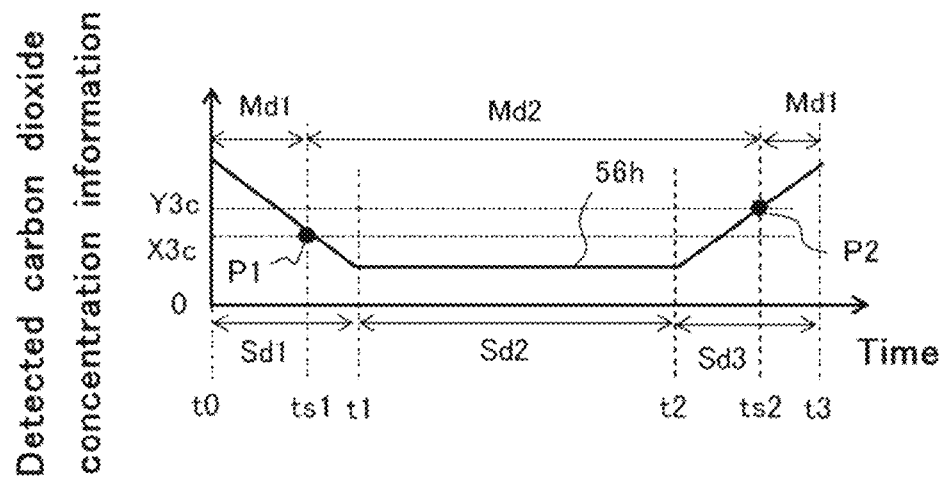
FIG. 27 shows timings in a third example of detected air component concentration information according to embodiment 3.

FIG. 23 shows an environmental information detection sensor according to embodiment 3, and FIG. 24 shows timings for explaining operation of a motor control device according to embodiment 3. FIG. 25, FIG. 26, and FIG. 27 respectively show timings in a first example, a second example, and a third example of detected air component concentration information according to embodiment 3. The motor control device 100 of embodiment 3 is different from the motor control device 100 of embodiment 1 in that the environmental information detection sensor 35 is the air component concentration sensor 22. Differences from the motor control device 100 of embodiment 1 will be mainly described. The air component concentration sensor 22 outputs detected information sigh 1 which is information of the air component concentration outside the flying object 101 provided with the motor control device 100, i.e., air component concentration information. In the case where the environmental information detection sensor 35 is the air component concentration sensor 22, the environmental detected information sigev is the detected information sig11. The air component concentration is, for example, an oxygen concentration, a nitrogen concentration, or a carbon dioxide concentration. In the troposphere where the aircraft generally flies, the gas component ratio in the air is not influenced by the altitude and the air pressure. Therefore, not only the oxygen concentration but also the concentration of another substance contained in the air such as nitrogen or carbon dioxide may be used to change the operation mode of the chopper 3.

In a case where the oxygen concentration sensor 55a is used as a specific example of the air component concentration sensor 22, the detected information sigh 1 is detected information sig13a, and the environmental detected information sigev is the detected information sig13a. In a case where the nitrogen concentration sensor 55b is used as a specific example of the air component concentration sensor 22, the detected information sig11 is detected information sig13b, and the environmental detected information sigev is the detected information sig13b. In a case where the carbon dioxide concentration sensor 55c is used as a specific example of the air component concentration sensor 22, the detected information sigh 11 is detected information sig13c, and the environmental detected information sigev is the detected information sig13c.

In the motor control device 100 of embodiment 3, the operation mode of the chopper 3 is changed using the air component concentration information inputted from the air component concentration sensor 22. It is assumed that the flight altitude of the aircraft which is the flying object 101 provided with the motor control device 100 changes as in the flight altitude characteristics 58 shown in FIG. 8. When the flight altitude becomes high, the air pressure becomes low, so that the air component concentration of oxygen, nitrogen, carbon dioxide, or the like becomes low. When the flight altitude becomes low, the air pressure becomes high, so that the air component concentration of oxygen, nitrogen, carbon dioxide, or the like becomes high. Thus, the air component concentration information changes in accordance with the flight altitude, and therefore the flight altitude can be estimated from the air component concentration information. In a case where the flight altitude changes as in the flight altitude characteristics 58 shown in FIG. 8, detected air component concentration information characteristics 56e exhibit change as shown in FIG. 24, and the DC-link voltage Vlk of the chopper 3 changes as in the DC-link voltage characteristics 59 shown in FIG. 10 or the DC-link voltage characteristics 99 shown in FIG. 11. In FIG. 24, the horizontal axis indicates time, and the vertical axis indicates the detected air component concentration information.

In a case where the oxygen concentration sensor 55a is used as a specific example of the air component concentration sensor 22, the detected air component concentration information characteristics 56e are detected oxygen concentration information characteristics 56f. In a case where the nitrogen concentration sensor 55b is used as a specific example of the air component concentration sensor 22, the detected air component concentration information characteristics 56e are detected nitrogen concentration information characteristics 56g. In a case where the carbon dioxide concentration sensor 55c is used as a specific example of the air component concentration sensor 22, the detected air component concentration information characteristics 56e are detected carbon dioxide concentration information characteristics 56h. In FIG. 25, FIG. 26, and FIG. 27, the horizontal axes indicate time. In FIG. 25, FIG. 26, and FIG. 27, the vertical axes indicate the detected oxygen concentration information, the detected nitrogen concentration information, and the detected carbon dioxide concentration information, respectively.

In the first flight state Sd1, when the detected air component concentration information inputted from the air component concentration sensor 22 indicates a value lower than the threshold X3, the control device 11 changes the operation mode to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage. When the detected air component concentration information becomes lower than the threshold X3 at time ts1, the DC-link voltage Vlk changes from the step-down voltage Vdh or the distribution network voltage Vpn which is the first voltage to the step-down voltage Vdl which is the second voltage, at time ts1. The control device 11 keeps the low voltage operation of the chopper 3 in the second flight state Sd2 from time t1 to time t2. During operation in the second operation mode Md2, i.e., the low voltage mode, if, in the third flight state Sd3, the detected air component concentration information inputted from the air component concentration sensor 22 indicates a value exceeding the threshold Y3, the control device 11 changes the operation mode to the first operation mode Md1, i.e., the high voltage mode, to start high voltage operation of the chopper 3, thus increasing the DC-link voltage Vlk to the step-down voltage Vdh or the distribution network voltage Vpn which is the first voltage. When the detected air component concentration information exceeds the threshold Y3 at time ts2, the DC-link voltage Vlk changes from the step-down voltage Vdl which is the second voltage to the step-down voltage Vdh or the distribution network voltage Vpn which is the first voltage, at time ts2.

A unit of the detected air component concentration information may be a unit representing a gas concentration, such as percent or mole per liter, or may be a unit that can be compared by a relative value as in a PU system. In embodiment 3, the threshold X3 is lower than the threshold Y3. In the case of detected oxygen concentration information which is a specific example of the detected air component concentration information, the threshold X3a is lower than the threshold Y3a. In the case of detected nitrogen concentration information, the threshold X3b is lower than the threshold Y3b, and in the case of detected carbon dioxide concentration information, the threshold X3c is lower than the threshold Y3c. A point where the detected air component concentration information in the detected air component concentration information characteristics 56e in the first flight state Sd1 becomes the threshold X3 is a mode change point P1, and a point where the detected air component concentration information in the detected air component concentration information characteristics 56e in the third flight state Sd3 becomes the threshold Y3 is a mode change point P2. The same applies to the detected oxygen concentration information, the detected nitrogen concentration information, and the detected carbon dioxide concentration information which are specific examples of the detected air component concentration information. A point where the detected oxygen concentration information in the detected oxygen concentration information characteristics 56f in the first flight state Sd1 becomes the threshold X3a is a mode change point P1, and a point where the detected oxygen concentration information in the detected oxygen concentration information characteristics 56f in the third flight state Sd3 becomes the threshold Y3a is a mode change point P2. A point where the detected nitrogen concentration information in the detected nitrogen concentration information characteristics 56g in the first flight state Sd1 becomes the threshold X3b is a mode change point P1, and a point where the detected nitrogen concentration information in the detected nitrogen concentration information characteristics 56g in the third flight state Sd3 becomes the threshold Y3b is a mode change point P2. A point where the detected carbon dioxide concentration information in the detected carbon dioxide concentration information characteristics 56h in the first flight state Sd1 becomes the threshold X3c is a mode change point P1, and a point where the detected carbon dioxide concentration information in the detected carbon dioxide concentration information characteristics 56h in the third flight state Sd3 becomes the threshold Y3c is a mode change point P2.

Since the detected air component concentration information characteristics 56e have a downward convex shape, the operation mode judgment unit 60 of the control device 11 operates as in the flowchart in the second example shown in FIG. 16 or the flowchart in the fourth example shown in FIG. 18. The thresholds X and Y in the flowchart in the second example and the flowchart in the fourth example are replaced with the thresholds X3 and Y3. In the case of detected oxygen concentration information which is a specific example of the detected air component concentration information, the thresholds X and Y in the flowchart in the second example and the flowchart in the fourth example are replaced with the thresholds X3a and Y3a. In the case of detected nitrogen concentration information which is a specific example of the detected air component concentration information, the thresholds X and Y in the flowchart in the second example and the flowchart in the fourth example are replaced with the thresholds X3b and Y3b. In the case of detected carbon dioxide concentration information which is a specific example of the detected air component concentration information, the thresholds X and Y in the flowchart in the second example and the flowchart in the fourth example are replaced with the thresholds X3c and Y3c.

The motor control device 100 of embodiment 3 is the same as the motor control device 100 of embodiment 1 except that the air component concentration sensor 22 such as the oxygen concentration sensor 55a, the nitrogen concentration sensor 55b, or the carbon dioxide concentration sensor 55c is the environmental information detection sensor 35. Therefore, the same effects as in the motor control device 100 of embodiment 1 are provided. In the motor control device 100 of embodiment 3, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved.

In embodiment 3, the example in which the operation mode of the chopper 3 is changed through detection of the air component concentration, has been described. However, instead of the air component concentration, an air component density may be used. In this case, "concentration" is replaced with "density. That is, the detected air component concentration information is replaced with detected air component density information. The air component concentration sensor denoted by reference character 22 is replaced with an air component density sensor. The oxygen concentration sensor denoted by reference character 55a is replaced with an oxygen density sensor, the nitrogen concentration sensor denoted by reference character 55b is replaced with a nitrogen density sensor, and the carbon dioxide concentration sensor denoted by reference character 55c is replaced with a carbon dioxide density sensor. A unit of the detected air component density information may be a unit representing a gas density, such as percent or gram per cubic meter, or may be a unit that can be compared by a relative value as in a PU system. Specific examples of the detected air component density information are detected oxygen density information, detected nitrogen density information, and detected carbon dioxide density information. In the motor control device 100 of embodiment 3, the same effects are provided even in a case where the detected air component concentration information such as detected oxygen concentration information, detected nitrogen concentration information, or detected carbon dioxide concentration information is replaced with the detected air component density information such as detected oxygen density information, detected nitrogen density information, or detected carbon dioxide density information.

As described above, the motor control device 100 of embodiment 3 includes the step-down device 90, the power supply device (inverter 5), the control device 11, and the air component concentration sensor 22 for detecting air component concentration information (detected information sign) outside the flying object 101. The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). In embodiment 3, in a state in which the DC-output power conversion device (chopper 3) is controlled in the first operation mode Md1, when the control device 11 judges that the detected value based on the air component concentration information (detected information sign) is smaller than the first air component concentration threshold (threshold X3) (change condition B3), the control device 11 controls the DC-output power conversion device (chopper 3) in the second operation mode Md2. In embodiment 3, in a state in which the DC-output power conversion device (chopper 3) is controlled in the second operation mode Md2, when the control device 11 judges that the detected value based on the air component concentration information (detected information sign) is greater than the second air component concentration threshold (threshold Y3) greater than the first air component concentration threshold (threshold X3), the control device 11 controls the DC-output power conversion device (chopper 3) in the first operation mode Md1. With this configuration, in the motor control device 100 of embodiment 3, while the DC-output power conversion device (chopper 3) is controlled in the first operation mode Md1, when the flight information is judged to satisfy the predetermined condition, i.e., the change condition B3, the DC-output power conversion device (chopper 3) is controlled in the second operation mode Md2. Thus, even in a case of operating at a high altitude where the cosmic ray dose is high, reliability of the motor control device is improved.

Embodiment 4

Figure 28:
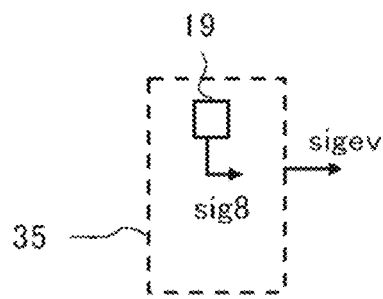
FIG. 28 shows an environmental information detection sensor according to embodiment 4.
Figure 29:
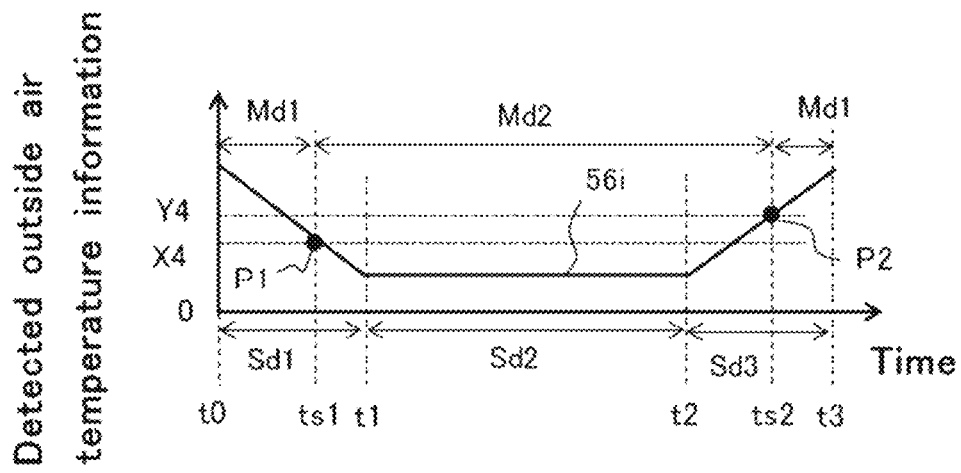
FIG. 29 shows timings for explaining operation of a motor control device according to embodiment 4.

FIG. 28 shows an environmental information detection sensor according to embodiment 4, and FIG. 29 shows timings for explaining operation of a motor control device according to embodiment 4. The motor control device 100 of embodiment 4 is different from the motor control device 100 of embodiment 1 in that the environmental information detection sensor 35 is the outside air temperature sensor 19. Differences from the motor control device 100 of embodiment 1 will be mainly described. The outside air temperature sensor 19 outputs detected information sig8 which is information of the air temperature outside the flying object 101 provided with the motor control device 100, i.e., outside air temperature information. In the case where the environmental information detection sensor 35 is the outside air temperature sensor 19, the environmental detected information sigev is the detected information sig8.

In the motor control device 100 of embodiment 4, the operation mode of the chopper 3 is changed using the outside air temperature information inputted from the outside air temperature sensor 19. It is assumed that the flight altitude of the aircraft which is the flying object 101 provided with the motor control device 100 changes as in the flight altitude characteristics 58 shown in FIG. 8. In the troposphere where the aircraft generally flies, when the flight altitude becomes high, the outside air temperature becomes low, and when the flight altitude becomes low, the outside air temperature becomes high. Therefore, the flight altitude can be estimated from the temperature on the ground and the outside air temperature information. In a case where the flight altitude changes as in the flight altitude characteristics 58 shown in FIG. 8, detected outside air temperature information characteristics 56i exhibit change as shown in FIG. 29, and the DC-link voltage Vlk of the chopper 3 changes as in the DC-link voltage characteristics 59 shown in FIG. 10 or the DC-link voltage characteristics 99 shown in FIG. 11. In FIG. 29, the horizontal axis indicates time, and the vertical axis indicates the detected outside air temperature information.

In the first flight state Sd1, when the detected outside air temperature information inputted from the outside air temperature sensor 19 indicates a value lower than the threshold X4, the control device 11 changes the operation mode to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage. When the detected outside air temperature information becomes lower than the threshold X4 at time ts1, the DC-link voltage Vlk changes from the step-down voltage Vdh or the distribution network voltage Vpn which is the first voltage to the step-down voltage Vdl which is the second voltage, at time ts1. The control device 11 keeps the low voltage operation of the chopper 3 in the second flight state Sd2 from time t1 to time t2. During operation in the second operation mode Md2, i.e., the low voltage mode, if, in the third flight state Sd3, the detected outside air temperature information inputted from the outside air temperature sensor 19 indicates a value exceeding the threshold Y4, the control device 11 changes the operation mode to the first operation mode Md1, i.e., the high voltage mode, to start high voltage operation of the chopper 3, thus increasing the DC-link voltage Vlk to the step-down voltage Vdh or the distribution network voltage Vpn which is the first voltage. When the detected outside air temperature information exceeds the threshold Y4 at time ts2, the DC-link voltage Vlk changes from the step-down voltage Vdl which is the second voltage to the step-down voltage Vdh or the distribution network voltage Vpn which is the first voltage, at time ts2.

A unit of the detected outside air temperature information may be degree Fahrenheit, degree Celsius, or another unit representing a temperature, or may be a unit that can be compared by a relative value as in a PU system. In embodiment 4, the threshold X4 is lower than the threshold Y4. A point where the detected outside air temperature information in the detected outside air temperature information characteristics 56i in the first flight state Sd1 becomes the threshold X4 is a mode change point P1, and a point where the detected outside air temperature information in the detected outside air temperature information characteristics 56i in the third flight state Sd3 becomes the threshold Y4 is a mode change point P2.

Since the detected outside air temperature information characteristics 56i have a downward convex shape, the operation mode judgment unit 60 of the control device 11 operates as in the flowchart in the second example shown in FIG. 16 or the flowchart in the fourth example shown in FIG. 18. The thresholds X and Y in the flowchart in the second example and the flowchart in the fourth example are replaced with the thresholds X4 and Y4.

The motor control device 100 of embodiment 4 is the same as the motor control device 100 of embodiment 1 except that the environmental information detection sensor 35 is the outside air temperature sensor 19. Therefore, the same effects as in the motor control device 100 of embodiment 1 are provided. In the motor control device 100 of embodiment 4, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved.

As described above, the motor control device 100 of embodiment 4 includes the step-down device 90, the power supply device (inverter 5), the control device 11, and the outside air temperature sensor 19 for detecting outside air temperature information (detected information sig8) outside the flying object 101. The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). In embodiment 4, in a state in which the DC-output power conversion device (chopper 3) is controlled in the first operation mode Md1, when the control device 11 judges that the detected value based on the outside air temperature information (detected information sig8) is smaller than the first outside air temperature threshold (threshold X4) (change condition B4), the control device 11 controls the DC-output power conversion device (chopper 3) in the second operation mode Md2. In embodiment 4, in a state in which the DC-output power conversion device (chopper 3) is controlled in the second operation mode Md2, when the control device 11 judges that the detected value based on the outside air temperature information (detected information sig8) is greater than the second outside air temperature threshold (threshold Y4) greater than the first outside air temperature threshold (threshold X4), the control device 11 controls the DC-output power conversion device (chopper 3) in the first operation mode Md1. With this configuration, in the motor control device 100 of embodiment 4, while the DC-output power conversion device (chopper 3) is controlled in the first operation mode Md1, when the flight information is judged to satisfy the predetermined condition, i.e., the change condition B4, the DC-output power conversion device (chopper 3) is controlled in the second operation mode Md2. Thus, even in a case of operating at a high altitude where the cosmic ray dose is high, reliability of the motor control device is improved.

Embodiment 5

Figure 30:
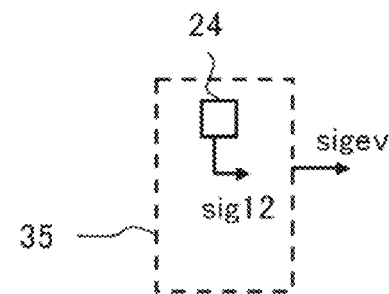
FIG. 30 shows an environmental information detection sensor according to embodiment 5.
Figure 31:
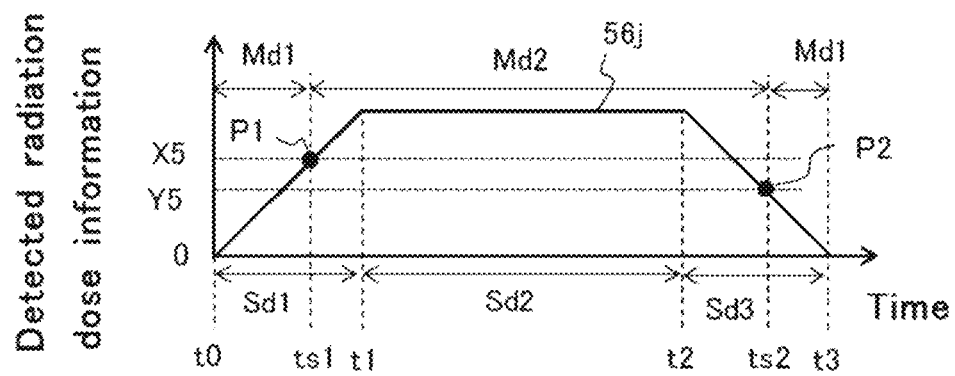
FIG. 31 shows timings for explaining operation of a motor control device according to embodiment 5.

FIG. 30 shows an environmental information detection sensor according to embodiment 5, and FIG. 31 shows timings for explaining operation of a motor control device according to embodiment 5. The motor control device 100 of embodiment 5 is different from the motor control device 100 of embodiment 1 in that the environmental information detection sensor 35 is the radiation sensor 24. Differences from the motor control device 100 of embodiment 1 will be mainly described. The radiation sensor 24 outputs detected information sig12 which is information of the radiation dose outside or inside the flying object 101 provided with the motor control device 100, i.e., radiation dose information. In the case where the environmental information detection sensor 35 is the radiation sensor 24, the environmental detected information sigev is the detected information sig12.

In the motor control device 100 of embodiment 5, the operation mode of the chopper 3 is changed using the radiation dose information inputted from the radiation sensor 24. It is assumed that the flight altitude of the aircraft which is the flying object 101 provided with the motor control device 100 changes as in the flight altitude characteristics 58 shown in FIG. 8. In the troposphere where the aircraft generally flies, the dose of cosmic rays (i.e., the radiation dose) showering from space has characteristics that, when the flight altitude becomes high, the radiation dose becomes high, and when the flight altitude becomes low, the radiation dose becomes low. Thus, since the radiation dose information changes in accordance with the flight altitude, the flight altitude can be estimated from the radiation dose information. In a case where the flight altitude changes as in the flight altitude characteristics 58 shown in FIG. 8, detected radiation dose information characteristics 56j exhibit change as shown in FIG. 31, and the DC-link voltage Vlk of the chopper 3 changes as in the DC-link voltage characteristics 59 shown in FIG. 10 or the DC-link voltage characteristics 99 shown in FIG. 11. In FIG. 31, the horizontal axis indicates time, and the vertical axis indicates the detected radiation dose information.

In the first flight state Sd1, when the detected radiation dose information inputted from the radiation sensor 24 indicates a value higher than the threshold X5, the control device 11 changes the operation mode to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage. When the detected radiation dose information becomes higher than the threshold X5 at time ts1, the DC-link voltage Vlk changes from the step-down voltage Vdh or the distribution network voltage Vpn which is the first voltage to the step-down voltage Vdl which is the second voltage, at time ts1. The control device 11 keeps the low voltage operation of the chopper 3 in the second flight state Sd2 from time t1 to time t2. During operation in the second operation mode Md2, i.e., the low voltage mode, if, in the third flight state Sd3, the detected radiation dose information inputted from the radiation sensor 24 indicates a value lower than the threshold Y5, the control device 11 changes the operation mode to the first operation mode Md1, i.e., the high voltage mode, to start high voltage operation of the chopper 3, thus increasing the DC-link voltage Vlk to the step-down voltage Vdh or the distribution network voltage Vpn which is the first voltage. When the detected radiation dose information becomes lower than the threshold Y5 at time ts2, the DC-link voltage Vlk changes from the step-down voltage Vdl which is the second voltage to the step-down voltage Vdh or the distribution network voltage Vpn which is the first voltage, at time ts2.

A unit of the detected radiation dose information may be a unit representing a radiation dose, such as sievert or gray, or may be a unit that can be compared by a relative value as in a PU system. In embodiment 5, the threshold X5 is higher than the threshold Y5. A point where the detected radiation dose information in the detected radiation dose information characteristics 56j in the first flight state Sd1 becomes the threshold X5 is a mode change point P1, and a point where the detected radiation dose information in the detected radiation dose information characteristics 56j in the third flight state Sd3 becomes the threshold Y5 is a mode change point P2.

Since the detected radiation dose information characteristics 56j have an upward convex shape, the operation mode judgment unit 60 of the control device 11 operates as in the flowchart in the first example shown in FIG. 15 or the flowchart in the third example shown in FIG. 17. The thresholds X and Y in the flowchart in the first example and the flowchart in the third example are replaced with the thresholds X5 and Y5.

The motor control device 100 of embodiment 5 is the same as the motor control device 100 of embodiment 1 except that the environmental information detection sensor 35 is the radiation sensor 24. Therefore, the same effects as in the motor control device 100 of embodiment 1 are provided. In the motor control device 100 of embodiment 5, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved.

As described above, the motor control device 100 of embodiment 5 includes the step-down device 90, the power supply device (inverter 5), the control device 11, and the radiation sensor 24 for detecting radiation dose information (detected information sig12) of radiation showering to the flying object 101. The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). In embodiment 5, in a state in which the DC-output power conversion device (chopper 3) is controlled in the first operation mode Md1, when the control device 11 judges that the detected value based on the radiation dose information (detected information sig12) is greater than the first radiation dose threshold (threshold X5) (change condition B5), the control device 11 controls the DC-output power conversion device (chopper 3) in the second operation mode Md2. In embodiment 5, in a state in which the DC-output power conversion device (chopper 3) is controlled in the second operation mode Md2, when the control device 11 judges that the detected value based on the radiation dose information (detected information sig12) is smaller than the second radiation dose threshold (threshold Y5) smaller than the first radiation dose threshold (threshold X5), the control device 11 controls the DC-output power conversion device (chopper 3) in the first operation mode Md1. With this configuration, in the motor control device 100 of embodiment 5, while the DC-output power conversion device (chopper 3) is controlled in the first operation mode Md1, when the flight information is judged to satisfy the predetermined condition, i.e., the change condition B5, the DC-output power conversion device (chopper 3) is controlled in the second operation mode Md2. Thus, even in a case of operating at a high altitude where the cosmic ray dose is high, reliability of the motor control device is improved.

Embodiment 6

Figure 32:
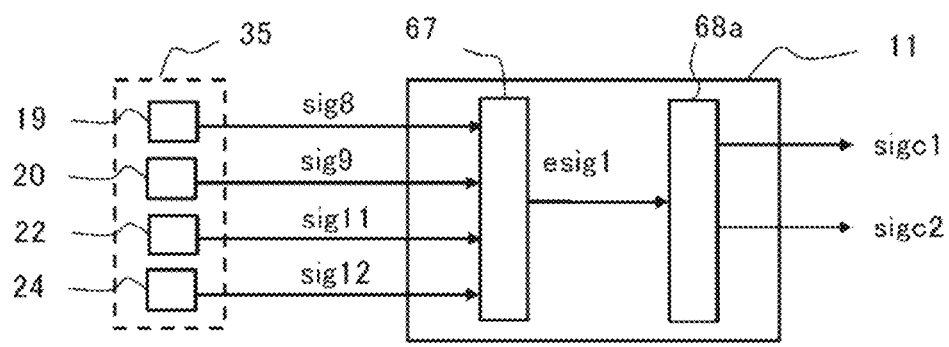
FIG. 32 shows the configuration of a control device according to embodiment 6.
Figure 33:
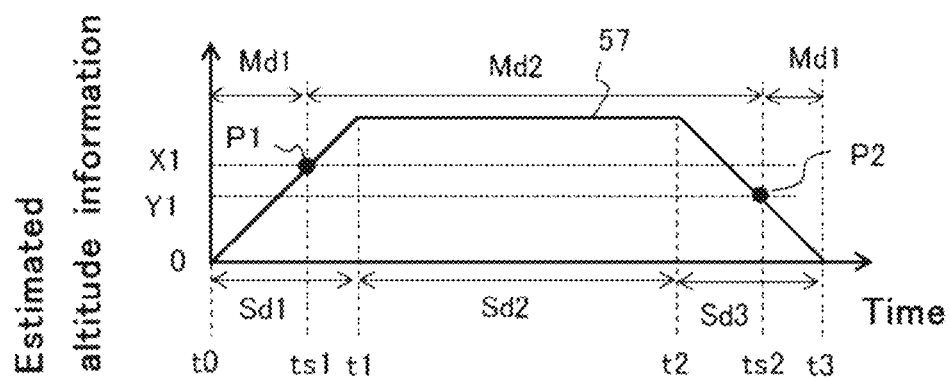
FIG. 33 shows timings for explaining operation of a motor control device according to embodiment 6.

FIG. 32 shows the configuration of a control device according to embodiment 6, and FIG. 33 shows timings for explaining operation of a motor control device according to embodiment 6. The motor control device 100 of embodiment 6 is different from the motor control device 100 of embodiment 1 in that the environmental information detection sensor 35 is any of the outside air temperature sensor 19, the outside air pressure sensor 20, the air component concentration sensor 22, or the radiation sensor 24, and the control device 11 further includes an altitude estimation unit 67. Differences from the motor control device 100 of embodiment 1 will be mainly described. On the basis of the environmental detected information sigev such as the detected information sig8, sig9, sig11, sig12, the altitude estimation unit 67 estimates the altitude, and outputs estimated altitude information esig1. The operation mode judgment unit 60 of the control signal generation unit 68a performs judgment about two operation modes of the chopper 3, using the estimated altitude information esig1 as the input information sighin, and outputs the operation mode signal msig.

In the motor control device 100 of embodiment 6, the operation mode of the chopper 3 is changed using the estimated altitude information estimated by the altitude estimation unit 67. It is assumed that the flight altitude of the aircraft which is the flying object 101 provided with the motor control device 100 changes as in the flight altitude characteristics 58 shown in FIG. 8. Since the outside air pressure information changes in accordance with the flight altitude as described in embodiment 2, the flight altitude can be estimated from the outside air pressure information. In addition, since the air component concentration information, the outside air temperature information, and the radiation dose information change in accordance with the flight altitude as described in embodiments 3 to 5, the flight altitude can be estimated from the air component concentration information, the outside air temperature information, or the radiation dose information. In a case where the flight altitude changes as in the flight altitude characteristics 58 shown in FIG. 8, estimated altitude information characteristics 57 exhibit change as shown in FIG. 33, and the DC-link voltage Vlk of the chopper 3 changes as in the DC-link voltage characteristics 59 shown in FIG. 10 or the DC-link voltage characteristics 99 shown in FIG. 11. In FIG. 33, the horizontal axis indicates time, and the vertical axis indicates the estimated altitude information.

In the first flight state Sd1, when the estimated altitude information estimated by the altitude estimation unit 67 indicates a value higher than the threshold X1, the control device 11 changes the operation mode to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage. When the estimated altitude information becomes higher than the threshold X1 at time ts1, the DC-link voltage Vlk changes from the step-down voltage Vdh or the distribution network voltage Vpn which is the first voltage to the step-down voltage Vdl which is the second voltage, at time ts1. The control device 11 keeps the low voltage operation of the chopper 3 in the second flight state Sd2 from time t1 to time t2. During operation in the second operation mode Md2, i.e., the low voltage mode, if, in the third flight state Sd3, the estimated altitude information indicates a value lower than the threshold Y1, the control device 11 changes the operation mode to the first operation mode Md1, i.e., the high voltage mode, to start high voltage operation of the chopper 3, thus increasing the DC-link voltage Vlk to the step-down voltage Vdh or the distribution network voltage Vpn which is the first voltage. When the estimated altitude information becomes lower than the threshold Y1 at time ts2, the DC-link voltage Vlk changes from the step-down voltage Vdl which is the second voltage to the step-down voltage Vdh or the distribution network voltage Vpn which is the first voltage, at time ts2.

Since the estimated altitude information characteristics 57 have an upward convex shape, the operation mode judgment unit 60 of the control device 11 operates as in the flowchart in the first example shown in FIG. 15 or the flowchart in the third example shown in FIG. 17. The thresholds X and Y in the flowchart in the first example and the flowchart in the third example are replaced with the thresholds X1 and Y1. It is noted that, since the estimated altitude information is information obtained by estimating the altitude information, the thresholds X1 and Y1 for the altitude information are used.

The motor control device 100 of embodiment 6 is the same as the motor control device 100 of embodiment 1 except that the environmental information detection sensor 35 is any of the outside air temperature sensor 19, the outside air pressure sensor 20, the air component concentration sensor 22, or the radiation sensor 24, and the control device 11 further includes the altitude estimation unit 67. Therefore, the same effects as in the motor control device 100 of embodiment 1 are provided. In the motor control device 100 of embodiment 6, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved.

As described above, the motor control device 100 of embodiment 6 includes the step-down device 90, the power supply device (inverter 5), the control device 11, and the environmental information detection sensor 35 for detecting information of an environmental factor (environmental detected information sigev). The environmental information detection sensor 35 is any of the outside air pressure sensor 20 for detecting the outside air pressure information (detected information sig9) outside the flying object 101, the air component concentration sensor 22 for detecting the air component concentration information (detected information sign) outside the flying object 101, the outside air temperature sensor 19 for detecting the outside air temperature information (detected information sig8) outside the flying object 101, or the radiation sensor 24 for detecting the radiation dose information (detected information sig12) of radiation showering to the flying object 101. The information of the environmental factor is the estimated altitude information esig1 obtained by estimating the altitude from any of the outside air pressure information (detected information sig9), the air component concentration information (detected information sig11), the outside air temperature information (detected information sig8), or the radiation dose information (detected information sig12) detected by the environmental information detection sensor 35. The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). In embodiment 6, in a state in which the DC-output power conversion device (chopper 3) is controlled in the first operation mode Md1, when the control device 11 judges that the estimated value based on the estimated altitude information esig1 is greater than the first altitude threshold (threshold X1) (change condition B6), the control device 11 controls the DC-output power conversion device (chopper 3) in the second operation mode Md2. In embodiment 6, in a state in which the DC-output power conversion device (chopper 3) is controlled in the second operation mode Md2, when the control device 11 judges that the estimated value based on the estimated altitude information esig1 is smaller than the second altitude threshold (threshold Y1) smaller than the first altitude threshold (threshold X1), the control device 11 controls the DC-output power conversion device (chopper 3) in the first operation mode Md1. With this configuration, in the motor control device 100 of embodiment 6, while the DC-output power conversion device (chopper 3) is controlled in the first operation mode Md1, when the flight information is judged to satisfy the predetermined condition, i.e., the change condition B6, the DC-output power conversion device (chopper 3) is controlled in the second operation mode Md2. Thus, even in a case of operating at a high altitude where the cosmic ray dose is high, reliability of the motor control device is improved.

Embodiment 7

Figure 34:
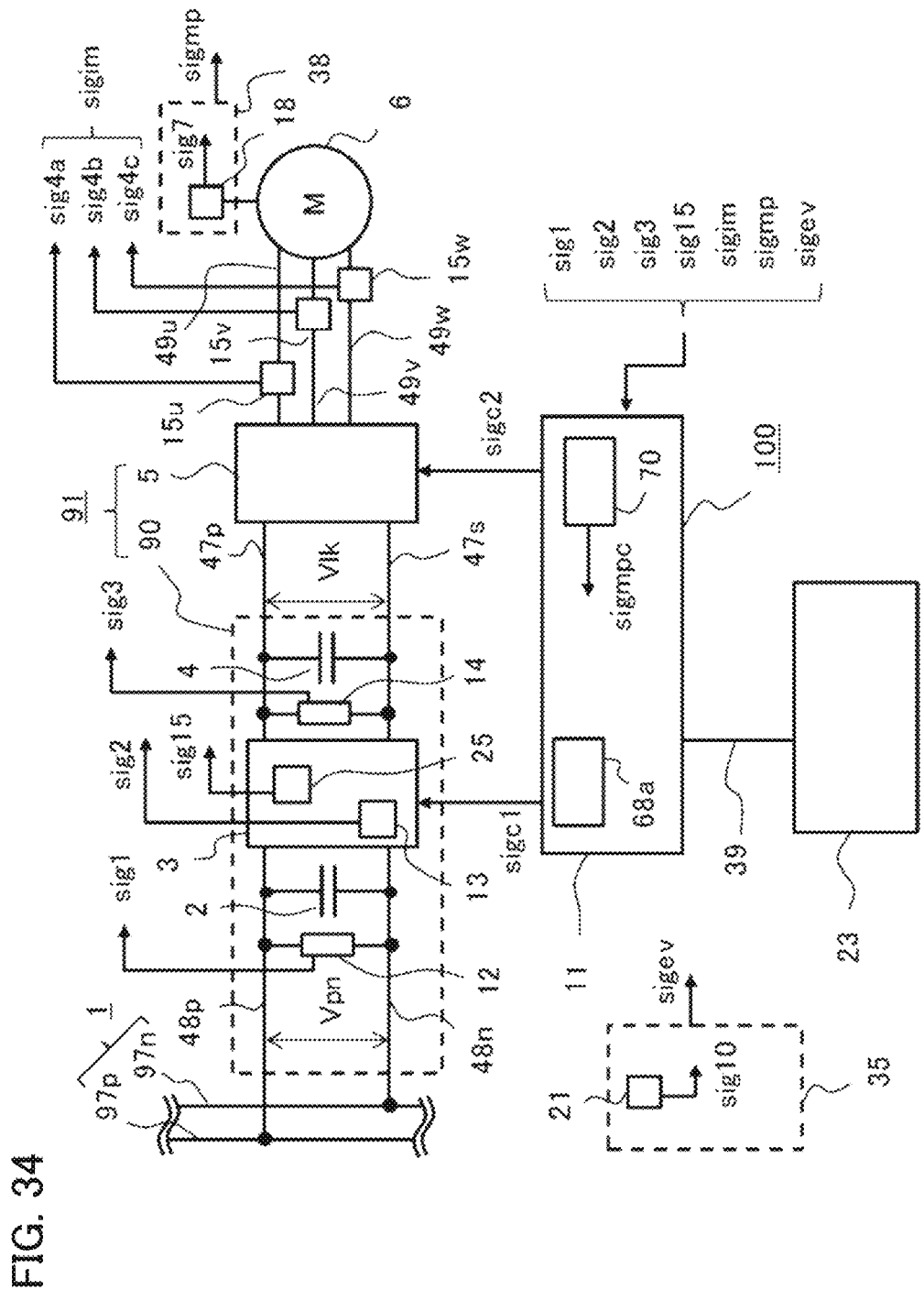
FIG. 34 shows a first example of a motor control device according to embodiment 7.
Figure 35:
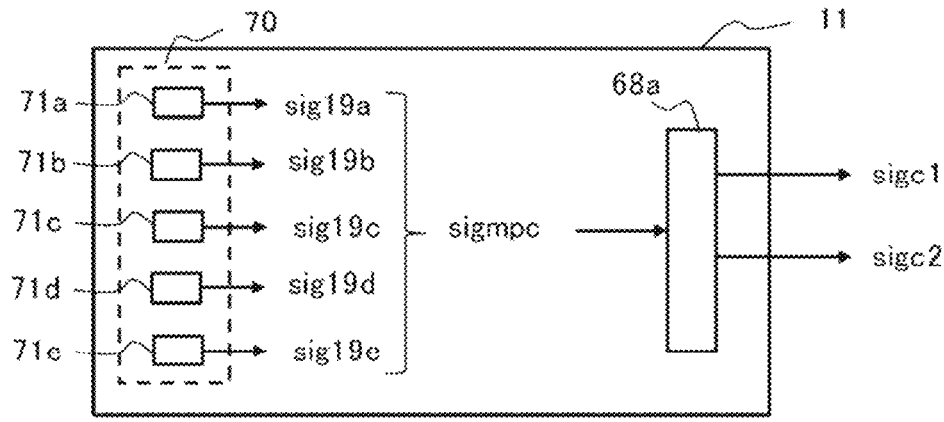
FIG. 35 shows the configuration of a control device in FIG. 34.
Figure 36:
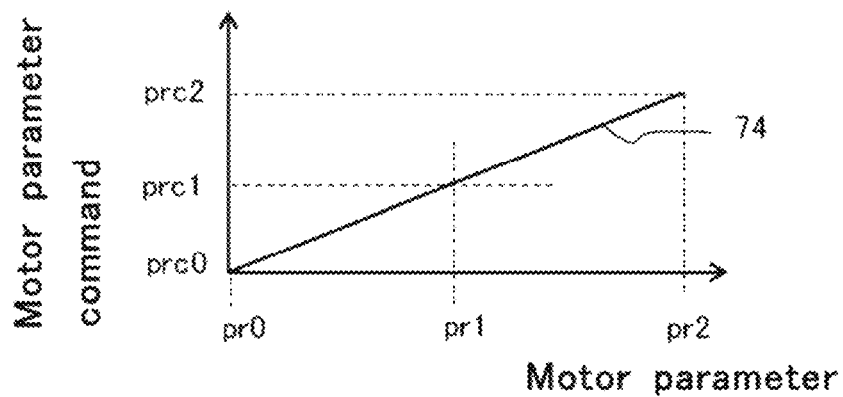
FIG. 36 illustrates the relationship between a motor parameter and a motor parameter command according to embodiment 7.
Figure 37:
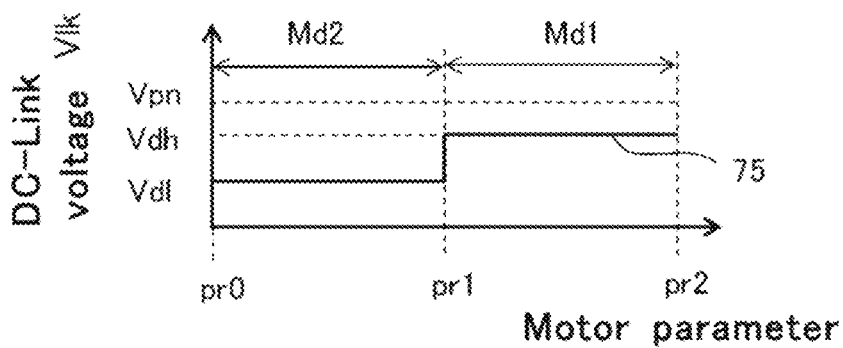
FIG. 37 illustrates a first-example relationship between the motor parameter and DC-link voltage according to embodiment 7.
Figure 38:
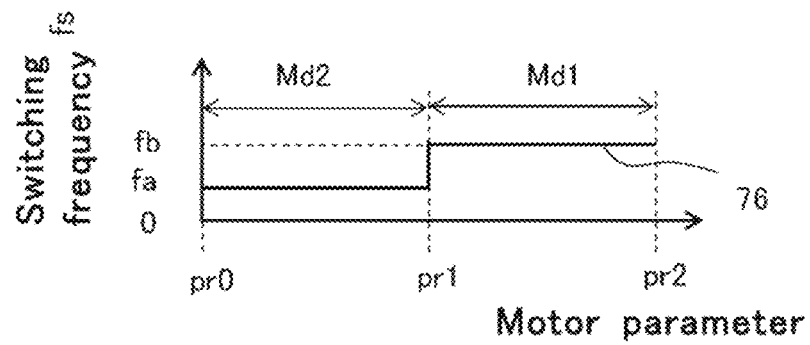
FIG. 38 illustrates a first-example relationship between the motor parameter and a switching frequency of the chopper according to embodiment 7.
Figure 39:
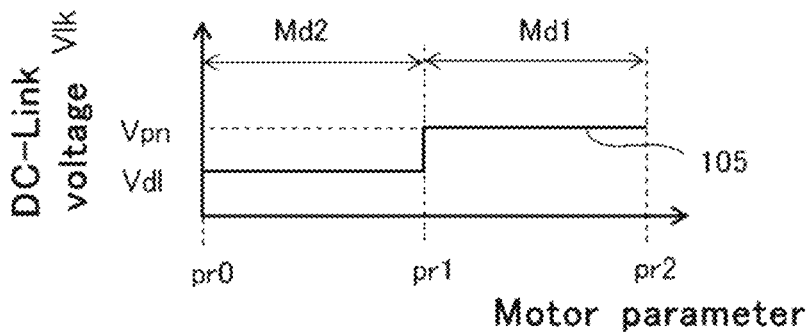
FIG. 39 illustrates a second-example relationship between the motor parameter and DC-link voltage according to embodiment 7.
Figure 40:
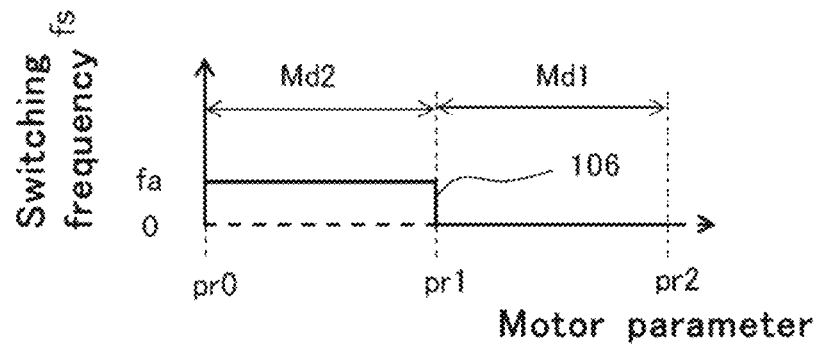
FIG. 40 illustrates a second-example relationship between the motor parameter and a switching frequency of the chopper according to embodiment 7.
Figure 41:
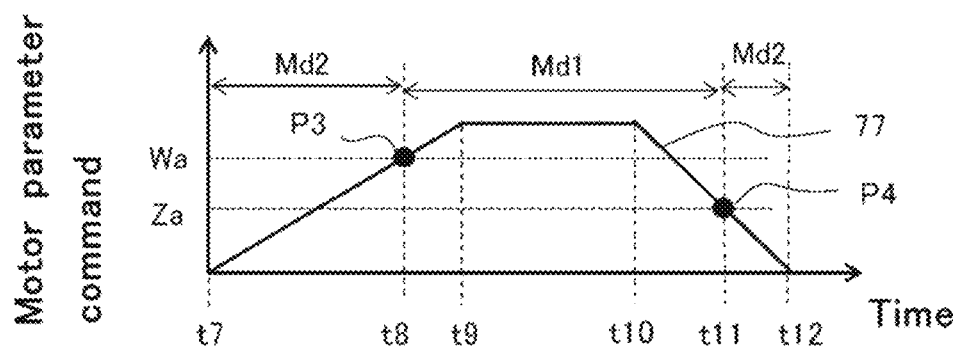
FIG. 41 shows timings for explaining operation of the motor control device in FIG. 34.
Figure 42:
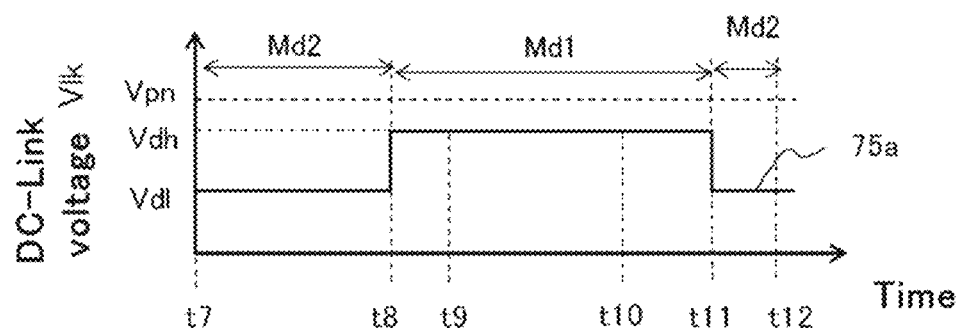
FIG. 42 shows timings of DC-link voltage in a first example for explaining operation of the motor control device in FIG. 34.
Figure 43:
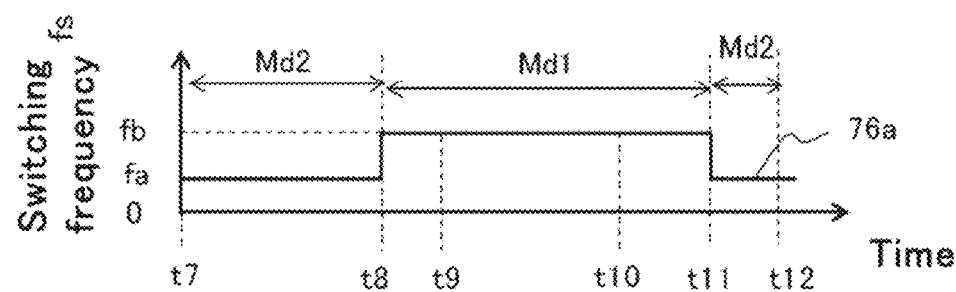
FIG. 43 shows timings of the switching frequency in a first example for explaining operation of the motor control device in FIG. 34.
Figure 47:
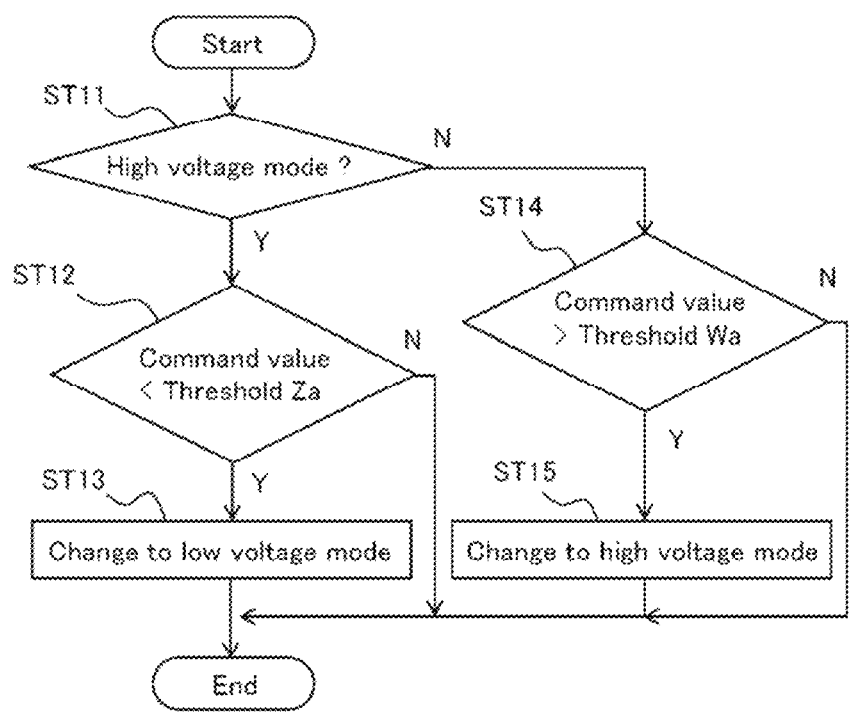
FIG. 47 shows a flowchart for explaining operation of an operation mode judgment unit in FIG. 34.

FIG. 34 shows a first example of a motor control device according to embodiment 7, and FIG. 35 shows the configuration of a control device in FIG. 34. FIG. 36 illustrates the relationship between a motor parameter and a motor parameter command according to embodiment 7. FIG. 37 illustrates a first-example relationship between the motor parameter and the DC-link voltage according to embodiment 7, and FIG. 38 illustrates a first-example relationship between the motor parameter and a switching frequency of the chopper according to embodiment 7. FIG. 39 illustrates a second-example relationship between the motor parameter and the DC-link voltage according to embodiment 7, and FIG. 40 illustrates a second-example relationship between the motor parameter and a switching frequency of the chopper according to embodiment 7. FIG. 41 shows timings for explaining operation of the motor control device in FIG. 34 and shows timings of the motor parameter command. FIG. 42 shows timings of the DC-link voltage in a first example for explaining operation of the motor control device in FIG. 34, and FIG. 43 shows timings of the switching frequency in a first example for explaining operation of the motor control device in FIG. 34. FIG. 44 shows timings of the DC-link voltage in a second example for explaining operation of the motor control device in FIG. 34, and FIG. 45 shows timings of the switching frequency in a second example for explaining operation of the motor control device in FIG. 34. FIG. 46 shows motor parameter commands and thresholds according to embodiment 7, and FIG. 47 shows a flowchart for explaining operation of the operation mode judgment unit in FIG. 34. In the motor control device 100 of embodiment 7, the operation mode of the chopper 3 is changed using information of the motor parameter which changes along with driving of the motor 6 which is a load. The information of the motor parameter which is flight information is a motor parameter command, detected information of the motor parameter, estimated information of the motor parameter, or the like. The information of the motor parameter is information obtained along with control for the motor 6. First, an example in which the operation mode of the chopper 3 is changed using a motor parameter command will be described as a first example. Thereafter, an example in which the operation mode of the chopper 3 is changed using detected information of a motor parameter will be described as a second example, and then an example in which the operation mode of the chopper 3 is changed using estimated information of a motor parameter will be described as a third example. The motor parameter command may be a command generated in the control device 11 without being detected by a sensor, or may be motor parameter command detected information which is a motor parameter command detected by a sensor.

The motor control device 100 in the first example of embodiment 7 is different from the motor control device 100 of embodiment 1 in that the control device 11 includes a motor parameter command sensor 70 for detecting a motor parameter command, and motor parameter command detected information sigmpc outputted from the motor parameter command sensor 70 is inputted as the input information sighin to the operation mode judgment unit 60 of the control signal generation unit 68a. Differences from the motor control device 100 of embodiment 1 will be mainly described. The control signal sigc2 to be outputted to the inverter 5 changes in accordance with change in the motor parameter command. For example, in a case where the motor parameter command is a motor AC voltage command, the value of the motor AC voltage command increases as the speed, the output, or the like of the motor 6 increases. In a case of increasing the value of the motor AC voltage command, the switching frequency for the semiconductor switching elements Q7 to Q12 of the inverter 5 may be increased. That is, in a case of increasing the value of the motor AC voltage command, the control signal sigc2 having a frequency set to be higher than the present value is inputted to the semiconductor switching elements Q7 to Q12.

The motor parameter command sensor 70 is at least one of a motor speed command sensor 71a, a motor output command sensor 71b, a motor AC voltage command sensor 71c, a motor current command sensor 71d, or a motor torque command sensor 71e, for example. The motor speed command sensor 71a outputs a motor speed command, i.e., detected information sig19a, as the motor parameter command detected information sigmpc. The motor output command sensor 71b outputs a motor output command, i.e., detected information sig19b, as the motor parameter command detected information sigmpc. The motor AC voltage command sensor 71c outputs a motor AC voltage command, i.e., detected information sig19c, as the motor parameter command detected information sigmpc. The motor current command sensor 71d outputs a motor current command, i.e., detected information sig19d, as the motor parameter command detected information sigmpc. The motor torque command sensor 71e outputs a motor torque command, i.e., detected information sig19e, as the motor parameter command detected information sigmpc. The control signal generation unit 68a outputs the control signals sigc1 and sigc2 on the basis of the motor parameter command detected information sigmpc. That is, the operation mode judgment unit 60 of the control signal generation unit 68a performs judgment about two operation modes of the chopper 3, using the motor parameter command detected information sigmpc as the input information sighin, and outputs the operation mode signal msig.

In the case where the flying object 101 is an aircraft, the output of the motor 6 increases at the time of takeoff and ascent. However, during cruise operation at a target flight altitude, the output of the motor 6 is low and therefore the value of the motor AC voltage command is lowered. In the case where the value of the motor AC voltage command for the inverter 5 is low, the DC-link voltage Vlk which is the output voltage of the chopper 3 may be low. On the other hand, in a case where the value of the motor AC voltage command for the inverter 5 is high, the DC-link voltage Vlk which is the output voltage of the chopper 3 is required to be high. As shown in FIG. 36, the motor parameter indicating the state of the motor 6 changes in accordance with the motor parameter command. In FIG. 36, the horizontal axis indicates the motor parameter, and the vertical axis indicates the motor parameter command. Motor characteristics 74 are an example in which the motor parameter command and the motor parameter change linearly. For example, the motor parameter command is the motor AC voltage command, and the motor parameter is the motor speed. When values of the motor parameter are motor parameter values pr0, pr1, pr2, values of the motor parameter command are motor parameter command values prc0, prc1, prc2, respectively.

In the case where the value of the motor parameter changes from the motor parameter value pr0 to the motor parameter value pr2 as shown in FIG. 36, the DC-link voltage Vlk which is the output voltage of the chopper 3 and a switching frequency fs of the chopper 3 change along with change of the operation mode of the chopper 3, as in the first example shown in FIG. 37 and FIG. 38 or the second example shown in FIG. 39 and FIG. 40. The first example shown in FIG. 37 and FIG. 38 is an example in which the first voltage is the step-down voltage Vdh, and the second example shown in FIG. 39 and FIG. 40 is an example in which the first voltage is the distribution network voltage Vpn. In FIG. 37 to FIG. 40, the horizontal axes indicate the motor parameter. The vertical axes in FIG. 37 and FIG. 39 indicate the DC-link voltage Vlk, and the vertical axes in FIG. 38 and FIG. 40 indicate the switching frequency fs. The horizontal axis in FIG. 40 is shown by a broken line for discrimination from switching frequency characteristics 106. In a case where the step-down chopper 3 is performing switching operation, normally, the higher the switching frequency fs is, the higher the output voltage of the chopper 3, i.e., the DC-link voltage Vlk is. In a case where the step-down chopper 3 stops the switching operation, the input voltage to the chopper 3 directly becomes the output voltage, and therefore the output voltage increases as the switching operation stops.

First, the DC-link voltage Vlk and the switching frequency fs in the first example will be described. In DC-link voltage characteristics 75, when the motor parameter value is pr0 or more and less than pr1, the DC-link voltage Vlk is the step-down voltage Vdl, and when the motor parameter value is pr1 or more and pr2 or less, the DC-link voltage Vlk is the step-down voltage Vdh. In switching frequency characteristics 76, when the motor parameter value is pr0 or more and less than pr1, the value of the switching frequency fs is a switching frequency fa, and when the motor parameter value is pr1 or more and pr2 or less, the value of the switching frequency fs is a switching frequency fb higher than the switching frequency fa. When the value of the motor parameter command becomes high, for meeting the requirement, the DC-link voltage Vlk needs to be increased from the step-down voltage Vdl which is the second voltage to the step-down voltage Vdh which is the first voltage higher than the step-down voltage Vdl. That is, as shown in FIG. 36, FIG. 37, and FIG. 38, when the motor parameter command value becomes high in accordance with the motor parameter value of the motor 6, for meeting the requirement, the switching frequency fs for the chopper 3 is increased so that the DC-link voltage Vlk is increased from the step-down voltage Vdl which is the second voltage to the step-down voltage Vdh which is the first voltage higher than the step-down voltage Vdl.

Next, the DC-link voltage Vlk and the switching frequency fs in the second example will be described. In DC-link voltage characteristics 105, when the motor parameter value is pr0 or more and less than pr1, the DC-link voltage Vlk is the step-down voltage Vdl, and when the motor parameter value is pr1 or more and pr2 or less, the DC-link voltage Vlk is the distribution network voltage Vpn. In switching frequency characteristics 106, when the motor parameter value is pr0 or more and less than pr1, the value of the switching frequency fs is the switching frequency fa, and when the motor parameter value is pr1 or more and pr2 or less, the value of the switching frequency fs is 0. As described in embodiment 1, the chopper 3 stops switching operation, specifically, the semiconductor switching element on the low potential side from the connection point m is turned off and the semiconductor switching element on the high potential side from the connection point m is turned on or off, and thus the value of the switching frequency fs is set to 0. When the value of the motor parameter command becomes high, for meeting the requirement, the DC-link voltage Vlk needs to be increased from the step-down voltage Vdl which is the second voltage to the distribution network voltage Vpn which is the first voltage higher than the step-down voltage Vdl. That is, as shown in FIG. 36, FIG. 39, and FIG. 40, when the motor parameter command value becomes high in accordance with the motor parameter value of the motor 6, for meeting the requirement, the switching frequency fs for the chopper 3 is set to 0 so that the DC-link voltage Vlk is increased from the step-down voltage Vdl which is the second voltage to the distribution network voltage Vpn which is the first voltage higher than the step-down voltage Vdl.

In the motor control device 100 in the first example of embodiment 7, when the motor parameter command is changed as in motor parameter command characteristics 77 of the inverter 5 shown in FIG. 41, the DC-link voltage and the switching frequency are changed as in DC-link voltage characteristics 75a and switching frequency characteristics 76a in the first example shown in FIG. 42 and FIG. 43 or DC-link voltage characteristics 105a and switching frequency characteristics 106a in the second example shown in FIG. 44 and FIG. 45. In FIG. 41 to FIG. 45, the horizontal axes indicate time. In FIG. 41, the vertical axis indicates the motor parameter command. In FIG. 42 and FIG. 44, the vertical axes indicate the DC-link voltage Vlk, and in FIG. 43 and FIG. 45, the vertical axes indicate the switching frequency fs. The horizontal axis in FIG. 45 is shown by a broken line for discrimination from the switching frequency characteristics 106a. The motor parameter command characteristics 77 are an example in which the value thereof increases from time t7 to time t9, remains constant from time t9 to time t10, and decreases from time t10 to time t12. At time t7, the control device 11 operates the chopper 3 in the second operation mode Md2, i.e., the low voltage mode, with the switching frequency fs for the chopper 3 set at the switching frequency fa.

While the chopper 3 is operating in the second operation mode Md2, when the motor parameter command characteristics 77 of the inverter 5 indicate a value higher than a threshold Wa at time t8, the control device 11 changes the operation mode of the chopper 3 to the first operation mode Md1, i.e., the high voltage mode, to start high voltage operation of the chopper 3, thus increasing the DC-link voltage Vlk from the step-down voltage Vdl which is the second voltage to the step-down voltage Vdh or the distribution network voltage Vpn which is the first voltage. At time t8, the control device 11 shifts the switching frequency fs from the switching frequency fa in the second operation mode Md2 to the switching frequency fb or 0 in the first operation mode Md1.

While the chopper 3 is operating in the first operation mode Md1, when the motor parameter command characteristics 77 of the inverter 5 indicate a value lower than a threshold Za at time t11, the control device 11 changes the operation mode of the chopper 3 to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage. At time t11, the control device 11 shifts the switching frequency fs from the switching frequency fb or 0 in the first operation mode Md1 to the switching frequency fa in the second operation mode Md2. The threshold Za is lower than the threshold Wa. A point where the value of the motor parameter command characteristics 77 in the second operation mode becomes the threshold Wa is a mode change point P3, and a point where the value of the motor parameter command characteristics 77 in the first operation mode becomes the threshold Za is a mode change point P4. The threshold Za is a first parameter command threshold, and the threshold Wa is a second parameter command threshold. The motor parameter command is an example of information of the motor parameter, and therefore the threshold Za can also be referred to as first parameter threshold and the threshold Wa can also be referred to as second parameter threshold.

FIG. 46 shows specific examples of motor parameter commands and thresholds used for judgment. As specific examples of motor parameter commands, a motor AC voltage command, a motor speed command, a motor output command, a motor torque command, and a motor current command are shown. The thresholds Za and Wa for the motor AC voltage command are thresholds Za1 and Wa1, respectively. The thresholds Za and Wa for the motor speed command are thresholds Za2 and Wa2, respectively, and the thresholds Za and Wa for the motor output command are thresholds Za3 and Wa3, respectively. The thresholds Za and Wa for the motor torque command are thresholds Za4 and Wa4, respectively, and the thresholds Za and Wa for the motor current command are thresholds Za5 and Wa5, respectively. In accordance with each specific example of the motor parameter command, the first parameter command threshold and the second parameter command threshold may be specifically written. The threshold Za1 and the threshold Wa1 may be referred to as first motor AC voltage command threshold and second motor AC voltage command threshold, respectively. The threshold Za2 and the threshold Wa2 may be referred to as first motor speed command threshold and second motor speed command threshold, respectively, and the threshold Za3 and the threshold Wa3 may be referred to as first motor output command threshold and second motor output command threshold, respectively. The threshold Za4 and the threshold Wa4 may be referred to as first motor torque command threshold and second motor torque command threshold, respectively, and the threshold Za5 and the threshold Wa5 may be referred to as first motor current command threshold and second motor current command threshold, respectively.

The motor parameter command detected information sigmpc is information of a motor parameter obtained along with control for the motor 6, and is flight information. When the flying object 101 such as the aircraft takes off from the ground, the control device 11 controls the chopper 3 in the first operation mode Md1, and when the control device 11 judges that the flight information which is information of a motor parameter obtained along with control for the motor 6, i.e., the motor parameter command detected information sigmpc, satisfies a predetermined condition, the control device 11 controls the chopper 3 in the second operation mode Md2.

The operation mode judgment unit 60 of the control device 11 operates as in the flowchart shown in FIG. 47, for example. The flowchart in FIG. 47 corresponds to the flowchart in FIG. 16. In step ST11, whether or not the chopper 3 is in the high voltage mode (first operation mode) is judged. Specifically, in step ST11, whether or not the operation mode signal msig indicates the high voltage mode, for example, whether or not the operation mode signal msig is at a high level, is judged. In step ST11, if it is judged that the chopper 3 is in the high voltage mode, the process proceeds to step ST12, and if it is judged that the chopper 3 is not in the high voltage mode, the process proceeds to step ST14. In step ST12, if the command value for the motor parameter is smaller than the threshold Za, i.e., if the operation mode change judgment criterion is satisfied, the process proceeds to step ST13, and if the command value for the motor parameter is not smaller than the threshold Za, i.e., if the operation mode change judgment criterion is not satisfied, the operation mode signal msig is kept in the high voltage mode and the process is ended. In step ST13, the operation mode signal msig is changed to the low voltage mode and the process is ended. In step ST14, if the command value for the motor parameter is greater than the threshold Wa, i.e., if the operation mode change judgment criterion is satisfied, the process proceeds to step ST15, and if the command value for the motor parameter is not greater than the threshold Wa, i.e., if the operation mode change judgment criterion is not satisfied, the operation mode signal msig is kept in the low voltage mode and the process is ended. In step ST15, the operation mode signal msig is changed to the high voltage mode and the process is ended. In this example, whether or not the chopper 3 is in the high voltage mode is judged in step ST11. However, as shown in FIG. 18, in step ST11 which is the first step, whether or not the chopper 3 is in the low voltage mode may be judged. In step ST11, if it is judged that the chopper 3 is in the low voltage mode, the process proceeds to step ST14, and if it is judged that the chopper 3 is not in the low voltage mode, the process proceeds to step ST12.

In the motor control device 100 in the first example of embodiment 7, the control device 11 changes the operation mode on the basis of the motor parameter command detected information sigmpc, instead of the environmental detected information sigev. Therefore, the same effects as in the motor control device 100 of embodiment 1 are provided. In the motor control device 100 in the first example of embodiment 7, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved.

Figure 48:
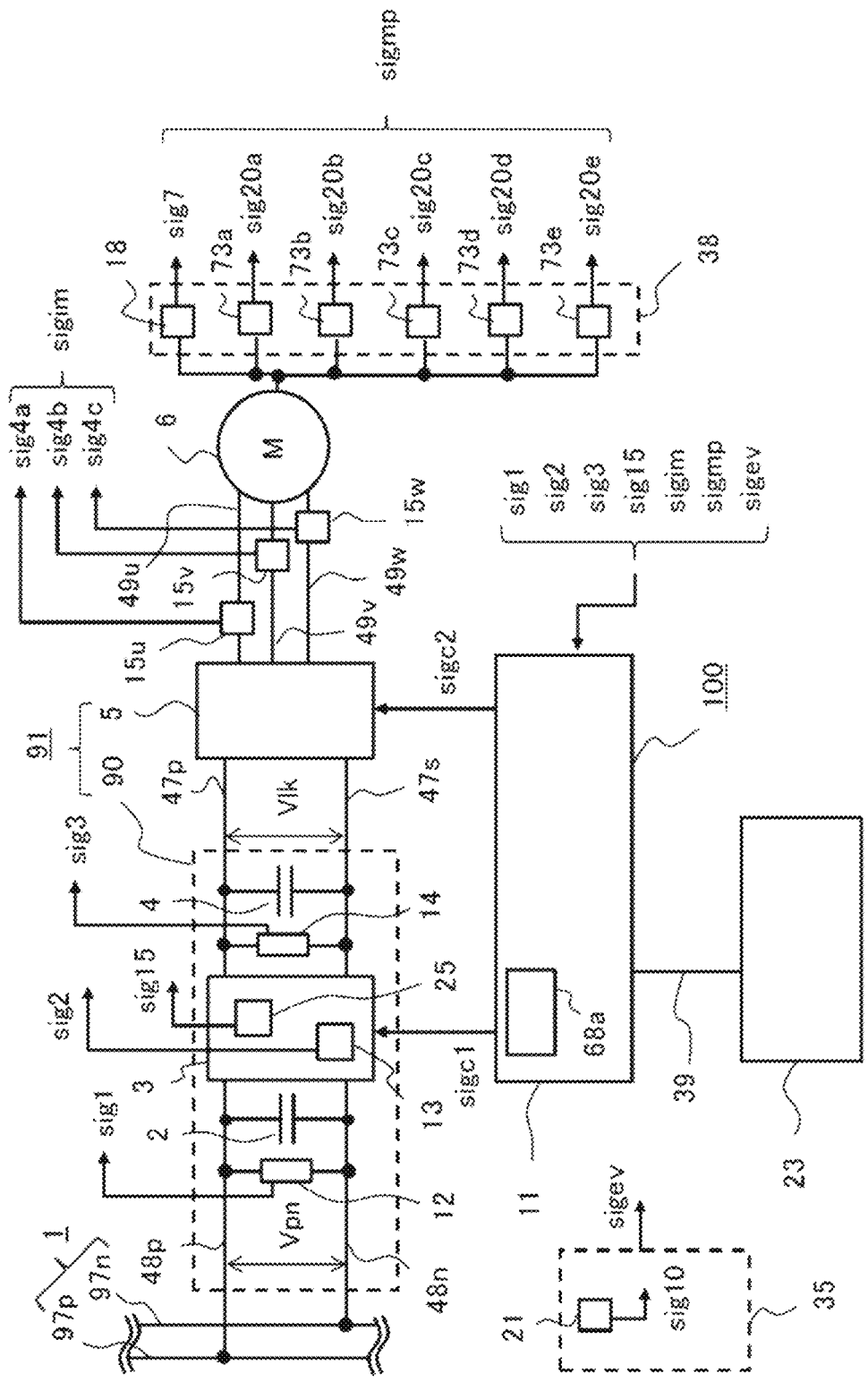
FIG. 48 shows a second example of the motor control device according to embodiment 7.
Figure 49:
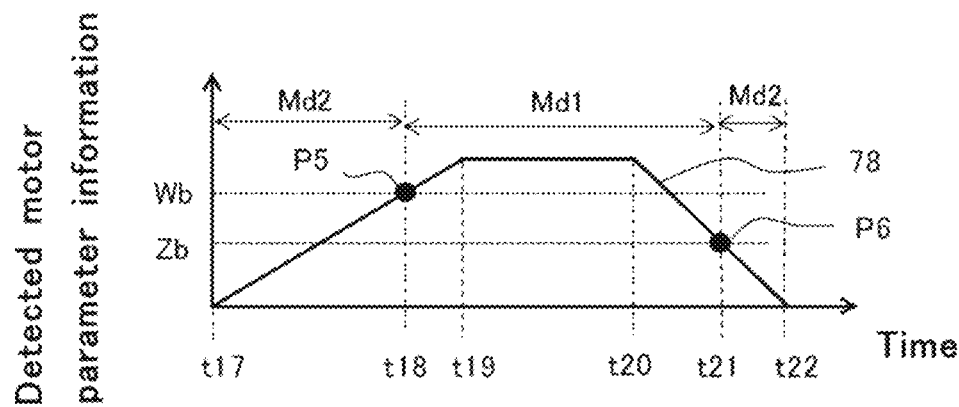
FIG. 49 shows timings for explaining operation of the motor control device in FIG. 48.
Figure 50:
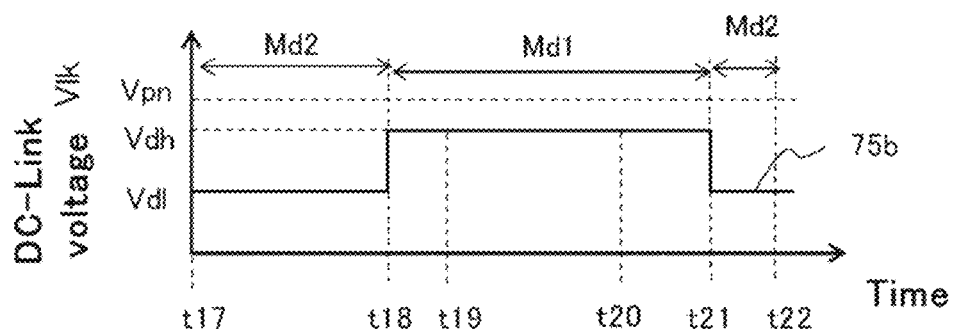
FIG. 50 shows timings of DC-link voltage in a first example for explaining operation of the motor control device in FIG. 48.
Figure 51:
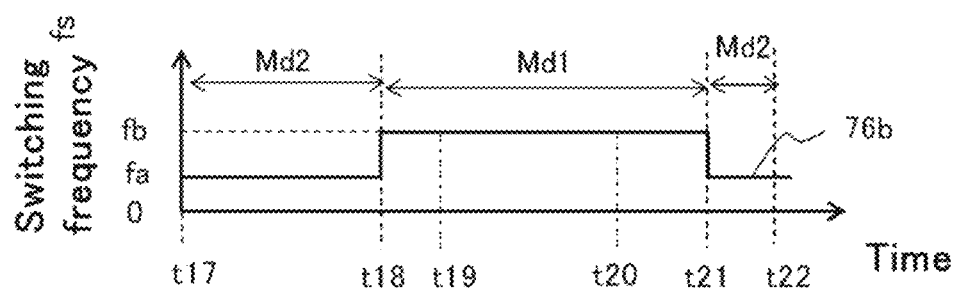
FIG. 51 shows timings of the switching frequency in a first example for explaining operation of the motor control device in FIG. 48.
Figure 55:
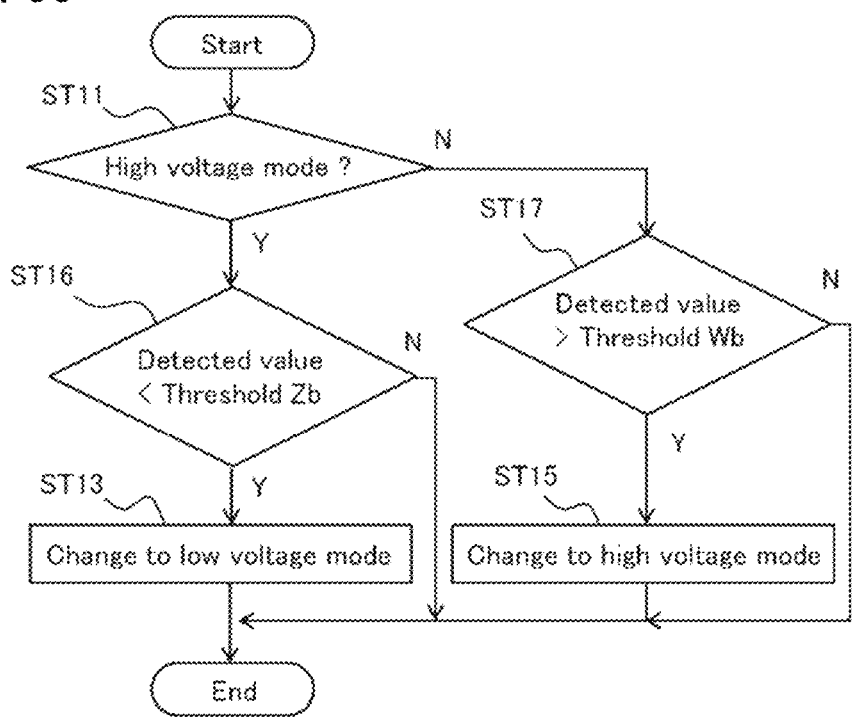
FIG. 55 shows a flowchart for explaining operation of an operation mode judgment unit in FIG. 48.

FIG. 48 shows a second example of the motor control device according to embodiment 7. FIG. 49 shows timings for explaining operation of the motor control device in FIG. 48 and shows timings of detected motor parameter information. FIG. 50 shows timings of the DC-link voltage in a first example for explaining operation of the motor control device in FIG. 48, and FIG. 51 shows timings of the switching frequency in a first example for explaining operation of the motor control device in FIG. 48. FIG. 52 shows timings of the DC-link voltage in a second example for explaining operation of the motor control device in FIG. 48, and FIG. 53 shows timings of the switching frequency in a second example for explaining operation of the motor control device in FIG. 48. FIG. 54 shows detected motor parameter information and thresholds according to embodiment 7, and FIG. 55 shows a flowchart for explaining operation of the operation mode judgment unit in FIG. 48. The motor control device 100 in the second example of embodiment 7 is different from the motor control device 100 of embodiment 1 in that the control device 11 is provided with at least one other sensor for outputting detected information of a motor parameter besides the position sensor 18, as motor parameter sensors 38, and motor parameter detected information sigmp outputted from the motor parameter sensors 38 is inputted as the input information sighin to the operation mode judgment unit 60 of the control signal generation unit 68a. The detected information of the motor parameter may be referred to as motor parameter detected information. Other sensors for outputting detected information of motor parameters are a motor speed sensor 73a, a motor output sensor 73b, a motor AC voltage sensor 73c, a motor current sensor 73d, and a motor torque sensor 73e. The motor speed sensor 73a outputs information of the motor speed, i.e., detected information sig20a, as the motor parameter detected information sigmp. The motor output sensor 73b outputs information of the motor output, i.e., detected information sig20b, as the motor parameter detected information sigmp. The motor AC voltage sensor 73c outputs information of the motor AC voltage, i.e., detected information sig20c, as the motor parameter detected information sigmp. The motor current sensor 73d outputs information of the motor current, i.e., detected information sig20d, as the motor parameter detected information sigmp. The motor torque sensor 73e outputs information of the motor torque, i.e., detected information sig20e, as the motor parameter detected information sigmp.

The motor control device 100 in the second example of embodiment 7 is different from the motor control device 100 in the first example of embodiment 7 in that the operation mode of the chopper 3 is changed using the detected information of the motor parameter. Differences from the motor control device 100 of embodiment 1 and the motor control device 100 in the first example of embodiment 7 will be mainly described.

In the motor control device 100 in the second example of embodiment 7, when detected motor parameter characteristics 78 of the motor 6 exhibit change as shown in FIG. 49, the DC-link voltage and the switching frequency are changed as in DC-link voltage characteristics 75b and switching frequency characteristics 76b in the first example shown in FIG. 50 and FIG. 51 or DC-link voltage characteristics 105b and switching frequency characteristics 106b in the second example shown in FIG. 52 and FIG. 53. In FIG. 49 to FIG. 53, the horizontal axes indicate time. In FIG. 49, the vertical axis indicates the detected motor parameter information. In FIG. 50 and FIG. 52, the vertical axes indicate the DC-link voltage Vlk, and in FIG. 51 and FIG. 53, the vertical axes indicate the switching frequency fs. The horizontal axis in FIG. 53 is shown by a broken line for discrimination from the switching frequency characteristics 106b. The detected motor parameter characteristics 78 are an example in which the value thereof increases from time t17 to time t19, remains constant from time t19 to time t20, and decreases from time t20 to time t22. At time t17, the control device 11 operates the chopper 3 in the second operation mode Md2, i.e., the low voltage mode, with the switching frequency fs for the chopper 3 set at the switching frequency fa.

While the chopper 3 is operating in the second operation mode Md2, when the detected motor parameter characteristics 78 of the motor 6 indicate a value higher than a threshold Wb at time t18, the control device 11 changes the operation mode of the chopper 3 to the first operation mode Md1, i.e., the high voltage mode, to start high voltage operation of the chopper 3, thus increasing the DC-link voltage Vlk from the step-down voltage Vdl which is the second voltage to the step-down voltage Vdh or the distribution network voltage Vpn which is the first voltage. At time t18, the control device 11 shifts the switching frequency fs from the switching frequency fa in the second operation mode Md2 to the switching frequency fb or 0 in the first operation mode Md1.

While the chopper 3 is operating in the first operation mode Md1, when the detected motor parameter characteristics 78 of the motor 6 indicate a value lower than a threshold Zb at time t21, the control device 11 changes the operation mode of the chopper 3 to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage. At time t21, the control device 11 shifts the switching frequency fs from the switching frequency fb or 0 in the first operation mode Md1 to the switching frequency fa in the second operation mode Md2. The threshold Zb is lower than the threshold Wb. A point where the value of the detected motor parameter characteristics 78 in the second operation mode becomes the threshold Wb is a mode change point P5, and a point where the value of the detected motor parameter characteristics 78 in the first operation mode becomes the threshold Zb is a mode change point P6. The threshold Zb is a first parameter detection threshold, and the threshold Wb is a second parameter detection threshold. The motor parameter detected information is an example of information of the motor parameter, and therefore the threshold Zb can also be referred to as first parameter threshold and the threshold Wb can also be referred to as second parameter threshold.

FIG. 54 shows specific examples of detected motor parameter information and thresholds used for judgment. As specific examples of detected motor parameter information, detected motor AC voltage information, detected motor speed information, detected motor output information, detected motor torque information, and detected motor current information are shown. The thresholds Zb and Wb for the detected motor AC voltage information are thresholds Zb1 and Wb1, respectively. The thresholds Zb and Wb for the detected motor speed information are thresholds Zb2 and Wb2, respectively, and the thresholds Zb and Wb for the detected motor output information are thresholds Zb3 and Wb3, respectively. The thresholds Zb and Wb for the detected motor torque information are thresholds Zb4 and Wb4, respectively, and the thresholds Zb and Wb for the detected motor current information are thresholds Zb5 and Wb5, respectively. In accordance with each specific example of the motor parameter detected information, i.e., the detected motor parameter information, the first parameter detection threshold and the second parameter detection threshold may be specifically written. The threshold Zb1 and the threshold Wb1 may be referred to as first motor AC voltage detection threshold and second motor AC voltage detection threshold, respectively. The threshold Zb2 and the threshold Wb2 may be referred to as first motor speed detection threshold and second motor speed detection threshold, respectively, and the threshold Zb3 and the threshold Wb3 may be referred to as first motor output detection threshold and second motor output detection threshold, respectively. The threshold Zb4 and the threshold Wb4 may be referred to as first motor torque detection threshold and second motor torque detection threshold, respectively, and the threshold Zb5 and the threshold Wb5 may be referred to as first motor current detection threshold and second motor current detection threshold, respectively.

The motor parameter detected information sigmp is information of a motor parameter obtained along with control for the motor 6, and is flight information. When the flying object 101 such as the aircraft takes off from the ground, the control device 11 controls the chopper 3 in the first operation mode Md1, and when the control device 11 judges that the flight information which is information of a motor parameter obtained along with control for the motor 6, i.e., the motor parameter detected information sigmp, satisfies a predetermined condition, the control device 11 controls the chopper 3 in the second operation mode Md2.

The operation mode judgment unit 60 of the control device 11 operates as in the flowchart shown in FIG. 55, for example. The flowchart in FIG. 55 corresponds to the flowcharts in FIG. 16 and FIG. 47. The flowchart in FIG. 55 is different from the flowchart in FIG. 47 in that step ST12 is replaced with step ST16 and step ST14 is replaced with step ST17. Differences from the flowchart in FIG. 47 will be described. In step ST11, if it is judged that the chopper 3 is in the high voltage mode, the process proceeds to step ST16, and if it is judged that the chopper 3 is not in the high voltage mode, the process proceeds to step ST17. In step ST16, if the detected value of the detected motor parameter information is smaller than the threshold Zb, i.e., if the operation mode change judgment criterion is satisfied, the process proceeds to step ST13, and if the detected value of the detected motor parameter information is not smaller than the threshold Zb, i.e., if the operation mode change judgment criterion is not satisfied, the operation mode signal msig is kept in the high voltage mode and the process is ended. In step ST13, the operation mode signal msig is changed to the low voltage mode and the process is ended. In step ST17, if the detected value of the detected motor parameter information is greater than the threshold Wb, i.e., if the operation mode change judgment criterion is satisfied, the process proceeds to step ST15, and if the detected value of the detected motor parameter information is not greater than the threshold Wb, i.e., if the operation mode change judgment criterion is not satisfied, the operation mode signal msig is kept in the low voltage mode and the process is ended. In step ST15, the operation mode signal msig is changed to the high voltage mode and the process is ended. In this example, whether or not the chopper 3 is in the high voltage mode is judged in step ST11. However, as shown in FIG. 18, in step ST11 which is the first step, whether or not the chopper 3 is in the low voltage mode may be judged. In step ST11, if it is judged that the chopper 3 is in the low voltage mode, the process proceeds to step ST17, and if it is judged that the chopper 3 is not in the low voltage mode, the process proceeds to step ST16.

In the motor control device 100 in the second example of embodiment 7, the control device 11 changes the operation mode on the basis of the motor parameter detected information sigmp of the motor 6 instead of the environmental detected information sigev. Therefore, the same effects as in the motor control device 100 of embodiment 1 are provided. In the motor control device 100 in the second example of embodiment 7, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved.

Figure 56:
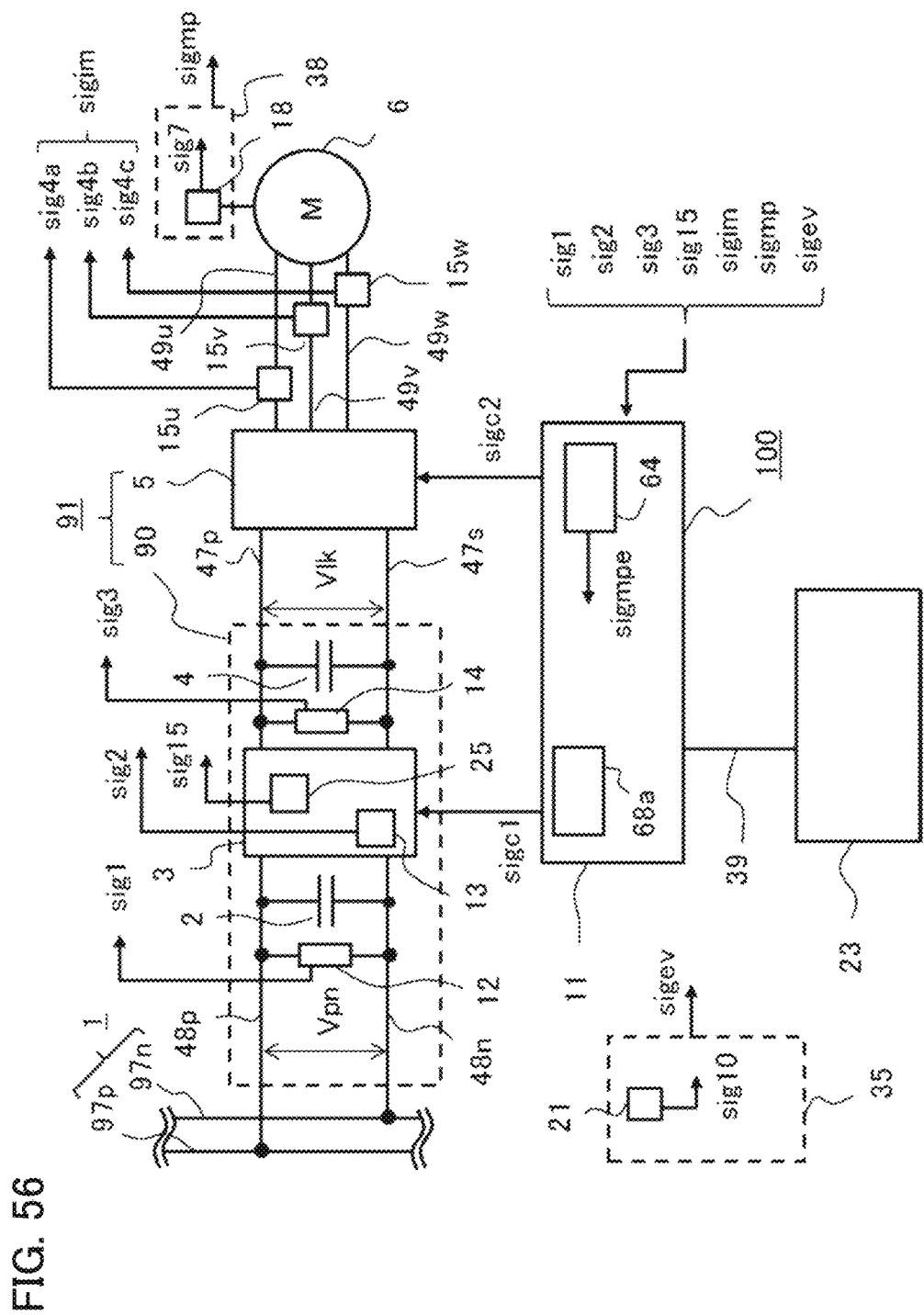
FIG. 56 shows a third example of the motor control device according to embodiment 7.
Figure 57:
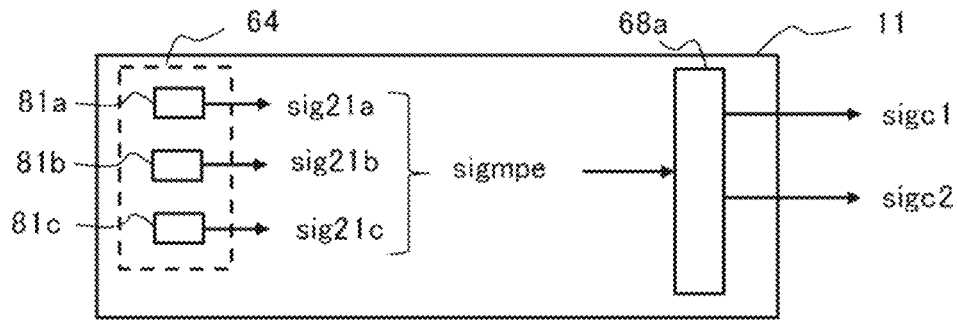
FIG. 57 shows the configuration of a control device in FIG. 56.
Figure 58:
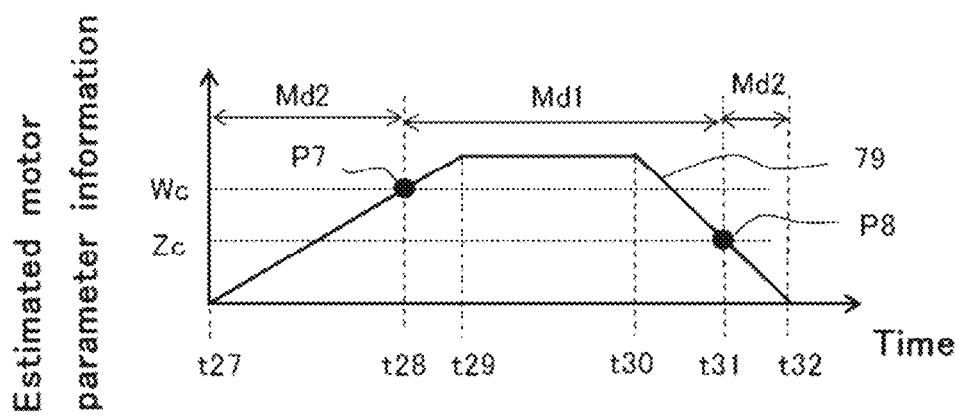
FIG. 58 shows timings for explaining operation of the motor control device in FIG. 56.
Figure 59:
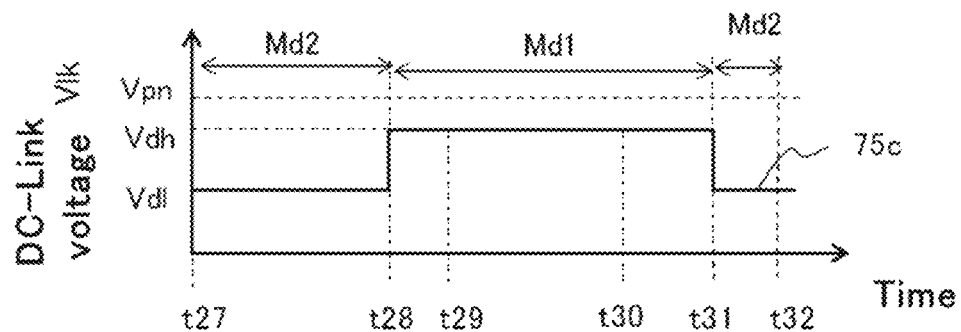
FIG. 59 shows timings of DC-link voltage in a first example for explaining operation of the motor control device in FIG. 56.
Figure 60:
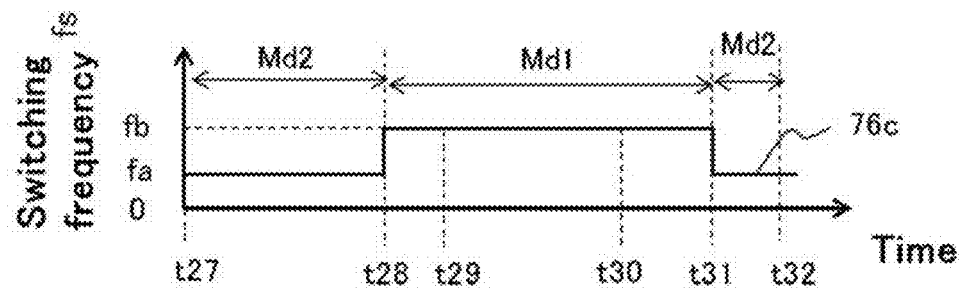
FIG. 60 shows timings of the switching frequency in a first example for explaining operation of the motor control device in FIG. 56.
Figure 61:
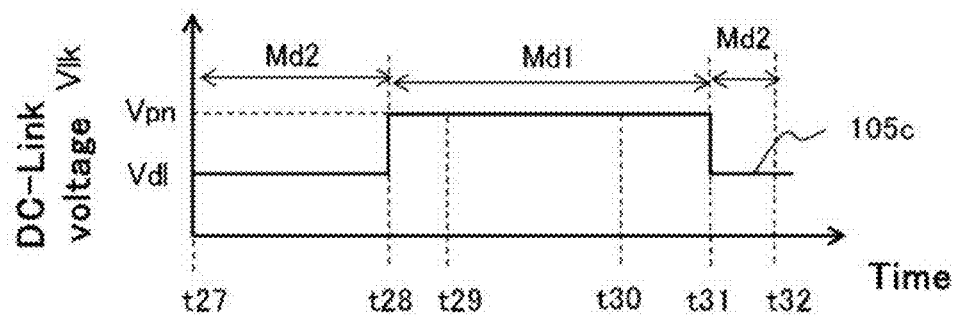
FIG. 61 shows timings of DC-link voltage in a second example for explaining operation of the motor control device in FIG. 56.
Figure 62:
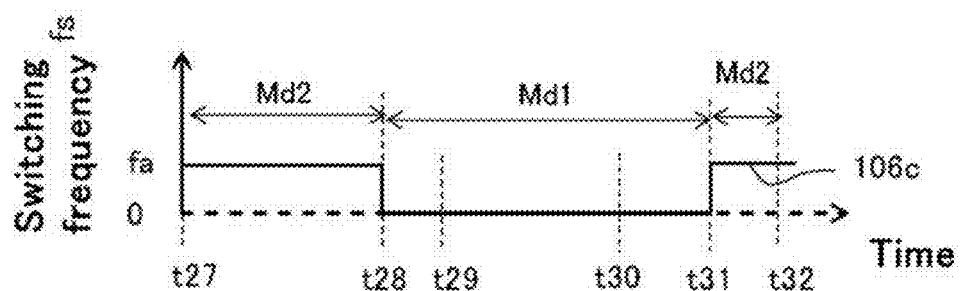
FIG. 62 shows timings of the switching frequency in a second example for explaining operation of the motor control device in FIG. 56.
Figures 63, 64:
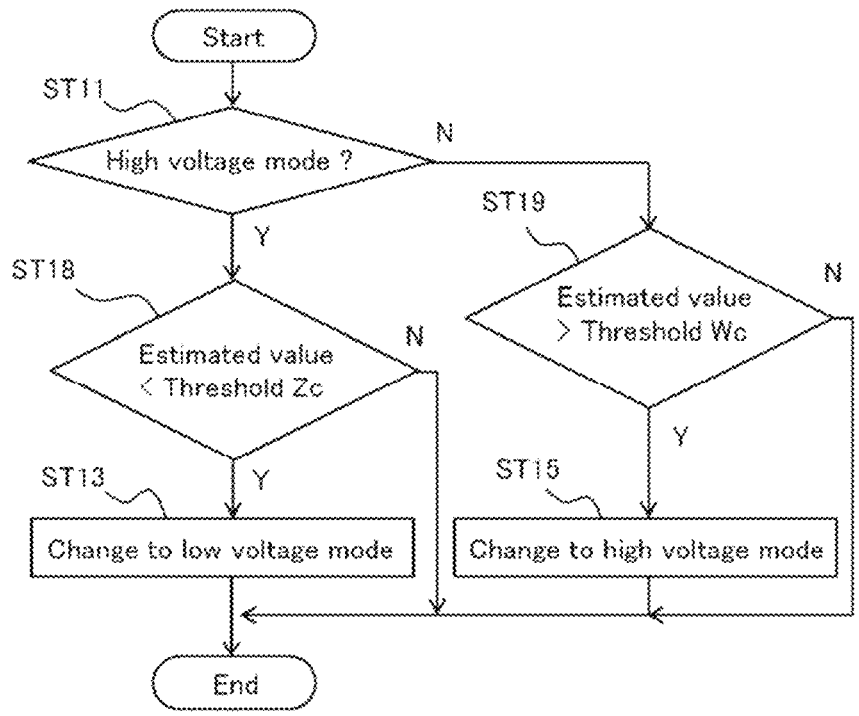
FIG. 63 shows estimated motor parameter information and thresholds according to embodiment 7.
FIG. 64 shows a flowchart for explaining operation of an operation mode judgment unit in FIG. 56.

FIG. 56 shows a third example of the motor control device according to embodiment 7, and FIG. 57 shows the configuration of a control device in FIG. 56. FIG. 58 shows timings for explaining operation of the motor control device in FIG. 56 and shows timings of estimated motor parameter information. FIG. 59 shows timings of the DC-link voltage in a first example for explaining operation of the motor control device in FIG. 56, and FIG. 60 shows timings of the switching frequency in a first example for explaining operation of the motor control device in FIG. 56. FIG. 61 shows timings of the DC-link voltage in a second example for explaining operation of the motor control device in FIG. 56, and FIG. 62 shows timings of the switching frequency in a second example for explaining operation of the motor control device in FIG. 56. FIG. 63 shows estimated motor parameter information and thresholds according to embodiment 7, and FIG. 64 shows a flowchart for explaining operation of the operation mode judgment unit in FIG. 56. The motor control device 100 in the third example of embodiment 7 is different from the motor control device 100 of embodiment 1 in that the control device 11 includes an observer 64 for estimating a motor parameter and motor parameter estimated information sigmpe outputted from the observer 64 is inputted as the input information sighin to the operation mode judgment unit 60 of the control signal generation unit 68a. The motor control device 100 in the third example of embodiment 7 is different from the motor control device 100 in the first example of embodiment 7 in that the operation mode of the chopper 3 is changed using the estimated information of the motor parameter. The estimated information of the motor parameter may be referred to as motor parameter estimated information. Differences from the motor control device 100 of embodiment 1 and the motor control device 100 in the first example of embodiment 7 will be mainly described.

The observer 64 is at least one of a motor speed estimation unit 81a, a motor output estimation unit 81b, or a motor torque estimation unit 81c, for example. The motor speed estimation unit 81a estimates the motor speed on the basis of the motor current detected information sigim, and outputs the estimated value of the motor speed, i.e., estimated information sig21a, as the motor parameter estimated information sigmpe. The motor output estimation unit 81b estimates the motor output on the basis of the motor current detected information sigim, and outputs the estimated value of the motor output, i.e., estimated information sig21b, as the motor parameter estimated information sigmpe. The motor torque estimation unit 81c estimates the motor torque on the basis of the motor current detected information sigim, and outputs the estimated value of the motor torque, i.e., estimated information sig21c, as the motor parameter estimated information sigmpe. The control signal generation unit 68a outputs the control signals sigc1 and sigc2 on the basis of the motor parameter estimated information sigmpe. That is, the operation mode judgment unit 60 of the control signal generation unit 68a performs judgment about two operation modes of the chopper 3, using the motor parameter estimated information sigmpe as the input information sighin, and outputs the operation mode signal msig.

In the motor control device 100 in the third example of embodiment 7, while motor parameter characteristics estimated for the motor 6, i.e., estimated motor parameter characteristics 79 exhibit change as shown in FIG. 58, the DC-link voltage and the switching frequency are changed as in DC-link voltage characteristics 75c and switching frequency characteristics 76c in the first example shown in FIG. 59 and FIG. 60 or DC-link voltage characteristics 105c and switching frequency characteristics 106c in the second example shown in FIG. 61 and FIG. 62. In FIG. 58 to FIG. 62, the horizontal axes indicate time. In FIG. 58, the vertical axis indicates the estimated motor parameter information. In FIG. 59 and FIG. 61, the vertical axes indicate the DC-link voltage Vlk, and in FIG. 60 and FIG. 62, the vertical axes indicate the switching frequency fs. The horizontal axis in FIG. 62 is shown by a broken line for discrimination from the switching frequency characteristics 106c. The estimated motor parameter characteristics 79 are an example in which the value thereof increases from time t27 to time t29, remains constant from time t29 to time t30, and decreases from time t30 to time t32. At time t27, the control device 11 operates the chopper 3 in the second operation mode Md2, i.e., the low voltage mode, with the switching frequency fs for the chopper 3 set at the switching frequency fa.

While the chopper 3 is operating in the second operation mode Md2, when the estimated motor parameter characteristics 79 of the motor 6 indicate a value higher than a threshold Wc at time t28, the control device 11 changes the operation mode of the chopper 3 to the first operation mode Md1, i.e., the high voltage mode, to start high voltage operation of the chopper 3, thus increasing the DC-link voltage Vlk from the step-down voltage Vdl which is the second voltage to the step-down voltage Vdh or the distribution network voltage Vpn which is the first voltage. At time t28, the control device 11 shifts the switching frequency fs from the switching frequency fa in the second operation mode Md2 to the switching frequency fb or 0 in the first operation mode Md1.

While the chopper 3 is operating in the first operation mode Md1, when the estimated motor parameter characteristics 79 of the motor 6 indicate a value lower than a threshold Zc at time t31, the control device 11 changes the operation mode of the chopper 3 to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage. At time t31, the control device 11 shifts the switching frequency fs from the switching frequency fb or 0 in the first operation mode Md1 to the switching frequency fa in the second operation mode Md2. The threshold Zc is lower than the threshold Wc. A point where the value of the estimated motor parameter characteristics 79 in the second operation mode becomes the threshold Wc is a mode change point P7, and a point where the value of the estimated motor parameter characteristics 79 in the first operation mode becomes the threshold Zc is a mode change point P8. The threshold Zc is a first parameter estimation threshold, and the threshold Wc is a second parameter estimation threshold. The motor parameter estimated information is an example of information of the motor parameter, and therefore the threshold Zc can also be referred to as first parameter threshold and the threshold Wc can also be referred to as second parameter threshold.

FIG. 63 shows specific examples of estimated motor parameter information and thresholds used for judgment. As specific examples of estimated motor parameter information, estimated motor speed information, estimated motor output information, and estimated motor torque information are shown. The thresholds Zc and Wc for the estimated motor speed information are thresholds Zc1 and Wc1, respectively. The thresholds Zc and Wc for the estimated motor output information are thresholds Zc2 and Wc2, respectively, and the thresholds Zc and Wc for the estimated motor torque information are thresholds Zc3 and Wc3, respectively. In accordance with each specific example of the motor parameter estimated information, the first parameter estimation threshold and the second parameter estimation threshold may be specifically written. The threshold Zc1 and the threshold Wc1 may be referred to as first motor speed estimation threshold and second motor speed estimation threshold, respectively. The threshold Zc2 and the threshold Wc2 may be referred to as first motor output estimation threshold and second motor output estimation threshold, respectively, and the threshold Zc3 and the threshold Wc3 may be referred to as first motor torque estimation threshold and second motor torque estimation threshold, respectively.

The motor parameter estimated information sigmpe is information of a motor parameter obtained along with control for the motor 6, and is flight information. When the flying object 101 such as the aircraft takes off from the ground, the control device 11 controls the chopper 3 in the first operation mode Md1, and when the control device 11 judges that the flight information which is information of a motor parameter obtained along with control for the motor 6, i.e., the motor parameter estimated information sigmpe, satisfies a predetermined condition, the control device 11 controls the chopper 3 in the second operation mode Md2.

The operation mode judgment unit 60 of the control device 11 operates as in the flowchart shown in FIG. 64, for example. The flowchart in FIG. 64 corresponds to the flowcharts in FIG. 16 and FIG. 47. The flowchart in FIG. 64 is different from the flowchart in FIG. 47 in that step ST12 is replaced with step ST18 and step ST14 is replaced with step ST19. Differences from the flowchart in FIG. 47 will be described. In step ST11, if it is judged that the chopper 3 is in the high voltage mode, the process proceeds to step ST18, and if it is judged that the chopper 3 is not in the high voltage mode, the process proceeds to step ST19. In step ST18, if the estimated value of the estimated motor parameter information is smaller than the threshold Zc, i.e., if the operation mode change judgment criterion is satisfied, the process proceeds to step ST13, and if the estimated value of the estimated motor parameter information is not smaller than the threshold Zc, i.e., if the operation mode change judgment criterion is not satisfied, the operation mode signal msig is kept in the high voltage mode and the process is ended. In step ST13, the operation mode signal msig is changed to the low voltage mode and the process is ended. In step ST19, if the estimated value of the estimated motor parameter information is greater than the threshold Wc, i.e., if the operation mode change judgment criterion is satisfied, the process proceeds to step ST15, and if the estimated value of the estimated motor parameter information is not greater than the threshold Wc, i.e., if the operation mode change judgment criterion is not satisfied, the operation mode signal msig is kept in the low voltage mode and the process is ended. In step ST15, the operation mode signal msig is changed to the high voltage mode and the process is ended. In this example, whether or not the chopper 3 is in the high voltage mode is judged in step ST11. However, as shown in FIG. 18, in step ST11 which is the first step, whether or not the chopper 3 is in the low voltage mode may be judged. In step ST11, if it is judged that the chopper 3 is in the low voltage mode, the process proceeds to step ST19, and if it is judged that the chopper 3 is not in the low voltage mode, the process proceeds to step ST18.

In the motor control device 100 in the third example of embodiment 7, the control device 11 changes the operation mode on the basis of the motor parameter estimated information sigmpe of the motor 6 instead of the environmental detected information sigev. Therefore, the same effects as in the motor control device 100 of embodiment 1 are provided. In the motor control device 100 in the third example of embodiment 7, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved.

As described above, the motor control device 100 of embodiment 7 controls the motor 6 of the flying object 101 that takes off from the ground and flies. The motor control device 100 includes the step-down device 90 which receives DC power supplied from the DC distribution network 1 as input power and outputs DC power having voltage equal to or smaller than the distribution network voltage Vpn of the DC distribution network 1, the power supply device (inverter 5) which converts the DC power to AC power and outputs the AC power to the motor 6, and the control device 11 for controlling the step-down device 90 and the power supply device (inverter 5). The step-down device 90 includes the DC-output power conversion device (chopper 3) which converts the input power to DC power having voltage equal to or smaller than the distribution network voltage Vpn of the DC distribution network 1, and the output capacitor (capacitor 4) for smoothing the output voltage (DC-link voltage Vlk) of the DC-output power conversion device (chopper 3). The DC-output power conversion device (chopper 3) has the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). When the flying object 101 takes off from the ground, the control device 11 controls the DC-output power conversion device (chopper 3) in the first operation mode Md1, and when the control device 11 judges that flight information which is information of a motor parameter (motor parameter command detected information sigmpc, motor parameter detected information sigmp, motor parameter estimated information sigmpe) obtained along with control for the motor 6 satisfies a predetermined condition, the control device 11 controls the DC-output power conversion device (chopper 3) in the second operation mode Md2. With this configuration, in the motor control device 100 of embodiment 7, while the DC-output power conversion device (chopper 3) is controlled in the first operation mode Md1, when the flight information is judged to satisfy the predetermined condition, the DC-output power conversion device (chopper 3) is controlled in the second operation mode Md2. Thus, even in a case of operating at a high altitude where the cosmic ray dose is high, reliability of the motor control device is improved.

In the motor control device 100 of embodiment 7, the case where "the flight information satisfies the predetermined condition" corresponds to a case where, in a state in which the DC-output power conversion device (chopper 3) is controlled in the first operation mode Md1, an information value (a command value of motor parameter command detected information sigmpc, a detected value of motor parameter detected information sigmp, an estimated value of motor parameter estimated information sigmpe) based on information of a motor parameter (motor parameter command detected information sigmpc, motor parameter detected information sigmp, motor parameter estimated information sigmpe) is smaller than the first parameter threshold (thresholds Za, Zb, Zc). In the motor control device 100 in the first example of embodiment 7, the control device 11 includes the motor parameter command sensor 70 for detecting the motor parameter command (motor parameter command detected information sigmpc) which is information of the motor parameter. In the motor control device 100 in the first example of embodiment 7, in a state in which the DC-output power conversion device (chopper 3) is controlled in the first operation mode Md1, when it is judged that the information value (the command value of motor parameter command detected information sigmpc) based on the motor parameter command (motor parameter command detected information sigmpc) is smaller than the first parameter command threshold (threshold Za) which is the first parameter threshold (change condition B7a), the DC-output power conversion device (chopper 3) is controlled in the second operation mode Md2. In the first example of embodiment 7, in a state in which the DC-output power conversion device (chopper 3) is controlled in the second operation mode Md2, when the control device 11 judges that the information value (the command value of motor parameter command detected information sigmpc) based on the motor parameter command (motor parameter command detected information sigmpc) is greater than the second parameter command threshold (threshold Wa) which is the second parameter threshold greater than the first parameter threshold (threshold Za), the control device 11 controls the DC-output power conversion device (chopper 3) in the first operation mode Md1. With this configuration, in the motor control device 100 in the first example of embodiment 7, while the DC-output power conversion device (chopper 3) is controlled in the first operation mode Md1, when the flight information is judged to satisfy the predetermined condition, i.e., the change condition B7a, the DC-output power conversion device (chopper 3) is controlled in the second operation mode Md2. Thus, even in a case of operating at a high altitude where the cosmic ray dose is high, reliability of the motor control device is improved.

The motor control device 100 in the second example of embodiment 7 includes the motor parameter sensor 38 for detecting motor parameter detected information (motor parameter detected information sigmp) of the motor 6 which is information of the motor parameter. In the motor control device 100 in the second example of embodiment 7, in a state in which the DC-output power conversion device (chopper 3) is controlled in the first operation mode Md1, when it is judged that the information value (the detected value of motor parameter detected information sigmp) based on the motor parameter detected information (motor parameter detected information sigmp) is smaller than the first parameter detection threshold (threshold Zb) which is the first parameter threshold (change condition B7b), the DC-output power conversion device (chopper 3) is controlled in the second operation mode Md2. In the second example of embodiment 7, in a state in which the DC-output power conversion device (chopper 3) is controlled in the second operation mode Md2, when the control device 11 judges that the information value (the detected value of motor parameter detected information sigmp) based on the motor parameter detected information (motor parameter detected information sigmp) is greater than the second parameter detection threshold (threshold Wb) which is the second parameter threshold greater than the first parameter threshold (threshold Zb), the control device 11 controls the DC-output power conversion device (chopper 3) in the first operation mode Md1. With this configuration, in the motor control device 100 in the second example of embodiment 7, while the DC-output power conversion device (chopper 3) is controlled in the first operation mode Md1, when the flight information is judged to satisfy the predetermined condition, i.e., the change condition B7b, the DC-output power conversion device (chopper 3) is controlled in the second operation mode Md2. Thus, even in a case of operating at a high altitude where the cosmic ray dose is high, reliability of the motor control device is improved.

In the motor control device 100 in the third example of embodiment 7, the control device 11 includes the observer 64 for outputting the motor parameter estimated information of the motor 6 (motor parameter estimated information sigmpe) which is information of the motor parameter. In the motor control device 100 in the third example of embodiment 7, in a state in which the DC-output power conversion device (chopper 3) is controlled in the first operation mode Md1, when it is judged that the information value (the estimated value of motor parameter estimated information sigmpe) based on the motor parameter estimated information (motor parameter estimated information sigmpe) is smaller than the first parameter estimation threshold (threshold Zc) which is the first parameter threshold (change condition B7c), the DC-output power conversion device (chopper 3) is controlled in the second operation mode Md2. In the third example of embodiment 7, in a state in which the DC-output power conversion device (chopper 3) is controlled in the second operation mode Md2, when the control device 11 judges that the information value (the estimated value of motor parameter estimated information sigmpe) based on the motor parameter estimated information (motor parameter estimated information sigmpe) is greater than the second parameter estimation threshold (threshold Wc) which is the second parameter threshold greater than the first parameter threshold (threshold Zc), the control device 11 controls the DC-output power conversion device (chopper 3) in the first operation mode Md1. With this configuration, in the motor control device 100 in the third example of embodiment 7, while the DC-output power conversion device (chopper 3) is controlled in the first operation mode Md1, when the flight information is judged to satisfy the predetermined condition, i.e., the change condition B7c, the DC-output power conversion device (chopper 3) is controlled in the second operation mode Md2. Thus, even in a case of operating at a high altitude where the cosmic ray dose is high, reliability of the motor control device is improved.

Embodiment 8

Figure 65:
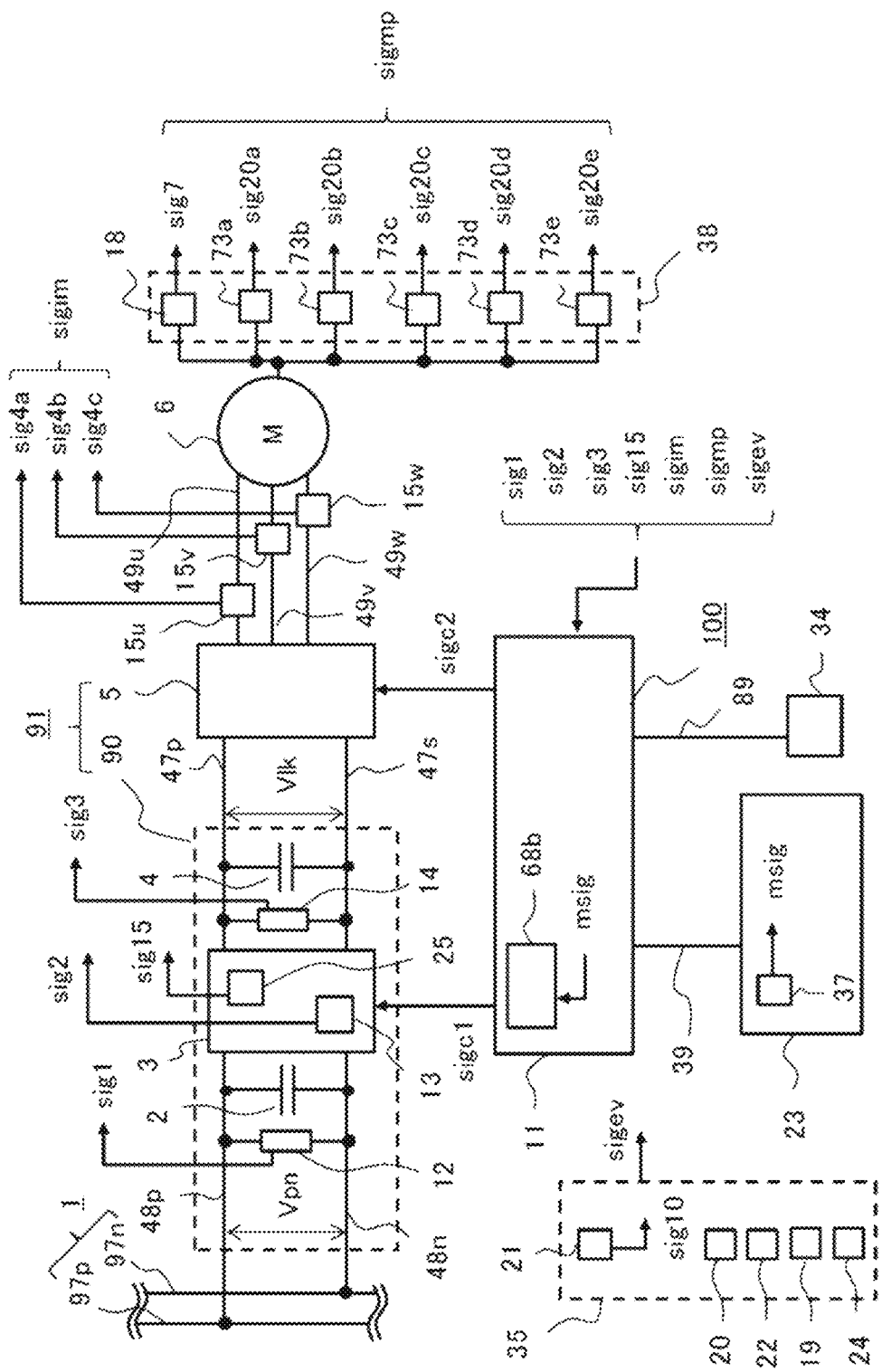
FIG. 65 shows the configuration of a motor control device according to embodiment 8.
Figure 66:
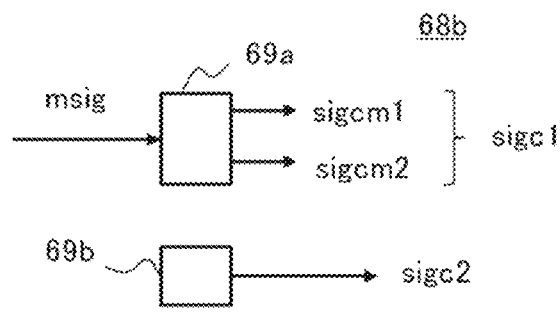
FIG. 66 shows the configuration of a control signal generation unit in FIG. 65.
Figure 67:
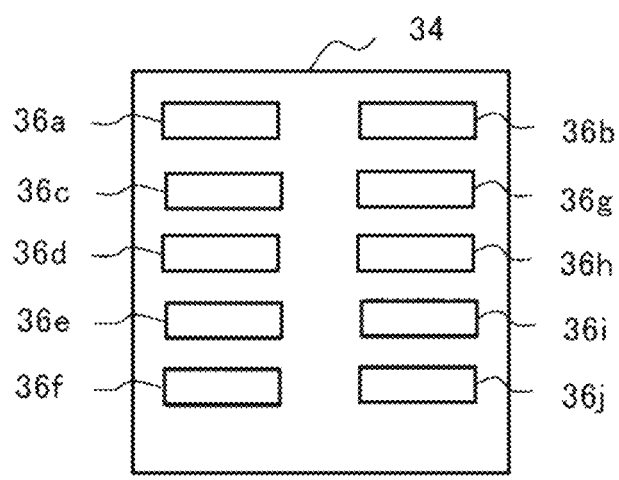
FIG. 67 shows an indication example of a display in FIG. 65.

FIG. 65 shows the configuration of a motor control device according to embodiment 8. FIG. 66 shows the configuration of a control signal generation unit in FIG. 65, and FIG. 67 shows an indication example of a display in FIG. 65. In the motor control device 100 of embodiment 8, the operation mode of the chopper 3 is changed on the basis of an instruction from a pilot. The motor control device 100 of embodiment 8 is different from the motor control device 100 of embodiment 1 in that a display 34 is provided for displaying environmental information detected by the environmental information detection sensors 35, motor parameter information detected by the motor parameter sensors 38, and the like, the operating panel 23 includes a selection switch 37, and the control device 11 includes a control signal generation unit 68b for outputting the control signals sigc1 and sigc2 on the basis of the operation mode signal msig from the selection switch 37. Differences from the motor control device 100 of embodiment 1 will be mainly described. In FIG. 65, as examples of the environmental information detection sensors 35, the outside air pressure sensor 20, the air component concentration sensor 22, the outside air temperature sensor 19, and the radiation sensor 24 described in embodiments 2 to 5, as well as the altitude sensor 21, are provided. In FIG. 65, as examples of the motor parameter sensors 38, the motor speed sensor 73a, the motor output sensor 73b, the motor AC voltage sensor 73c, the motor current sensor 73d, and the motor torque sensor 73e described in the second example (see FIG. 48) of embodiment 7, as well as the position sensor 18, are provided. The display 34 is connected to the control device 11 via a signal line 89.

The control signal generation unit 68b is different from the control signal generation unit 68a shown in FIG. 6 in that the operation mode judgment unit 60 is not provided and the operation mode signal msig outputted from the selection switch 37 of the operating panel 23 is inputted to the first signal generation unit 69a. On the display 34, an altitude indication 36a, a motor output indication 36b, an outside air pressure indication 36c, an air component concentration indication 36d, an outside air temperature indication 36e, a radiation dose indication 36f, a motor speed indication 36g, a motor AC voltage indication 36h, a motor current indication 36i, and a motor torque indication 36j are displayed as an example. The altitude indication 36a is an indication of altitude information detected by the altitude sensor 21, and the motor output indication 36b is an indication of motor output information detected by the motor output sensor 73b. The outside air pressure indication 36c is an indication of outside air pressure information detected by the outside air pressure sensor 20, and the air component concentration indication 36d is an indication of air component concentration information detected by the air component concentration sensor 22. The outside air temperature indication 36e is an indication of outside air temperature information detected by the outside air temperature sensor 19, and the radiation dose indication 36f is an indication of radiation dose information detected by the radiation sensor 24. The motor speed indication 36g is an indication of motor speed information detected by the motor speed sensor 73a, and the motor AC voltage indication 36h is an indication of motor AC voltage information detected by the motor AC voltage sensor 73c. The motor current indication 36i is an indication of motor current information detected by the motor current sensor 73d, and the motor torque indication 36j is an indication of motor torque information detected by the motor torque sensor 73e.

The pilot of the flying object 101 determines whether or not it is possible to change the operation mode of the chopper 3, by referring to values such as the flight altitude, the motor output of the motor 6, and processed information thereof displayed on the display 34, and operates the selection switch 37, to change the operation mode of the chopper 3. When the pilot selects the low voltage mode which is the second operation mode on the operating panel 23, the operation mode signal msig which is the selection information is transmitted to the control device 11 via the signal line 39. In response to the operation mode signal msig at a low level, the control device 11 sets the operation mode to the second operation mode, so that the chopper 3 performs low voltage operation. When the pilot selects the high voltage mode which is the first operation mode on the operating panel 23, the operation mode signal msig which is the selection information is transmitted to the control device 11 via the signal line 39. In response to the operation mode signal msig at a high level, the control device 11 sets the operation mode to the first operation mode, so that the chopper 3 performs high voltage operation.

In the motor control device 100 of embodiment 8, unlike the configuration in which the operation mode of the chopper 3 is automatically changed on the basis of the environmental detected information sigev, the motor parameter detected information sigmp, and the like, the operation mode of the chopper 3 is changed on the basis of an instruction from the pilot who refers to the value of environmental detected information and the value of motor parameter detected information which are displayed as numerical values converted from the environmental detected information sigev, the motor parameter detected information sigmp, and the like. Since the motor control device 100 of embodiment 8 changes the operation mode of the chopper 3 on the basis of an instruction from the pilot who refers to the value of environmental detected information and the value of motor parameter detected information, the same effects as in the motor control device 100 of embodiment 1 are provided. In the motor control device 100 of embodiment 8, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved. In addition, in the motor control device 100 of embodiment 8, even if some of the plurality of environmental information detection sensors 35 and the plurality of motor parameter sensors 38 have failed or the display 34 has failed, it is possible to change the operation mode of the chopper 3 as appropriate through determination by the pilot, and thus, it is possible to restore the motor output even when the motor output or the like has become insufficient unexpectedly.

As described above, the motor control device 100 of embodiment 8 includes the step-down device 90, the power supply device (inverter 5), the control device 11, and the operating panel 23 connected to the control device 11. The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). The operating panel 23 includes the selection switch 37 for selecting the first operation mode Md1 or the second operation mode Md2 of the DC-output power conversion device (chopper 3). In embodiment 8, in a state in which the DC-output power conversion device (chopper 3) is controlled in the first operation mode Md1, when the control device 11 has received the operation mode signal msig for which the second operation mode Md2 is selected from the selection switch 37, the control device 11 controls the DC-output power conversion device (chopper 3) in the second operation mode Md2. In embodiment 8, in a state in which the DC-output power conversion device (chopper 3) is controlled in the second operation mode Md2, when the control device 11 has received the operation mode signal msig for which the first operation mode Md1 is selected from the selection switch 37, the control device 11 controls the DC-output power conversion device (chopper 3) in the first operation mode Md1. With this configuration, in the motor control device 100 of embodiment 8, while the DC-output power conversion device (chopper 3) is controlled in the first operation mode Md1, when the operation mode signal msig for which the second operation mode Md2 is selected is received during control for the motor 6, the DC-output power conversion device (chopper 3) is controlled in the second operation mode Md2. Thus, even in a case of operating at a high altitude where the cosmic ray dose is high, reliability of the motor control device is improved.

Embodiment 9

Figure 68:
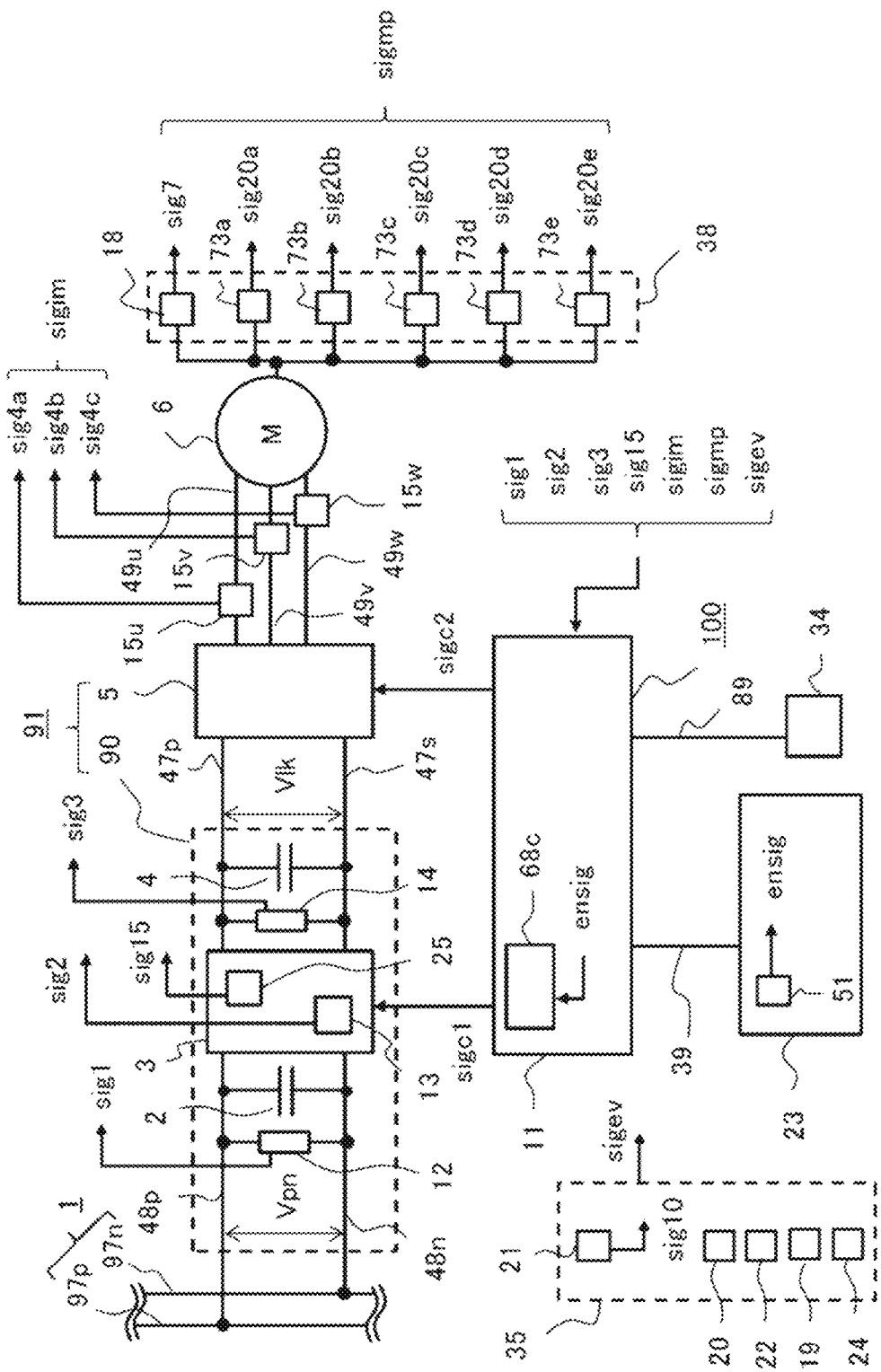
FIG. 68 shows the configuration of a motor control device according to embodiment 9.
Figure 69:
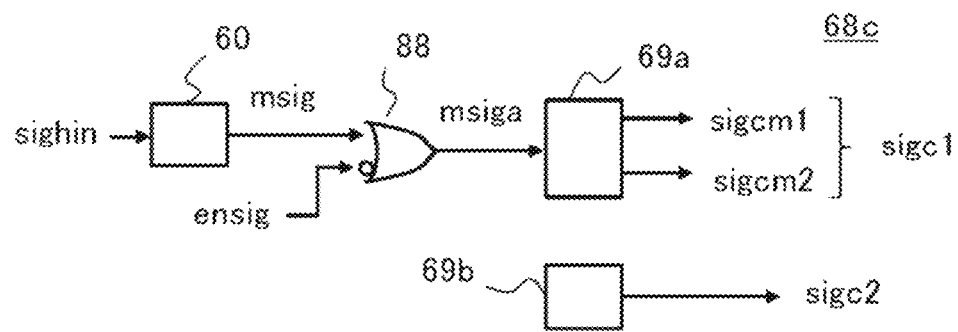
FIG. 69 shows the configuration of a control signal generation unit in FIG. 68.
Figure 70:
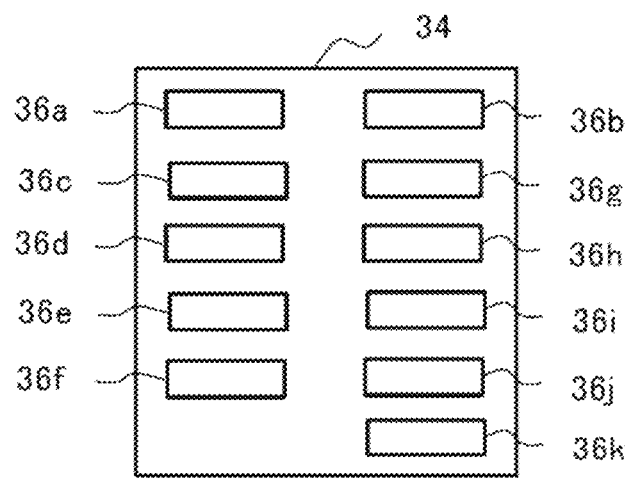
FIG. 70 shows an indication example of a display in FIG. 68.

FIG. 68 shows the configuration of a motor control device according to embodiment 9. FIG. 69 shows the configuration of a control signal generation unit in FIG. 68, and FIG. 70 shows an indication example of a display in FIG. 68. In the motor control device 100 of embodiment 9, the operation mode of the chopper 3 is changed on the basis of operation mode change permission from a pilot, the environmental detected information sigev, the motor parameter detected information sigmp, and the like. The motor control device 100 of embodiment 9 is different from the motor control device 100 of embodiment 8 in that the operating panel 23 includes a permission switch 51 for permitting automatic change of the operation mode, and the control device 11 includes a control signal generation unit 68c for outputting the control signals sigc1 and sigc2 on the basis of a change permission signal ensig from the permission switch 51 and the input information sighin such as the environmental detected information sigev and the motor parameter detected information sigmp. Differences from the motor control device 100 of embodiment 8 and the motor control device 100 of embodiment 1 will be mainly described.

The control signal generation unit 68c is different from the control signal generation unit 68b shown in FIG. 66 in that the operation mode judgment unit 60 and a logical operation circuit 88 are added. The control signal generation unit 68c is different from the control signal generation unit 68a shown in FIG. 6 in that the logical operation circuit 88 is added between the operation mode judgment unit 60 and the first signal generation unit 69a. The logical operation circuit 88 outputs, to the first signal generation unit 69a, an operation mode signal msiga obtained through logical operation between the operation mode signal msig outputted from the operation mode judgment unit 60 and the change permission signal ensig outputted from the permission switch 51. In a case of permitting the operation mode of the chopper 3 to be automatically changed to the low voltage mode which is the second operation mode, the change permission signal ensig indicates a high level, and in a case of not permitting the operation mode of the chopper 3 to be automatically changed to the low voltage mode which is the second operation mode, the change permission signal ensig indicates a low level.

When the change permission signal ensig is at a high level, the logical operation circuit 88 outputs the operation mode signal msig as the operation mode signal msiga. In this case, the control signal generation unit 68c outputs the first mode control signal sigcm1 or the second mode control signal sigcm2 as the control signal sigc1 in accordance with the high/low level of the operation mode signal msig, respectively. Thus, in the case where the change permission signal ensig is at a high level, the control signal generation unit 68c performs control so as to automatically change the operation mode, i.e., so as to perform automatic operation mode change. On the other hand, in the case where the change permission signal ensig is at a low level, the logical operation circuit 88 outputs the operation mode signal msiga indicating a high level. In response to the operation mode signal msiga at a high level, the first signal generation unit 69a outputs, as the control signal sigc1, the first mode control signal sigcm1 for performing control in the first operation mode, i.e., the high voltage mode. Thus, in the case where the change permission signal ensig is at a low level, the control signal generation unit 68c performs control so as not to automatically change the operation mode, i.e., so as not to perform automatic operation mode change. On the display 34, the indications shown in FIG. 67 and an indication of a judgment result of the operation mode judgment unit 60, i.e., a judgment result indication 36k are shown as an example.

The pilot of the flying object 101 determines whether or not it is possible to change the operation mode, by referring to the judgment result of the operation mode judgment unit 60 and values such as the flight altitude and the motor output of the motor 6 displayed on the display 34. The pilot operates the permission switch 51 on the basis of determination for whether or not it is possible to change the operation mode, and determines permission for operation mode change of the chopper 3. As shown in FIG. 8 to FIG. 11, in the first flight state Sd1 when the aircraft which is the flying object 101 starts to fly, the chopper 3 is in the first operation mode Md1, i.e., the high voltage mode. Therefore, the permission for operation mode change of the chopper 3 is permission for automatic change to the second operation mode Md2, i.e., the low voltage mode from the first operation mode Md1, i.e., the high voltage mode at the time of starting operation.

When the pilot permits automatic change to the low voltage mode which is the second operation mode Md2 on the operating panel 23, the permission information, i.e., the change permission signal ensig indicating permission is transmitted to the control device 11 via the signal line 39.

The control device 11 changes the operation mode of the chopper 3 in accordance with the operation mode change methods described in embodiments 1 to 7. For example, the change permission signal ensig indicating permission is a high-level signal, and the change permission signal ensig indicating non-permission is a low-level signal. On the other hand, when the pilot does not permit automatic change to the low voltage mode which is the second operation mode Md2 on the operating panel 23, the non-permission information, i.e., the change permission signal ensig indicating non-permission is transmitted to the control device 11 via the signal line 39. In response to the change permission signal ensig indicating non-permission, the control device 11 fixes the operation mode of the chopper 3 in the high voltage mode which is the first operation mode Md1.

In the motor control device 100 of embodiment 9, the chopper 3 is controlled on the basis of permission/non-permission of automatic operation mode change of the chopper 3 determined by the pilot. In the motor control device 100 of embodiment 9, in a case where automatic operation mode change of the chopper 3 is permitted, the operation mode of the chopper 3 is automatically changed on the basis of the environmental detected information sigev, the motor parameter detected information sigmp, and the like. In the motor control device 100 of embodiment 9, in a case where the automatic operation mode change of the chopper 3 is not permitted, the operation mode of the chopper 3 is fixed in the high voltage mode which is the first operation mode Md1. Since the motor control device 100 of embodiment 9 performs control for the operation mode of the chopper 3 on the basis of determination of permission/non-permission for operation mode change of the chopper 3 by the pilot who refers to values of environmental detected information, values of motor parameter detected information, and the like, the same effects as in the motor control device 100 of embodiment 1 are provided. In the motor control device 100 of embodiment 9, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved. In addition, in the motor control device 100 of embodiment 9, even if some of the plurality of environmental information detection sensors 35 and the plurality of motor parameter sensors 38 have failed or the display 34 has failed, it is possible to change the operation mode of the chopper 3 as appropriate through determination by the pilot, and thus, it is possible to restore the motor output even when the motor output or the like has become insufficient unexpectedly.

As described above, the motor control device 100 of embodiment 9 includes the step-down device 90, the power supply device (inverter 5), the control device 11, and the operating panel 23 connected to the control device 11. The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). The operating panel 23 includes the permission switch 51 for permitting change of the DC-output power conversion device (chopper 3) to the second operation mode Md2. In embodiment 9, in a case where the change permission signal ensig outputted from the permission switch 51 indicates permission, the control device 11 controls the DC-output power conversion device (chopper 3) in the first operation mode Md1 or the second operation mode Md2 by operation mode control A. The control device 11 executes the operation mode control A as follows. That is, when the flying object 101 takes off from the ground, the control device 11 controls the DC-output power conversion device (chopper 3) in the first operation mode Md1, and when the control device 11 judges that flight information which is one or both of information of a motor parameter (motor parameter command detected information sigmpc, motor parameter detected information sigmp, motor parameter estimated information sigmpe) obtained along with control for the motor 6 and information of an environmental factor (environmental detected information sigev) relevant to the flight altitude of the flying object 101, satisfies a predetermined condition, the control device 11 controls the DC-output power conversion device (chopper 3) in the second operation mode Md2. In embodiment 9, in a case where the change permission signal ensig outputted from the permission switch 51 indicates non-permission, the control device 11 controls the DC-output power conversion device (chopper 3) in the first operation mode Md1. With this configuration, in the motor control device 100 of embodiment 9, while the DC-output power conversion device (chopper 3) is controlled in the first operation mode Md1, when the change permission signal ensig outputted from the permission switch 51 indicates permission and the flight information is judged to satisfy the predetermined condition, the DC-output power conversion device (chopper 3) is controlled in the second operation mode Md2. Thus, even in a case of operating at a high altitude where the cosmic ray dose is high, reliability of the motor control device is improved.

Embodiment 10

Figure 71:
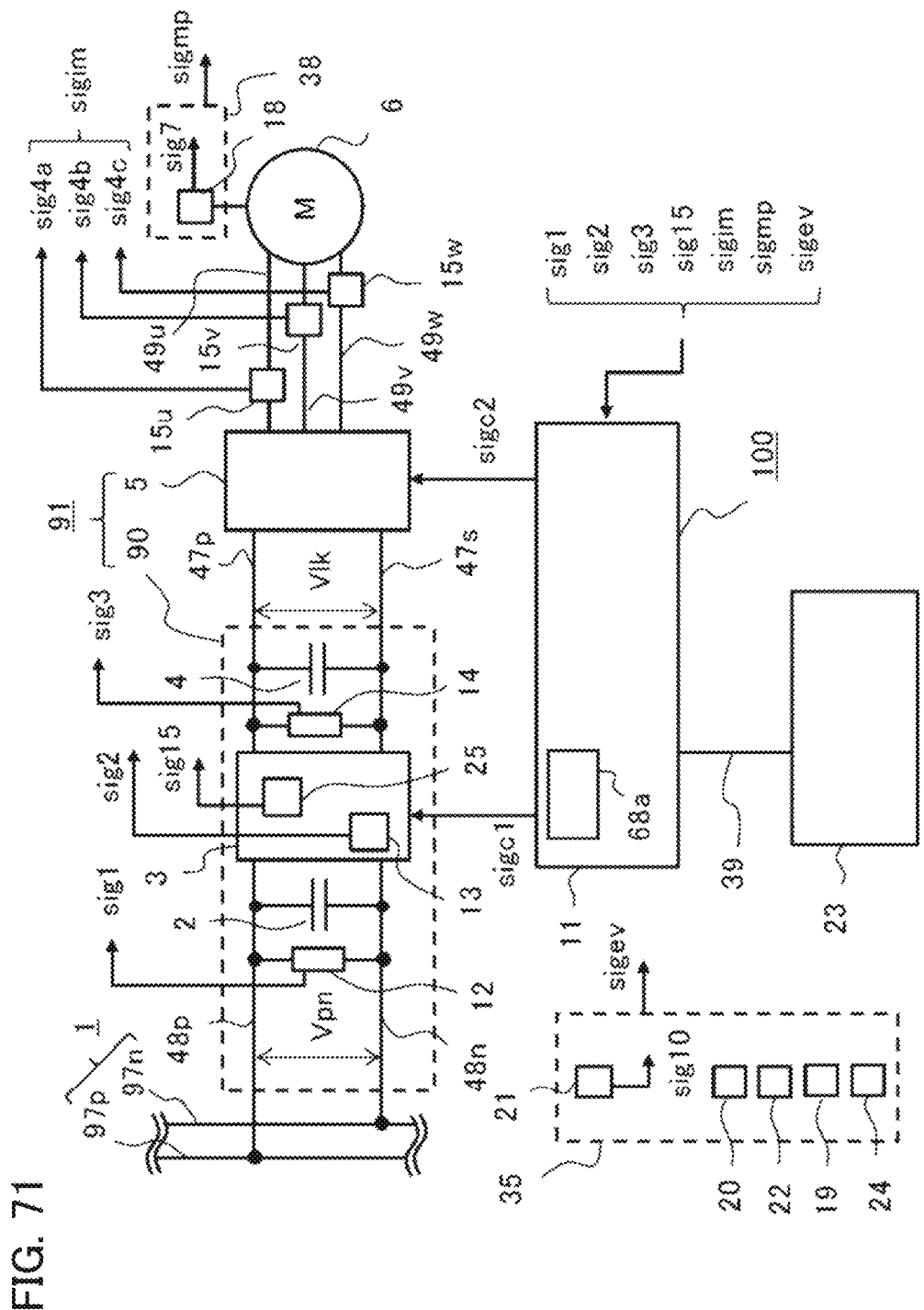
FIG. 71 shows a first example of a motor control device according to embodiment 10.
Figure 72:
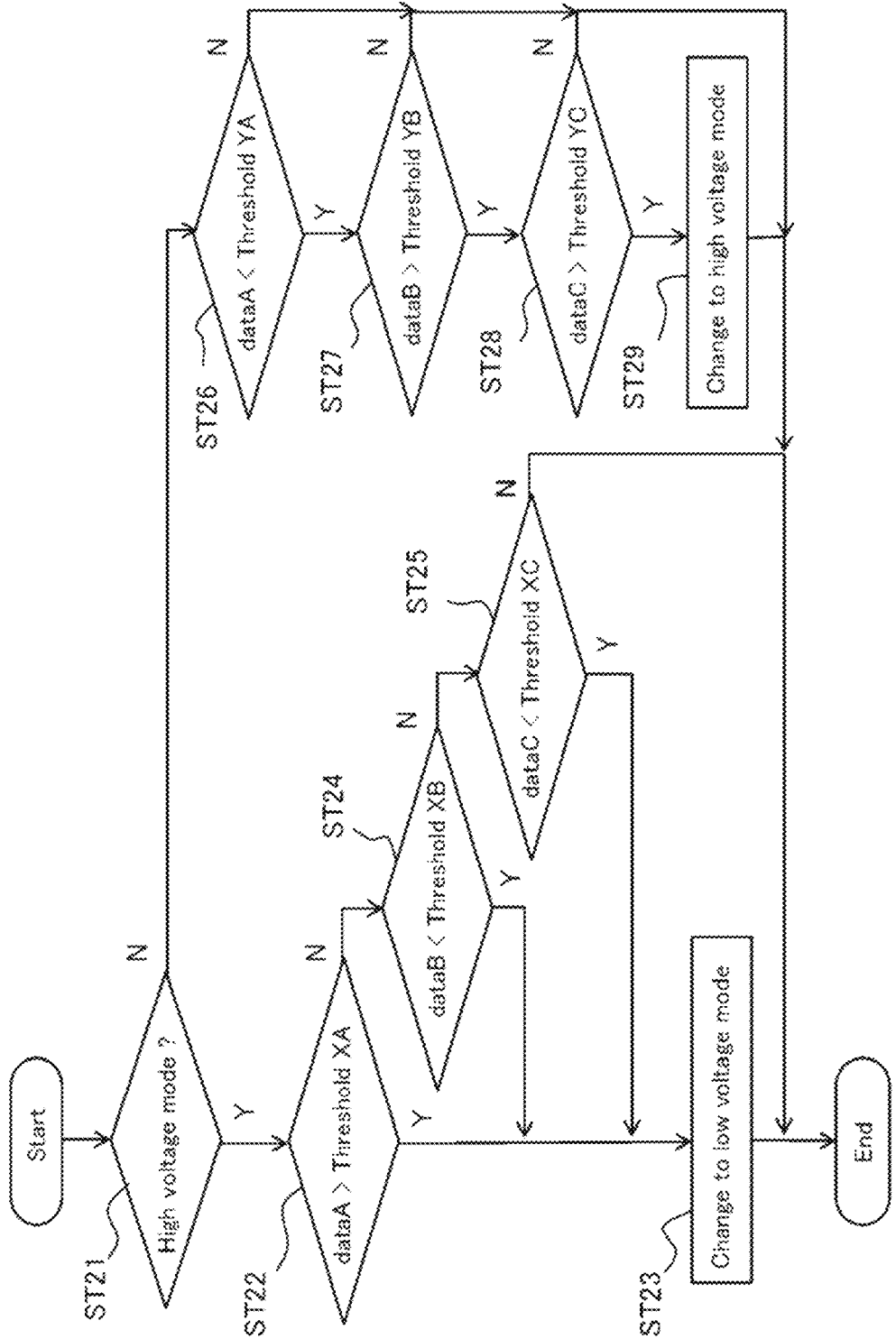
FIG. 72 shows a flowchart for explaining operation of an operation mode judgment unit in FIG. 71.
Figure 74:
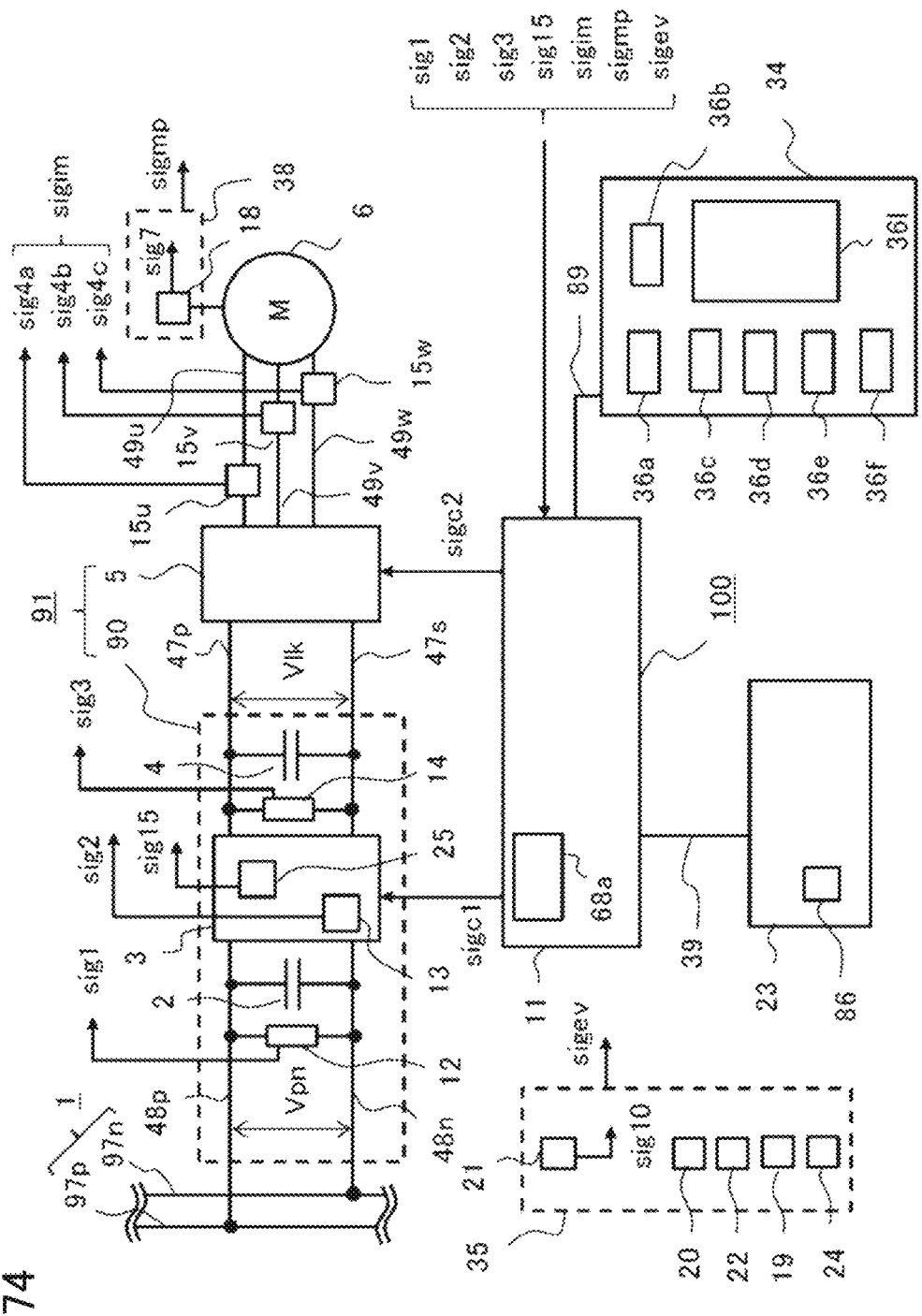
FIG. 74 shows a second example of the motor control device according to embodiment 10.

FIG. 71 shows a first example of a motor control device according to embodiment 10. FIG. 72 shows a flowchart for explaining operation of the operation mode judgment unit in FIG. 71, and FIG. 73 shows priority information according to embodiment 10. FIG. 74 shows a second example of the motor control device according to embodiment 10. In the motor control device 100 according to embodiment 10, the operation mode of the chopper 3 is changed on the basis of two or more kinds of environmental detected information sigev. The motor control device 100 in the first example of embodiment 10 basically has the same configuration as the motor control device 100 of embodiment 1, but includes a plurality of environmental information detection sensors 35 for detecting different environmental factors. In FIG. 71, as examples of the environmental information detection sensors 35, the outside air pressure sensor 20, the air component concentration sensor 22, the outside air temperature sensor 19, and the radiation sensor 24 described in embodiments 2 to 5, as well as the altitude sensor 21, are provided. Differences from the motor control device 100 of embodiment 1 will be mainly described.

In the motor control device 100 of embodiment 10, two or more kinds of factors among the environmental factors relevant to the flight altitude described in embodiments 1 to 6 are used for judgment for operation mode change of the chopper 3. In the high voltage mode which is the first operation mode Md1, since the DC-link voltage Vlk which is the output voltage of the chopper 3 is high, the failure rate due to cosmic rays on the inverter 5 increases, and also electric discharge becomes likely to occur. Therefore, in the motor control device 100 of embodiment 10, shift to the high voltage mode is performed only in a case where all the conditions for selected environmental factors are satisfied, whereby, as compared to the motor control devices 100 of embodiments 1 to 6, the failure rate due to a single event that occurs on the semiconductor elements composing the inverter is reduced, and electric discharge in devices of the motor control device 100 can be suppressed, so that reliability of the motor 6 and the motor control device 100 including the inverter 5 is improved.

Operation of the operation mode judgment unit 60 of the control device 11 will be described with reference to the flowchart in FIG. 72. FIG. 72 shows an example in which whether or not it is possible to change the operation mode of the chopper 3 is judged using three environmental factors. Here, dataA, dataB, and dataC are detected values in the priority information 87 shown in FIG. 73. In the flowchart in FIG. 72, the detected value dataA is a detected value of altitude information, the detected value dataB is a detected value of outside air pressure information, and the detected value dataC is a detected value of outside air temperature information, as an example. A threshold XA for the detected value dataA is the threshold X1 in the column of threshold X* for the altitude information in the priority information 87, a threshold YA for the detected value dataA is the threshold Y1 in the column of threshold Y* for the altitude information in the priority information 87. A threshold XB for the detected value dataB is the threshold X2 in the column of threshold X* for the outside air pressure information in the priority information 87, and a threshold YB for the detected value dataB is the threshold Y2 in the column of threshold Y* for the outside air pressure information in the priority information 87. A threshold XC for the detected value dataC is the threshold X4 in the column of threshold X* for the outside air temperature information in the priority information 87, and a threshold YC for the detected value dataC is the threshold Y4 in the column of threshold Y* for the outside air temperature information in the priority information 87.

In the priority information 87 shown in FIG. 73, three environmental factors, i.e., three kinds of environmental information, are selected in accordance with priority numbers indicating the priority ranks. The highest priority is the altitude information, the second highest priority is the outside air pressure information, and the third highest priority is the outside air temperature information. Judgments for the highest priority are step ST22 and step ST26. Judgments for the second highest priority are step ST24 and step ST27, and judgments for the third highest priority are step ST25 and step ST28. In the priority information 87, "*" of the threshold X* and the threshold Y* is a sign to be replaced with A, B, C, etc. in accordance with priorities. In judgment for each priority, ">" or "<" is selected in accordance with the information type shown in FIG. 14. In the case of the altitude information which is an example in which the information type is upward convex, whether the detected value dataA>the threshold XA is judged in a judgment step for changing to the low voltage mode which is the second operation mode Md2, i.e., step ST22, and whether the detected value dataA<the threshold YA is judged in a judgment step for changing to the high voltage mode which is the first operation mode Md1, i.e., step ST26. In the case of the outside air pressure information which is an example in which the information type is downward convex, whether the detected value dataB<the threshold XB is judged in a judgment step for changing to the low voltage mode which is the second operation mode Md2, i.e., step ST24, and whether the detected value dataB>the threshold YB is judged in a judgment step for changing to the high voltage mode which is the first operation mode Md1, i.e., step ST27. In the case of the outside air temperature information, the information type is downward convex, and therefore ">" and "<" are selected in the same manner as for the outside air pressure information.

First, the outline of the processing flow in FIG. 72 will be described. In a case where the present operation mode is the first operation mode Md1 (high voltage mode), i.e., in a case where the judgement result in step ST21 is YES, operation mode change judgement is performed from a high-order step. Then, if the judgment criterion in the high-order step is satisfied, judgment in a low-order step, i.e., judgment for the remaining factor is omitted and the operation mode is shifted to the second operation mode Md2 (low voltage mode). On the other hand, in a case where the present operation mode is the second operation mode Md2 (low voltage mode), i.e., in a case where the judgment result in step ST21 is NO, operation mode change judgements are performed, and if judgment criteria for all factors for shifting to the first operation mode Md1 (high voltage mode) are satisfied, the operation mode is shifted to the first operation mode Md1 (high voltage mode). In FIG. 72, the altitude information is set as a factor having the highest priority, the outside air pressure information is set as a factor having the second highest priority, and the outside air temperature information is set as a factor having the lowest priority.

In step ST21, whether or not the chopper 3 is in the high voltage mode (first operation mode Md1) is judged. In step ST21, if it is judged that the chopper 3 is in the high voltage mode, the process proceeds to step ST22, and if it is judged that the chopper 3 is not in the high voltage mode, the process proceeds to step ST26. In step ST22, if the detected value dataA of the detected environmental information having the highest priority is greater than the threshold XA, i.e., if the operation mode change judgment criterion is satisfied, the process proceeds to step ST23, and if the detected value dataA of the detected environmental information is not greater than the threshold XA, i.e., if the operation mode change judgment criterion is not satisfied, the process proceeds to step ST24. In step ST24, if the detected value dataB of the detected environmental information having the second highest priority is smaller than the threshold XB, i.e., if the operation mode change judgment criterion is satisfied, the process proceeds to step ST23, and if the detected value dataB of the detected environmental information is not smaller than the threshold XB, i.e., if the operation mode change judgment criterion is not satisfied, the process proceeds to step ST25. In step ST25, if the detected value dataC of the detected environmental information having the third highest priority is smaller than the threshold XC, i.e., if the operation mode change judgment criterion is satisfied, the process proceeds to step ST23, and if the detected value dataC of the detected environmental information is not smaller than the threshold XC, i.e., if the operation mode change judgment criterion is not satisfied, the operation mode signal msig is kept in the high voltage mode and the process is ended. In step ST23, the operation mode signal msig is changed to the low voltage mode and the process is ended.

In step ST26, if the detected value dataA of the detected environmental information having the highest priority is smaller than the threshold YA, i.e., if the operation mode change judgment criterion is satisfied, the process proceeds to step ST27, and if the detected value dataA of the detected environmental information is not smaller than the threshold YA, i.e., if the operation mode change judgment criterion is not satisfied, the operation mode signal msig is kept in the low voltage mode and the process is ended. In step ST27, if the detected value dataB of the detected environmental information having the second highest priority is greater than the threshold YB, i.e., if the operation mode change judgment criterion is satisfied, the process proceeds to step ST28, and if the detected value dataB of the detected environmental information is not greater than the threshold YB, i.e., if the operation mode change judgment criterion is not satisfied, the operation mode signal msig is kept in the low voltage mode and the process is ended. In step ST28, if the detected value dataC of the detected environmental information having the third highest priority is greater than the threshold YC, i.e., if the operation mode change judgment criterion is satisfied, the process proceeds to step ST29, and if the detected value dataC of the detected environmental information is not greater than the threshold YC, i.e., if the operation mode change judgment criterion is not satisfied, the operation mode signal msig is kept in the low voltage mode and the process is ended. In step ST29, the operation mode signal msig is changed to the high voltage mode and the process is ended.

In the above description, the example in which the environmental factors, the thresholds, and the priority ranks to be used for operation mode change judgement have been set in advance in product shipping, has been shown as the first example of the motor control device 100. However, at the time of flight of the flying object 101, the pilot may change the environmental factors, the thresholds, and the priority ranks to be used for operation mode change judgement. FIG. 74 shows the motor control device 100 configured such that the pilot is allowed to change the environmental factors, the thresholds, and the priority ranks to be used for operation mode change judgement. The motor control device 100 in a second example shown in FIG. 74 is different from the motor control device 100 in the first example shown in FIG. 71 in that the display 34 is provided for displaying environmental information detected by the environmental information detection sensor 35, and the like, and the operating panel 23 includes a priority selector 86. The display 34 is connected to the control device 11 via the signal line 89. In FIG. 74, the altitude indication 36a, the motor output indication 36b, the outside air pressure indication 36c, the air component concentration indication 36d, the outside air temperature indication 36e, the radiation dose indication 36f, and a priority information indication 36l are displayed as an example. The priority information indication 36l indicates, for example, the contents in the column of environmental information and the column of priority in the priority information 87. When the pilot inputs a priority number on the priority selector 86, the number is displayed on the column of priority. In the case where the priorities are set as shown in FIG. 73, operation mode change judgements are sequentially performed for the altitude information, the outside air pressure information, and the outside air temperature information in this order.

In the motor control device 100 of embodiment 10, as in the motor control devices 100 of embodiments 1 to 6, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved. Further, in the motor control device 100 of embodiment 10, since two or more kinds of factors among environmental factors are used for judgment for operation mode change of the chopper 3, reliability of the motor 6 and the motor control device 100 including the inverter 5 is more improved than in the motor control devices 100 of embodiments 1 to 6.

In the above description, the example in which change of the chopper 3 between the first operation mode Md1 and the second operation mode Md2 is performed with priorities set for information of environmental factors as in the motor control devices 100 of embodiments 1 to 6, has been shown. However, the present disclosure is not limited thereto. Change of the chopper 3 between the first operation mode Md1 and the second operation mode Md2 may be performed with priorities set for information of motor parameters, i.e., motor parameter commands, motor parameter detected information, or motor parameter estimated information. Alternatively, change of the chopper 3 between the first operation mode Md1 and the second operation mode Md2 may be performed with priorities set for information of environmental factors and information of motor parameters.

As described above, the motor control device 100 of embodiment 10 includes the step-down device 90, the power supply device (inverter 5), and the control device 11. The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). In embodiment 10, on the basis of a plurality of kinds of flight information for which priorities are set, the control device 11 controls the DC-output power conversion device (chopper 3) in the second operation mode Md2 when a first condition is satisfied, the control device 11 controls the DC-output power conversion device (chopper 3) in the first operation mode Md1 when the first condition is not satisfied, the control device 11 controls the DC-output power conversion device (chopper 3) in the first operation mode Md1 when a second condition is satisfied, and the control device 11 controls the DC-output power conversion device (chopper 3) in the second operation mode Md2 when the second condition is not satisfied. The flight information is information of environmental factors (environmental detected information sigev) relevant to the flight altitude of the flying object 101. The first condition is that, in a state in which the DC-output power conversion device (chopper 3) is controlled in the first operation mode Md1, whether or not each information value (detected value dataA, dataB, dataC) based on the flight information has passed through the first flight information threshold (threshold X*) is judged in accordance with the priority, and the information value (detected value dataA, dataB, dataC) based on the flight information corresponding to a selected priority has passed through the first flight information threshold (threshold X*). The second condition is that, in a state in which the DC-output power conversion device (chopper 3) is controlled in the second operation mode Md2, whether or not each information value (detected value dataA, dataB, dataC) based on the flight information has passed through the second flight information threshold (threshold Y*) is judged in accordance with the priority, and the information values (detected values dataA, dataB, dataC) based on all kinds of the flight information for which the priorities are set have passed through the respective second flight information thresholds (thresholds Y*). With this configuration, in the motor control device 100 of embodiment 10, while the DC-output power conversion device (chopper 3) is controlled in the first operation mode Md1, when the flight information is judged to satisfy the predetermined condition, i.e., the first condition or is judged not to satisfy the second condition, the DC-output power conversion device (chopper 3) is controlled in the second operation mode Md2. Thus, even in a case of operating at a high altitude where the cosmic ray dose is high, reliability of the motor control device is improved.

Embodiment 11

Figure 75:
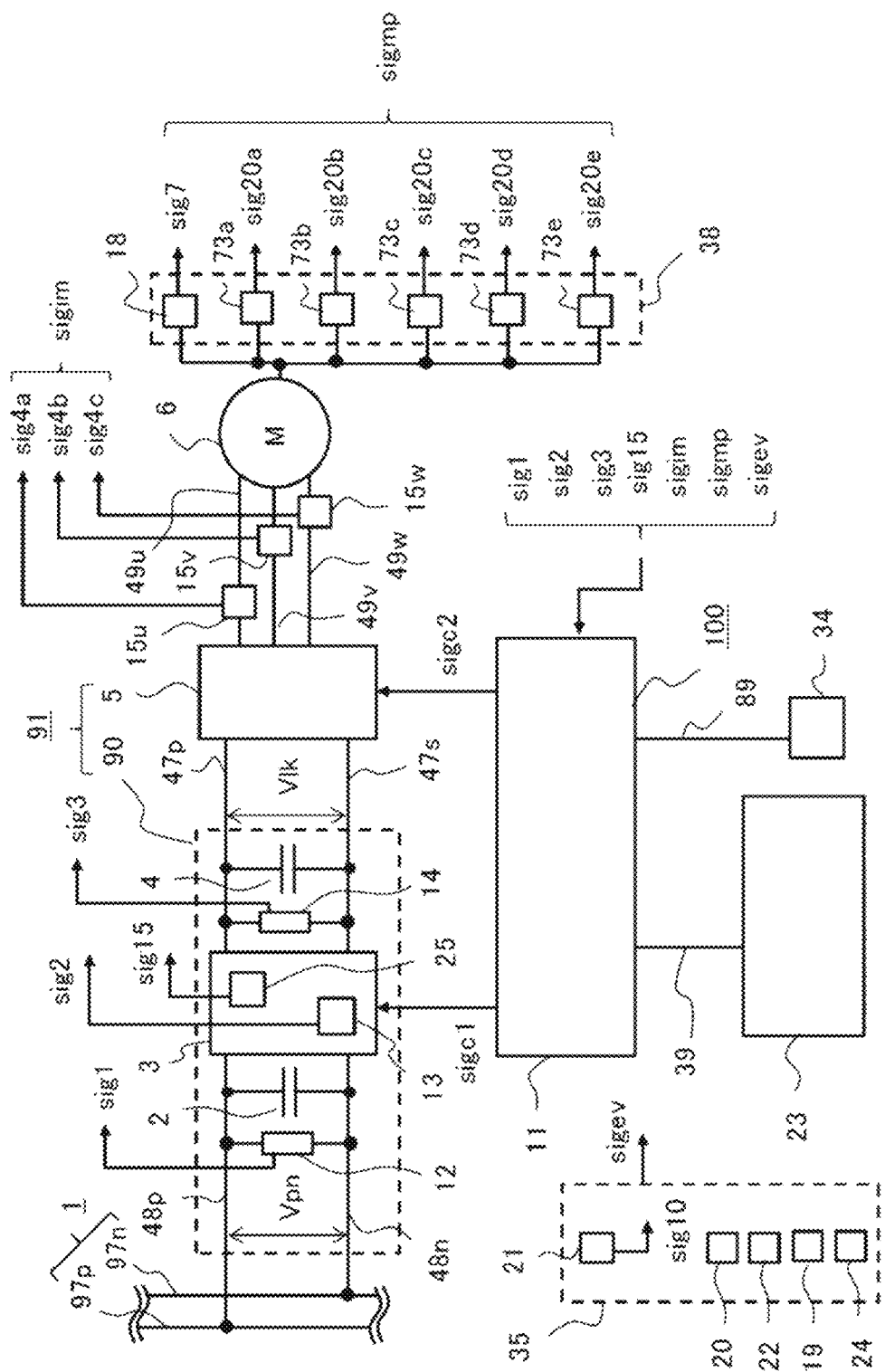
FIG. 75 shows the configuration of a motor control device according to embodiment 11.
Figure 76:
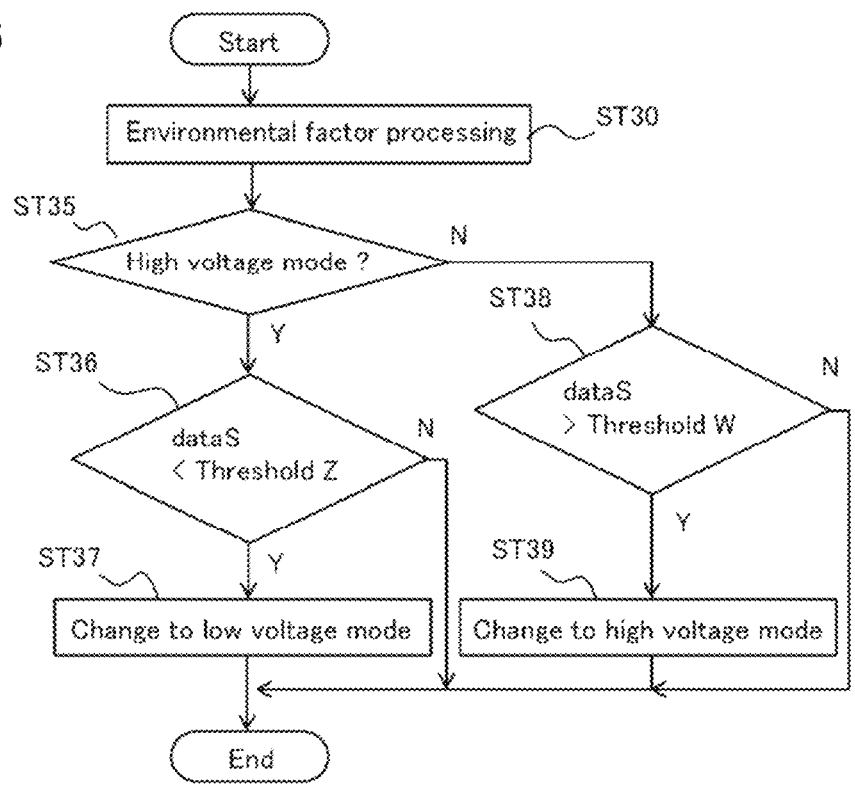
FIG. 76 shows a flowchart in a first example for explaining operation of an operation mode judgment unit in FIG. 75.
Figure 77:
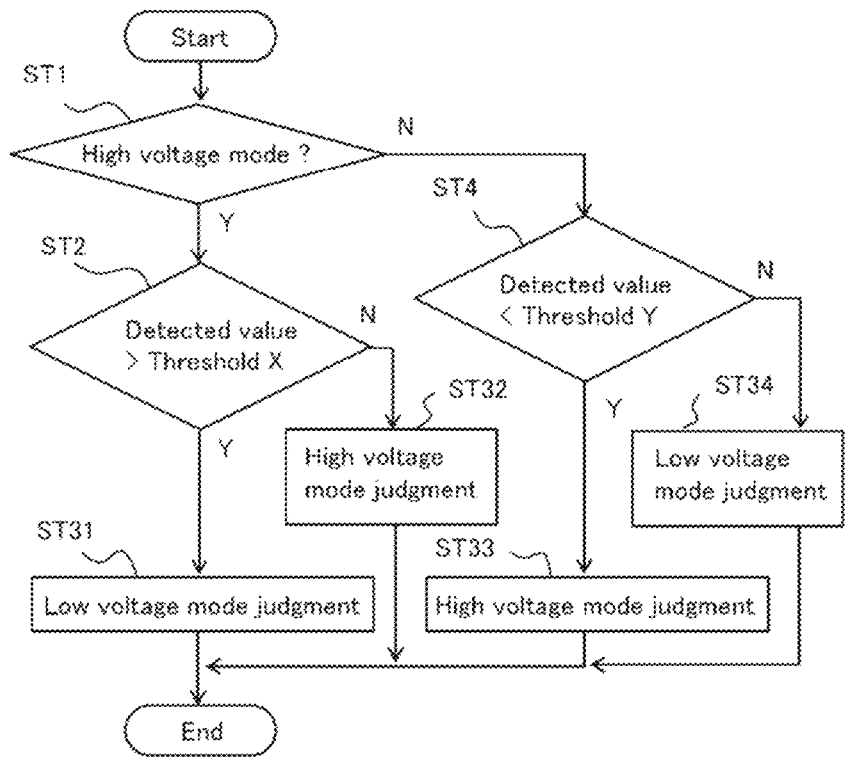
FIG. 77 shows a flowchart in a first example of environmental factor processing in FIG. 76.
Figure 78:
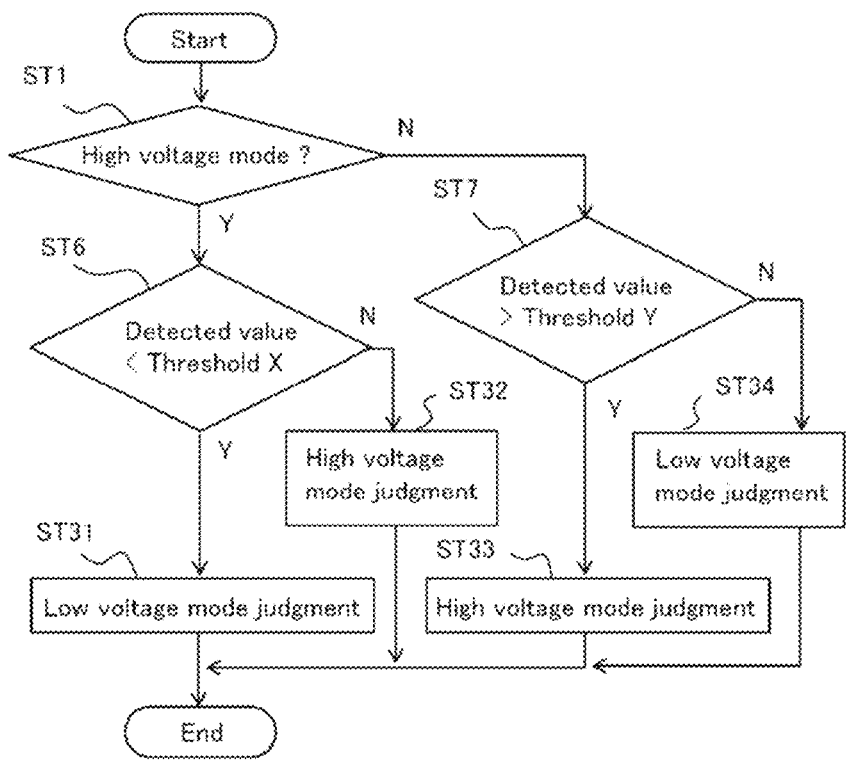
FIG. 78 shows a flowchart in a second example of environmental factor processing in FIG. 76.
Figure 79:
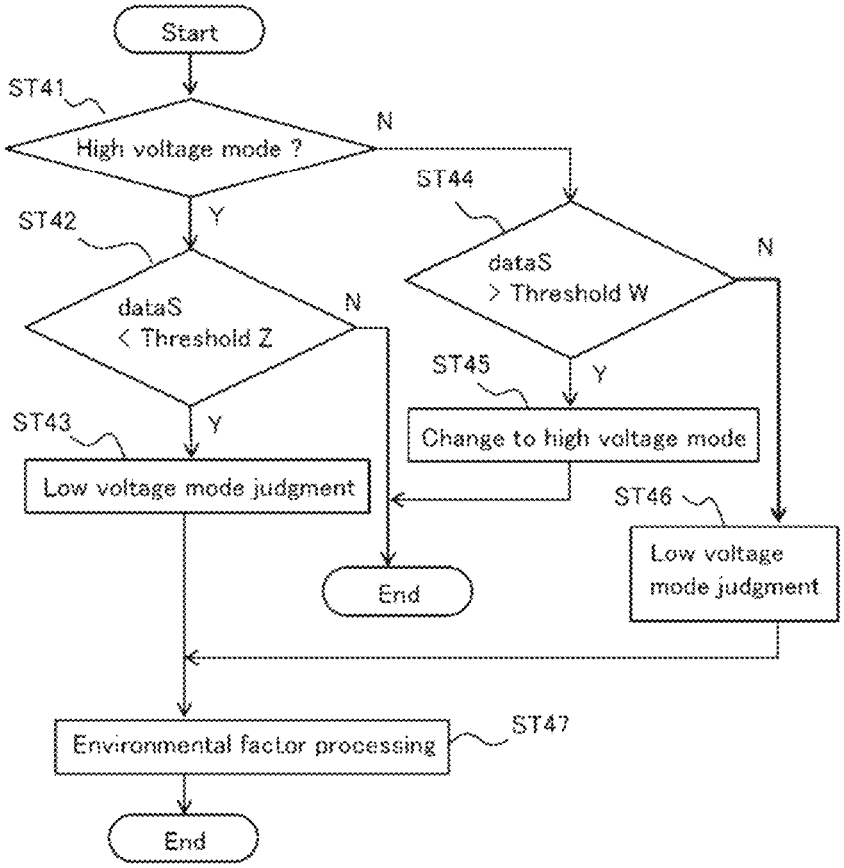
FIG. 79 shows a flowchart in a second example for explaining operation of the operation mode judgment unit in FIG. 75.

FIG. 75 shows the configuration of a motor control device according to embodiment 11, and FIG. 76 shows a flowchart in a first example for explaining operation of an operation mode judgment unit in FIG. 75. FIG. 77 shows a flowchart in a first example of environmental factor processing in FIG. 76, and FIG. 78 shows a flowchart in a second example of environmental factor processing in FIG. 76. FIG. 79 shows a flowchart in a second example for explaining operation of the operation mode judgment unit in FIG. 75. In the motor control device 100 of embodiment 11, the operation mode of the chopper 3 is changed using two kinds of information, i.e., information of environmental factors relevant to the flight altitude shown in embodiments 1 to 6 and information of motor parameters shown in embodiment 7. The motor control device 100 shown in FIG. 75 is configured such that the display 34 is added to the motor control device 100 in FIG. 48, as an example. In FIG. 75, as examples of the environmental information detection sensors 35, the outside air pressure sensor 20, the air component concentration sensor 22, the outside air temperature sensor 19, and the radiation sensor 24 described in embodiments 2 to 5, as well as the altitude sensor 21, are provided. The control device 11 includes the control signal generation unit 68a as in the control devices 11 of embodiments 1 to 7. In a case where the motor parameter commands in the first example of embodiment 7 are used as information of the motor parameters, the control device 11 includes the motor parameter command sensor 70 as in the control device 11 shown in FIG. 34. In a case where estimated information of the motor parameters in the third example of embodiment 7 are used as information of the motor parameters, the control device 11 includes the observer 64 as in the control device 11 shown in FIG. 56.

With reference to FIG. 76 to FIG. 78, the flowcharts in the first example for explaining operation of the operation mode judgment unit 60 of embodiment 11 will be described. In the operation mode judgment unit 60 in the first example of embodiment 11, judgment processing using information of the motor parameter is performed after execution of environmental factor processing in step ST30. The environmental factor processing in step ST30 is first operation mode judgment processing, and the judgment processing using information of the motor parameter is second operation mode judgment processing. In the environmental factor processing, the flowchart shown in FIG. 77, the flowchart shown in FIG. 78, or the like is executed. The flowchart shown in FIG. 77 corresponds to FIG. 15 described in embodiment 1, and the flowchart shown in FIG. 78 corresponds to FIG. 16 described in embodiment 1. The flowchart shown in FIG. 77 is different from the flowchart in FIG. 15 in that steps ST3 and ST5 are respectively replaced with steps ST31 and ST33, and steps ST32 and ST34 are added. The steps ST31 to ST34 which have not been described above will be mainly described. In step ST2, if the detected value of the detected environmental information is greater than the threshold X, i.e., if the operation mode change judgment criterion is satisfied, the process proceeds to step ST31, and if the detected value of the detected environmental information is not greater than the threshold X, i.e., if the operation mode change judgment criterion is not satisfied, the process proceeds to step ST32. In step ST31, a result of operation mode judgment is determined as low voltage mode judgment, i.e., second operation mode judgment. In step ST32, a result of operation mode judgment is determined as high voltage mode judgment, i.e., first operation mode judgment. In step ST4, if the detected value of the detected environmental information is smaller than the threshold Y, i.e., if the operation mode change judgment criterion is satisfied, the process proceeds to step ST33, and if the detected value of the detected environmental information is not smaller than the threshold Y, i.e., if the operation mode change judgment criterion is not satisfied, the process proceeds to step ST34. In step ST33, a result of operation mode judgment is determined as high voltage mode judgment, i.e., first operation mode judgment. In step ST34, a result of operation mode judgment is determined as low voltage mode judgment, i.e., second operation mode judgment.

The flowchart shown in FIG. 78 is different from the flowchart in FIG. 16 in that steps ST3 and ST5 are respectively replaced with steps ST31 and ST33, and steps ST32 and ST34 are added. The steps ST31 to ST34 which have not been described above will be mainly described. In step ST6, if the detected value of the detected environmental information is smaller than the threshold X, i.e., if the operation mode change judgment criterion is satisfied, the process proceeds to step ST31, and if the detected value of the detected environmental information is not smaller than the threshold X, i.e., if the operation mode change judgment criterion is not satisfied, the process proceeds to step ST32. In step ST31, a result of operation mode judgment is determined as low voltage mode judgment, i.e., second operation mode judgment. In step ST32, a result of operation mode judgment is determined as high voltage mode judgment, i.e., first operation mode judgment. In step ST7, if the detected value of the detected environmental information is greater than the threshold Y, i.e., if the operation mode change judgment criterion is satisfied, the process proceeds to step ST33, and if the detected value of the detected environmental information is not greater than the threshold Y, i.e., if the operation mode change judgment criterion is not satisfied, the process proceeds to step ST34. In step ST33, a result of operation mode judgment is determined as high voltage mode judgment, i.e., first operation mode judgment. In step ST34, a result of operation mode judgment is determined as low voltage mode judgment, i.e., second operation mode judgment.

Steps ST35 to ST39 correspond to any of the flowchart in the first example shown in FIG. 47, the flowchart in the second example shown in FIG. 55, and the flowchart in the third example shown in FIG. 64, described in embodiment 7. A motor parameter information value dataS in steps ST36 and ST38 is different among the first example, the second example, and the third example of embodiment 7. In the case of the first example of embodiment 7, the motor parameter information value dataS is a command value for the motor parameter, and the thresholds Z and W are the thresholds Za and Wa, respectively.

In the case of the second example of embodiment 7, the motor parameter information value dataS is a detected value of the motor parameter, and the thresholds Z and W are the thresholds Zb and Wb, respectively. In the case of the third example of embodiment 7, the motor parameter information value dataS is an estimated value of the motor parameter, and the thresholds Z and W are the thresholds Zc and Wc, respectively.

In step ST35, whether or not the judgment result in step ST30 is the high voltage mode (first operation mode) is judged. In step ST35, if it is judged that the judgment result in step ST30 is the high voltage mode, the process proceeds to step ST36, and if it is judged that the judgment result in step ST30 is not the high voltage mode, the process proceeds to step ST38. In step ST36, if the motor parameter information value dataS is smaller than the threshold Z, i.e., if the operation mode change judgment criterion is satisfied, the process proceeds to step ST37, and if the motor parameter information value dataS is not smaller than the threshold Z, i.e., if the operation mode change judgment criterion is not satisfied, the operation mode signal msig is kept in the high voltage mode and the process is ended. In step ST37, the operation mode signal msig is changed to the low voltage mode and the process is ended. In step ST38, if the motor parameter information value dataS is greater than the threshold W, i.e., if the operation mode change judgment criterion is satisfied, the process proceeds to step ST39, and if the motor parameter information value dataS is not greater than the threshold W, i.e., if the operation mode change judgment criterion is not satisfied, the operation mode signal msig is kept in the low voltage mode and the process is ended. In step ST39, the operation mode signal msig is changed to the high voltage mode and the process is ended. In this example, whether or not the judgment result in step ST30 is the high voltage mode is judged in step ST35. However, as shown in FIG. 17 and FIG. 18, in step ST35 which is the first step, whether or not the judgment result in step ST30 is the low voltage mode may be judged. In step ST35, if it is judged that the judgment result in step ST30 is the low voltage mode, the process proceeds to step ST38, and if it is judged that the judgment result in step ST30 is not the low voltage mode, the process proceeds to step ST36.

In the environmental factor processing in step ST30, the example in which the first operation mode judgment processing is performed using one environmental factor, i.e., one kind of environmental information, has been shown. However, the first operation mode judgment processing may be performed using a plurality of environmental factors, i.e., a plurality of kinds of environmental information, described in embodiment 10. For the aircraft which is the flying object 101, satisfying the control command such as the required motor output command is important in performing flight control, and thus information of the motor parameter is more important than information of the environmental factor. Therefore, the operation mode judgment processing using information of the motor parameter may be performed prior to the operation mode judgment processing using information of the environmental factor. In this case, after the operation mode judgment processing using information of the motor parameter is performed, the operation mode judgment processing using information of the environmental factor is performed, and then operation mode judgment is finally determined. In the operation mode judgment processing using information of the motor parameter, if the judgment result is the high voltage mode, the operation mode judgment processing using information of the environmental factor may be skipped. This example is shown in the flowchart in the second example in FIG. 79. The flowchart in the second example in FIG. 79 shows operation of the operation mode judgment unit 60 in the second example of embodiment 11. In the operation mode judgment unit 60 in the second example of embodiment 11, judgment processing using information of the motor parameter is performed, and if low voltage mode judgment, i.e., second operation mode judgment is made in the judgment processing using information of the motor parameter, environmental factor processing in step ST47 is executed.

Steps ST41, ST42, ST44 in FIG. 79 are respectively the same as steps ST35, ST36, ST38 in FIG. 76. In step ST41, whether or not the chopper 3 is in the high voltage mode (first operation mode Md1) is judged. In step ST41, if it is judged that the chopper 3 is in the high voltage mode, the process proceeds to step ST42, and if it is judged that the chopper 3 is not in the high voltage mode, the process proceeds to step ST44. In step ST42, if the motor parameter information value dataS is smaller than the threshold Z, i.e., if the operation mode change judgment criterion is satisfied, the process proceeds to step ST43, and if the motor parameter information value dataS is not smaller than the threshold Z, i.e., if the operation mode change judgment criterion is not satisfied, the operation mode signal msig is kept in the high voltage mode and the process is ended. In step ST43, a result of operation mode judgment is determined as low voltage mode judgment, i.e., second operation mode judgment, and the process proceeds to step ST47. In step ST44, if the motor parameter information value dataS is greater than the threshold W, i.e., if the operation mode change judgment criterion is satisfied, the process proceeds to step ST45, and if the motor parameter information value dataS is not greater than the threshold W, i.e., if the operation mode change judgment criterion is not satisfied, the process proceeds to step ST46. In step ST45, the operation mode signal msig is changed to the high voltage mode and the process is ended. In step ST46, a result of operation mode judgment is determined as low voltage mode judgment, i.e., second operation mode judgment, and the process proceeds to step ST47.

In the environmental factor processing in step ST47, the flowchart shown in FIG. 15, the flowchart shown in FIG. 16, or the like is executed. The flowchart shown in FIG. 15 and the flowchart shown in FIG. 16 have been already described in embodiment 1, and therefore the description thereof is not repeated. It is noted that, since the environmental factor processing in step ST47 is executed in the case where low voltage mode judgment, i.e., second operation mode judgment has been made, a processing flow including only steps ST4 and ST5 or a processing flow including only steps ST7 and ST5 may be performed. In a case where the operation mode change judgment criterion is not satisfied in step ST42, judgement opposite to step ST43 may be made, to determine high voltage mode judgment, i.e., first operation mode judgment, and then, the operation mode signal msig may be kept in the high voltage mode and the process may be ended. In the processing in step ST45, high voltage mode judgment, i.e., first operation mode judgment may be made, and then the operation mode signal msig may be changed to the high voltage mode and the process may be ended.

In the motor control device 100 of embodiment 11, as in the motor control device 100 shown in embodiment 9, operation mode change of the chopper 3 may be automatically performed in a case where operation mode change permission is given by the pilot. In this case, as the control device 11 and the operating panel 23, those shown in FIG. 68 are used. In this case, as in the motor control device 100 of embodiment 9, even if some of the plurality of environmental information detection sensors 35 and the plurality of motor parameter sensors 38 have failed or the display 34 has failed, it is possible to change the operation mode of the chopper 3 as appropriate through determination by the pilot, and thus, it is possible to restore the motor output even when the motor output or the like has become insufficient unexpectedly.

In the motor control device 100 of embodiment 11, as in the motor control devices 100 of embodiments 1 to 7, 9, and 10, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved. Further, in the motor control device 100 including the operation mode judgment unit 60 in the first example of embodiment 11, i.e., in the motor control device 100 in the first example of embodiment 11, final judgment for operation mode change of the chopper 3 and the corresponding control are performed on the basis of information of the motor parameter. Therefore, it is possible to respond to sudden request for changing the motor parameter such as the output of the motor 6 during operation at a high altitude. The motor control device 100 including the operation mode judgment unit 60 in the second example of embodiment 11, i.e., the motor control device 100 in the second example of embodiment 11 is configured such that, if high voltage mode judgment, i.e., first operation mode judgment is made in the judgment processing using information of the motor parameter, the operation mode is changed to the high voltage mode or kept in the high voltage mode and the process is ended, and if low voltage mode judgment, i.e., second operation mode judgment is made in the judgment processing using information of the motor parameter, environmental factor processing is executed. Therefore, it is possible to respond to sudden request for changing the motor parameter such as the output of the motor 6 during operation at a high altitude.

As described above, the motor control device 100 of embodiment 11 controls the motor 6 of the flying object 101 that takes off from the ground and flies. The motor control device 100 includes the step-down device 90 which receives DC power supplied from the DC distribution network 1 as input power and outputs DC power having voltage equal to or smaller than the distribution network voltage Vpn of the DC distribution network 1, the power supply device (inverter 5) which converts the DC power to AC power and outputs the AC power to the motor 6, and the control device 11 for controlling the step-down device 90 and the power supply device (inverter 5). The step-down device 90 includes the DC-output power conversion device (chopper 3) which converts the input power to DC power having voltage equal to or smaller than the distribution network voltage Vpn of the DC distribution network 1, and the output capacitor (capacitor 4) for smoothing the output voltage (DC-link voltage Vlk) of the DC-output power conversion device (chopper 3). The DC-output power conversion device (chopper 3) has the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). When the flying object 101 takes off from the ground, the control device 11 controls the DC-output power conversion device (chopper 3) in the first operation mode Md1, and when the control device 11 judges that flight information which is both of information of a motor parameter (motor parameter command detected information sigmpc, motor parameter detected information sigmp, motor parameter estimated information sigmpe) obtained along with control for the motor 6 and information of an environmental factor (environmental detected information sigev) relevant to the flight altitude of the flying object 101 satisfies a predetermined condition, the control device 11 controls the DC-output power conversion device (chopper 3) in the second operation mode Md2. With this configuration, in the motor control device 100 of embodiment 11, while the DC-output power conversion device (chopper 3) is controlled in the first operation mode Md1, when the flight information is judged to satisfy the predetermined condition, the DC-output power conversion device (chopper 3) is controlled in the second operation mode Md2. Thus, even in a case of operating at a high altitude where the cosmic ray dose is high, reliability of the motor control device is improved.

To describe more specifically, the first motor control device 100 of embodiment 11 includes the step-down device 90, the power supply device (inverter 5), the first control device 11, and the environmental information detection sensor 35 for detecting information of an environmental factor (environmental detected information sigev). The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). The first control device 11 of embodiment 11 generates a judgment result of environmental first operation mode judgment or environmental second operation mode judgment on the basis of the information of the environmental factor (environmental detected information sigev), as follows. In a state in which the DC-output power conversion device (chopper 3) is controlled in the first operation mode Md1, when the first control device 11 judges that the information value (detected value) based on the information of the environmental factor (environmental detected information sigev) has passed through the first environmental threshold (threshold X), the first control device 11 determines a judgment result as environmental second operation mode judgment, and when the first control device 11 judges that the information value (detected value) based on the information of the environmental factor (environmental detected information sigev) has not passed through the first environmental threshold (threshold X), the first control device 11 determines a judgment result as environmental first operation mode judgment. In embodiment 11, in a state in which the DC-output power conversion device (chopper 3) is controlled in the second operation mode Md2, when the first control device 11 judges that the information value (detected value) based on the information of the environmental factor (environmental detected information sigev) has passed through the second environmental threshold (threshold Y), the first control device 11 determines a judgment result as environmental first operation mode judgment, and when the first control device 11 judges that the information value (detected value) based on the information of the environmental factor information (environmental detected information sigev) has not passed through the second environmental threshold (threshold Y), the first control device 11 determines a judgment result as environmental second operation mode judgment. In embodiment 11, when the judgment result based on the information of the environmental factor (environmental detected information sigev) is environmental first operation mode judgment and the first control device 11 judges that the information value (motor parameter information value dataS) based on the information of the motor parameter (motor parameter command detected information sigmpc, motor parameter detected information sigmp, motor parameter estimated information sigmpe) is smaller than the first parameter threshold (threshold Z) (change condition B11a), the first control device 11 controls the DC-output power conversion device (chopper 3) in the second operation mode Md2. In embodiment 11, when the judgment result based on the information of the environmental factor (environmental detected information sigev) is environmental second operation mode judgment and the first control device 11 judges that the information value (motor parameter information value dataS) based on the information of the motor parameter (motor parameter command detected information sigmpc, motor parameter detected information sigmp, motor parameter estimated information sigmpe) is greater than the second parameter threshold (threshold W) greater than the first parameter threshold (threshold Z), the first control device 11 controls the DC-output power conversion device (chopper 3) in the first operation mode Md1. With this configuration, in the motor control device 100 in the first example of embodiment 11, while the DC-output power conversion device (chopper 3) is controlled in the first operation mode Md1, when the flight information is judged to satisfy the predetermined condition, i.e., the change condition B11a, the DC-output power conversion device (chopper 3) is controlled in the second operation mode Md2. Thus, even in a case of operating at a high altitude where the cosmic ray dose is high, reliability of the motor control device is improved.

The second motor control device 100 of embodiment 11 includes the step-down device 90, the power supply device (inverter 5), the second control device 11, and the environmental information detection sensor 35 for detecting information of an environmental factor (environmental detected information sigev). The step-down device 90 includes the DC-output power conversion device (chopper 3) having the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). The second control device 11 of embodiment 11 generates a judgment result of internal first operation mode judgment or internal second operation mode judgment on the basis of the information of the motor parameter (motor parameter command detected information sigmpc, motor parameter detected information sigmp, motor parameter estimated information sigmpe), as follows. In a state in which the DC-output power conversion device (chopper 3) is controlled in the first operation mode Md1, when the second control device 11 judges that the information value (motor parameter information value dataS) based on the information of the motor parameter (motor parameter command detected information sigmpc, motor parameter detected information sigmp, motor parameter estimated information sigmpe) is smaller than the first parameter threshold (threshold Z), the second control device 11 determines a judgment result as internal second operation mode judgment, and when the second control device 11 judges that the information value (motor parameter information value dataS) based on the information of the motor parameter (motor parameter command detected information sigmpc, motor parameter detected information sigmp, motor parameter estimated information sigmpe) is not smaller than the first environmental threshold (threshold Z), the second control device 11 determines a judgment result as internal first operation mode judgment. In embodiment 11, in a state in which the DC-output power conversion device (chopper 3) is controlled in the second operation mode Md2, when the second control device 11 judges that the information value (motor parameter information value dataS) based on the information of the motor parameter (motor parameter command detected information sigmpc, motor parameter detected information sigmp, motor parameter estimated information sigmpe) is greater than the second parameter threshold (threshold W) greater than the first parameter threshold (threshold Z), the second control device 11 determines a judgment result as internal first operation mode judgment, and when the second control device 11 judges that the information value (motor parameter information value dataS) based on the information of the motor parameter (motor parameter command detected information sigmpc, motor parameter detected information sigmp, motor parameter estimated information sigmpe) is not greater than the second parameter threshold (threshold W), the second control device 11 determines a judgment result as internal second operation mode judgment. In embodiment 11, when the judgment result based on the information of the motor parameter (motor parameter command detected information sigmpc, motor parameter detected information sigmp, motor parameter estimated information sigmpe) is internal first operation mode judgment, the second control device 11 controls the DC-output power conversion device (chopper 3) in the first operation mode Md1. In embodiment 11, when the judgment result based on the information of the motor parameter (motor parameter command detected information sigmpc, motor parameter detected information sigmp, motor parameter estimated information sigmpe) is internal second operation mode judgment, and in a state in which the DC-output power conversion device (chopper 3) is controlled in the first operation mode, the second control device 11 judges that the information value (detected value) based on the information of the environmental factor (environmental detected information sigev) has passed through the first environmental threshold (threshold X) (change condition B11b), the second control device 11 controls the DC-output power conversion device (chopper 3) in the second operation mode Md2. In embodiment 11, when the judgment result based on the information of the motor parameter (motor parameter command detected information sigmpc, motor parameter detected information sigmp, motor parameter estimated information sigmpe) is internal second operation mode judgment, and in a state in which the DC-output power conversion device (chopper 3) is controlled in the second operation mode Md2, the second control device 11 judges that the information value (detected value) based on the information of the environmental factor (environmental detected information sigev) has passed through the second environmental threshold (threshold Y), the second control device 11 controls the DC-output power conversion device (chopper 3) in the first operation mode Md1. With this configuration, in the motor control device 100 in the second example of embodiment 11, while the DC-output power conversion device (chopper 3) is controlled in the first operation mode Md1, when the flight information is judged to satisfy the predetermined condition, i.e., the change condition B11b, the DC-output power conversion device (chopper 3) is controlled in the second operation mode Md2. Thus, even in a case of operating at a high altitude where the cosmic ray dose is high, reliability of the motor control device is improved.

Embodiment 12

Figure 80:
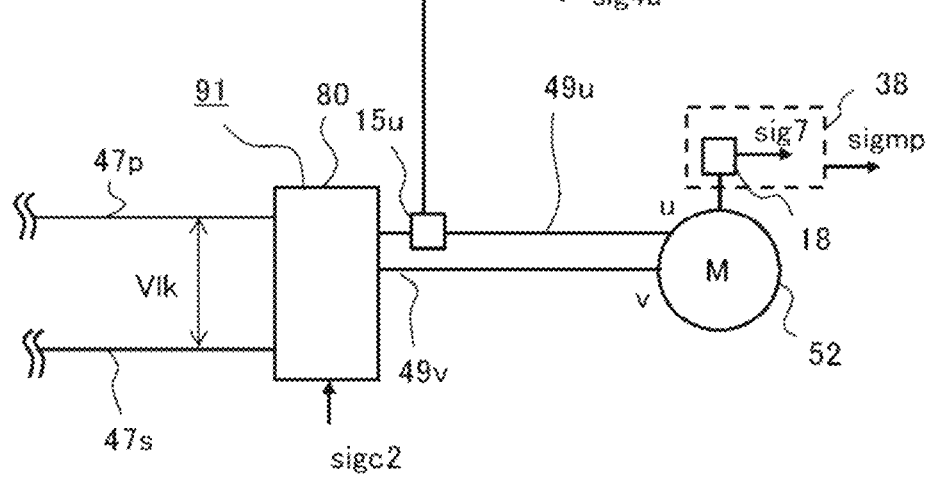
FIG. 80 shows a specific part in a first example of a motor control device according to embodiment 12.
Figure 81:
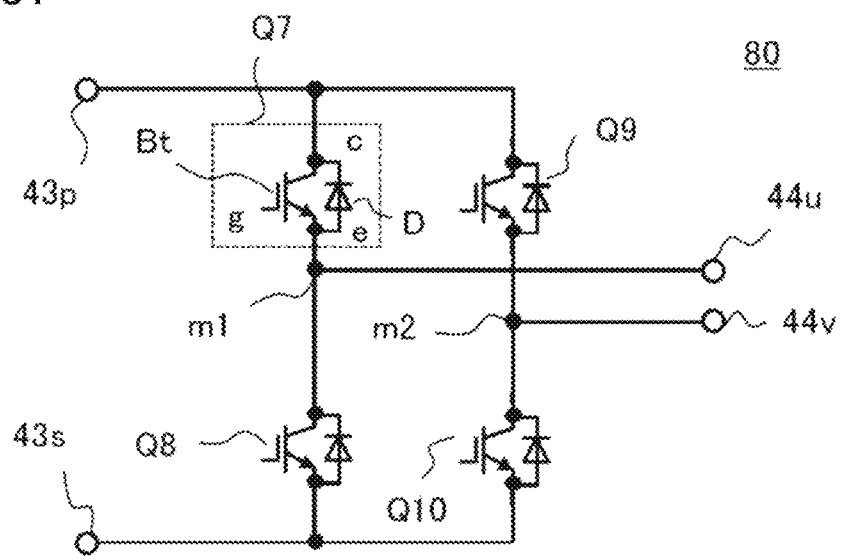
FIG. 81 shows the configuration of an inverter in FIG. 80.
Figure 82:
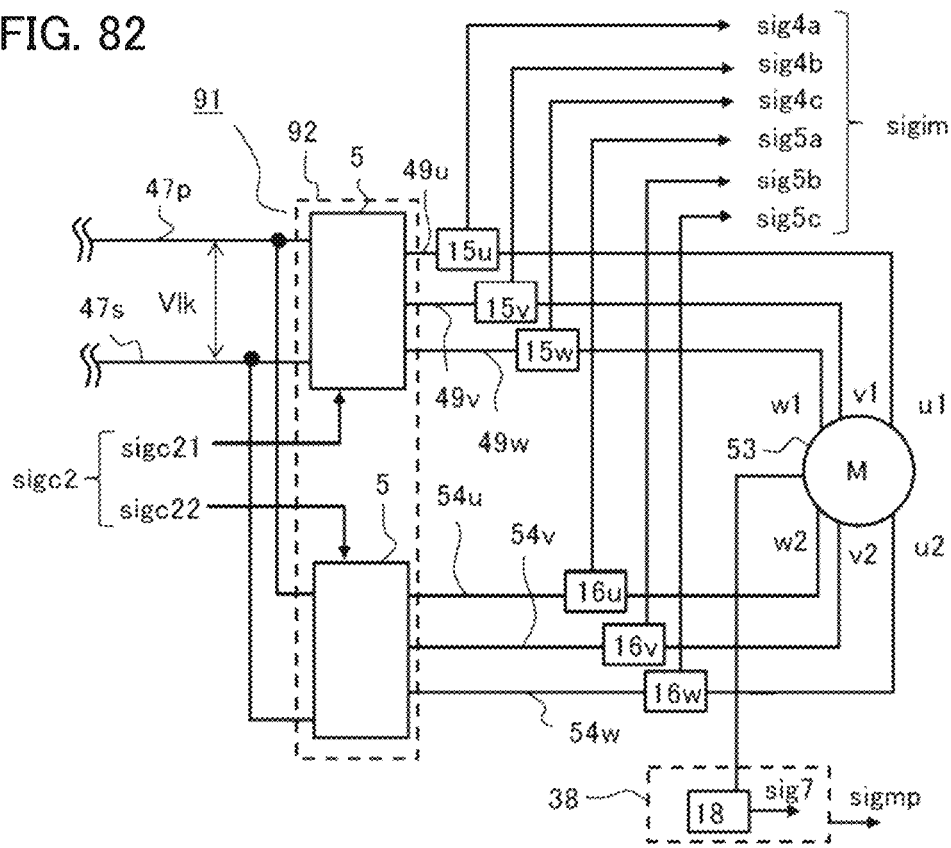
FIG. 82 shows a specific part in a second example of the motor control device according to embodiment 12.

FIG. 80 shows a specific part in a first example of a motor control device according to embodiment 12, and FIG. 81 shows the configuration of an inverter in FIG. 80. FIG. 82 shows a specific part in a second example of the motor control device according to embodiment 12. In the motor control devices 100 of embodiments 1 to 11, a configuration for controlling the motor 6 for three-phase power is used, that is, the inverter 5 has a configuration for three-phase power. However, the present disclosure is not limited thereto. As shown in FIG. 80, a control target motor may be a motor 52 which is a single-phase motor, and the inverter may be an inverter 80 for single-phase power. Alternatively, as shown in FIG. 82, a control target motor may be a motor 53 which is a duplex three-phase motor, and an inverter device 92 for controlling the motor 53 may be provided. The inverter device 92 includes two inverters 5.

In the motor control device 100 of embodiment 12, the same effects as in the motor control devices 100 of embodiments 1 to 11 are provided even when the inverter is the inverter 80 for single-phase power or the inverter device 92 for duplex three-phase power. Differences from the motor control device 100 of embodiment 1 will be mainly described.

The inverter 80 in the motor control device 100 in the first example of embodiment 12 shown in FIG. 81 is different from the inverter 5 shown in FIG. 5 in that the inverter 80 has a two-arm structure composed of semiconductor switching elements Q7 to Q10. In the inverter 80, AC power is outputted from the two output terminals, i.e., the U-side output terminal 44u and the V-side output terminal 44v, to the motor 52, and therefore the V phase current sensor 15v for the V-phase power line 49v is not needed.

The motor 53 has a U phase input terminal u1, a V phase input terminal v1, and a W phase input terminal w1 in a first system and a U phase input terminal u2, a V phase input terminal v2, and a W phase input terminal w2 in a second system. The U-side output terminal 44u, the V-side output terminal 44v, and the W-side output terminal 44w of the inverter 5 in the first system of the inverter device 92 are respectively connected to the U phase input terminal u1, the V phase input terminal v1, and the W phase input terminal w1 in the first system of the motor 53 via the U-phase power line 49u, the V-phase power line 49v, and the W-phase power line 49w. The U-side output terminal 44u, the V-side output terminal 44v, and the W-side output terminal 44w of the inverter 5 in the second system of the inverter device 92 are respectively connected to the U phase input terminal u2, the V phase input terminal v2, and the W phase input terminal w2 in the second system of the motor 53 via a U-phase power line 54u, a V-phase power line 54v, and a W-phase power line 54w. The motor control device 100 in the second example of embodiment 12 is provided with the U phase current sensor 15u, the V phase current sensor 15v, and the W phase current sensor 15w, and in addition, a U phase current sensor 16*u*, a V phase current sensor 16*v*, and a W phase current sensor 16*w*.

The U phase current sensor 15*u* outputs detected information sig4*a* which is information of current flowing through the U-phase power line 49*u*. The V phase current sensor 15*v* outputs detected information sig4*b* which is information of current flowing through the V-phase power line 49*v*, and the W phase current sensor 15*w* outputs detected information sig4*c* which is information of current flowing through the W-phase power line 49*w*. The U phase current sensor 16*u* outputs detected information sig5*a* which is information of current flowing through the U-phase power line 54*u*. The V phase current sensor 16*v* outputs detected information sig5*b* which is information of current flowing through the V-phase power line 54*v*, and the W phase current sensor 16*w* outputs detected information sig5*c* which is information of current flowing through the W-phase power line 54*w*. The detected information sig4*a*, sig4*b*, sig4*c*, sig5*a*, sig5*b*, sig5*c* is motor current detected information sigim.

The control device 11 in the motor control device 100 in the second example of embodiment 12 outputs the control signal sigc1 for controlling the chopper 3 and the control signal sigc2 for controlling the inverter device 92, on the basis of the detected information sig1, sig2, sig3, sig15, the motor current detected information sigim, the motor parameter detected information sigmp, the environmental detected information sigev, and an input signal from the operating panel 23. The control signal sigc2 includes a control signal sigc21 for controlling the inverter 5 in the first system and a control signal sigc22 for controlling the inverter 5 in the second system.

Embodiment 13

Figure 83:
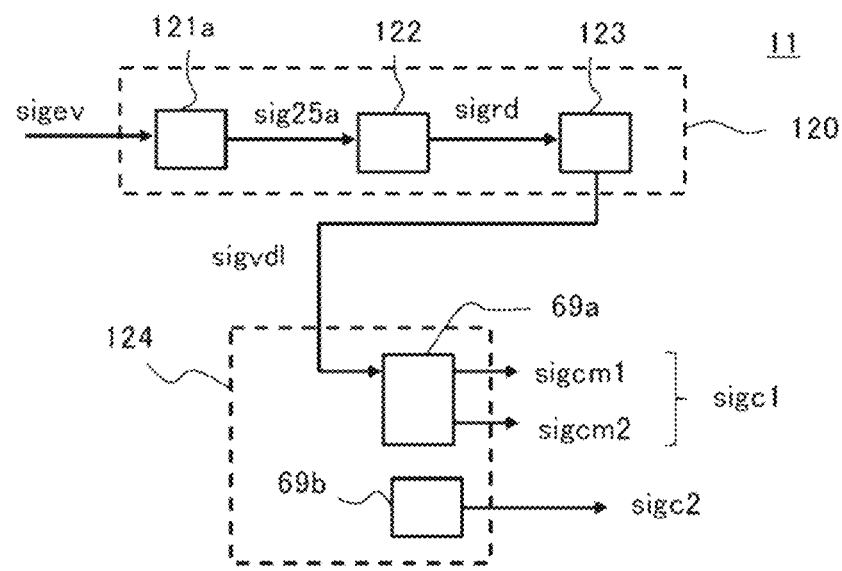
FIG. 83 shows the configuration of a control device in a motor control device according to embodiment 13.
Figure 84:
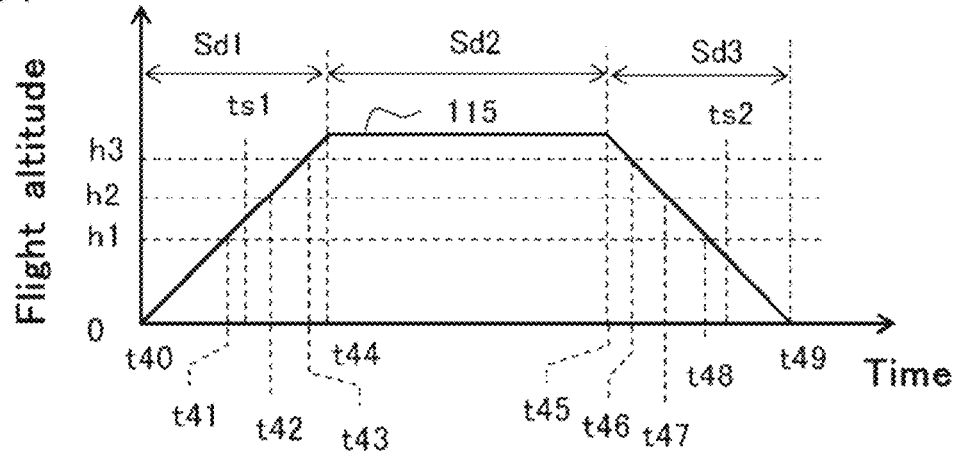
FIG. 84 shows timings of a flight altitude for explaining operation of the motor control device according to embodiment 13.
Figure 85:
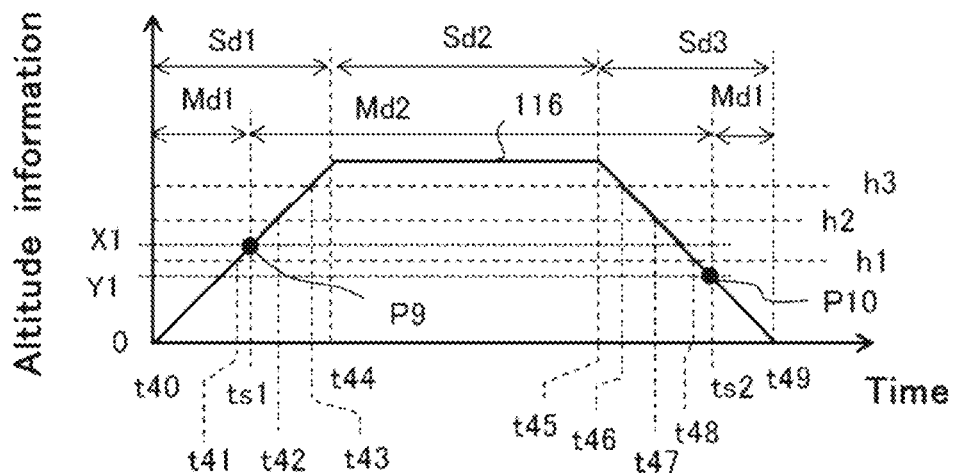
FIG. 85 shows timings of altitude information for explaining operation of the motor control device according to embodiment 13.
Figure 86:
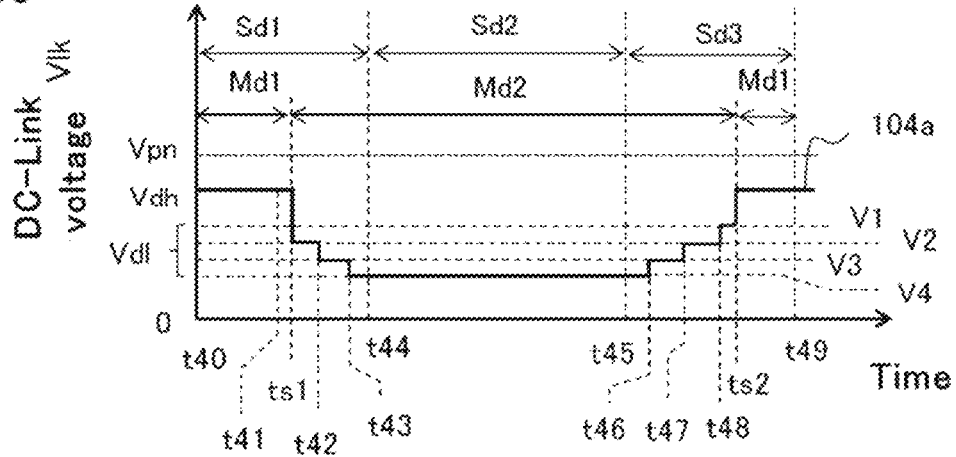
FIG. 86 shows timings of DC-link voltage in a first example for explaining operation of the motor control device according to embodiment 13.
Figure 90:
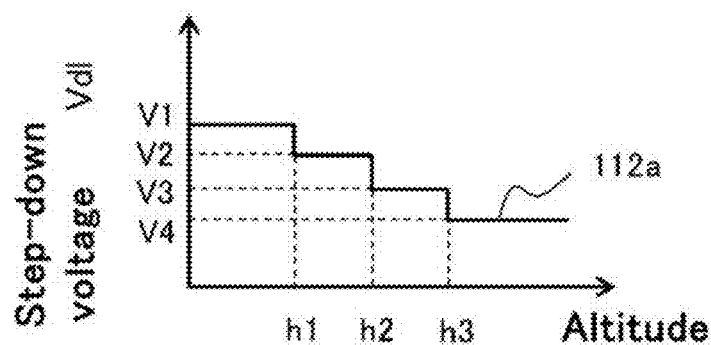
FIG. 90 shows step-down voltage characteristics according to embodiment 13.

FIG. 83 shows the configuration of a control device in a motor control device according to embodiment 13. FIG. 84 shows timings of the flight altitude for explaining operation of the motor control device according to embodiment 13, and FIG. 85 shows timings of altitude information for explaining operation of the motor control device according to embodiment 13. FIG. 86 shows timings of the DC-link voltage in a first example for explaining operation of the motor control device according to embodiment 13, and FIG. 87 shows timings of the DC-link voltage in a second example for explaining operation of the motor control device according to embodiment 13. FIG. 88 shows a data map of a voltage attenuation ratio according to embodiment 13. FIG. 89 shows voltage attenuation ratio characteristics according to embodiment 13, and FIG. 90 shows step-down voltage characteristics according to embodiment 13. In the motor control devices 100 of embodiments 1 to 12, the example in which the first voltage for the first operation mode and the second voltage for the second operation mode are set in advance has been shown. However, the present disclosure is not limited thereto. A set value of the second voltage for the second operation mode in embodiment 13 is different from that of the motor control devices 100 in embodiment 1 to embodiment 12 in that the set value of the second voltage for the operation mode is changed on the basis of the flight information. Differences from the motor control device 100 of embodiment 1 will be mainly described.

The set value of the step-down voltage Vdl which is the second voltage is determined on the basis of, for example, a detected value or an estimated value of the altitude in the space where the motor control device 100 is located, i.e., a detected value or an estimated value of altitude information of the flying object 101. The set value of the step-down voltage Vdl which is the second voltage is determined by a second voltage determination unit 120 described later. The set value of the step-down voltage Vdl which is the second voltage is determined using a preset reference voltage value for the second voltage and a function or a data map that defines a voltage attenuation ratio Rd1 with respect to the detected value or the estimated value of the altitude information, by multiplying the reference voltage value for the second voltage and the voltage attenuation ratio Rd1. The reference voltage value for the second voltage may be a design value at zero meters above sea level. An example in which the voltage attenuation ratio Rd1 has four values R1, R2, R3, R4 will be described. FIG. 88 and FIG. 89 respectively show examples of a data map 102*a* of the voltage attenuation ratio Rd1 and voltage attenuation ratio characteristics 103*a* represented by a function of the voltage attenuation ratio Rd1. FIG. 90 shows step-down voltage characteristics 112*a* calculated using the data map 102*a* or the voltage attenuation ratio characteristics 103*a* of the voltage attenuation ratio Rd1. The data map 102*a* indicates the relationship between the altitude and the value of the voltage attenuation ratio Rd1. In FIG. 89 and FIG. 90, the horizontal axes indicate the altitude. In FIG. 89, the vertical axis indicates the voltage attenuation ratio Rd1, and in FIG. 90, the vertical axis indicates the step-down voltage Vdl. The altitude in FIG. 88 to FIG. 90 is a detected value or an estimated value of altitude information of the flying object 101.

According to the data map 102*a* shown in FIG. 88, when the altitude is less than h1, the value of the voltage attenuation ratio Rd1 is R1; when the altitude is h1 or more and less than h2, the value of the voltage attenuation ratio Rd1 is R2; when the altitude is h2 or more and less than h3, the value of the voltage attenuation ratio Rd1 is R3; and when the altitude is h3 or more, the value of the voltage attenuation ratio Rd1 is R4. Where the reference voltage value for the second voltage is denoted by Vr, the step-down voltage Vdl is represented by Expression (1).

$$Vdl = Rd1 \times Vr \qquad (1)$$

When the value of the voltage attenuation ratio Rd1, i.e., the voltage attenuation ratio value is R1, R2, R3, R4, the value of the step-down voltage Vdl, i.e., the step-down voltage value is V1, V2, V3, V4, respectively. The magnitude relationship of the values R1 to R4 of the voltage attenuation ratio Rd1 is R1<R2<R3<R4, and the magnitude relationship of the values V1 to V4 of the step-down voltage Vdl is V1>V2>V3>V4.

A change method for the set value of the second voltage in embodiment 13 is executed by the control device 11. As shown in FIG. 83, the control device 11 of embodiment 13 includes the second voltage determination unit 120 and a control signal generation unit 124. The control signal generation unit 124 corresponds to each of the control signal generation units 68*a*, 68*b*, 68*c* in embodiments 1 to 11. In FIG. 83, only the first signal generation unit 69*a* and the second signal generation unit 69*b* are shown, while the operation mode judgment unit 60 and the like in each embodiment are not shown. The second voltage determination unit 120 includes an altitude calculation unit 121*a*, a voltage attenuation ratio generation unit 122, and a step-down voltage generation unit 123. The altitude calculation unit 121*a* calculates an altitude value on the basis of the environmental detected information sigev, and outputs an altitude signal sig25*a* indicating the altitude value. The voltage attenuation ratio generation unit 122 has the data map 102*a* or the voltage attenuation ratio characteristics 103*a*. On the basis of the altitude value h1, h2, h3, etc. indicated by the altitude signal sig25*a*, the voltage attenuation ratio generation unit 122 outputs a voltage attenuation ratio signal sigrd indicating the voltage attenuation ratio value of the voltage attenuation ratio Rd1, using the data map 102*a* or the voltage attenuation ratio characteristics 103*a*. The step-down voltage generation unit 123 calculates the step-down voltage Vdl using Expression (1) from the voltage attenuation ratio value R1, R2, R3, R4, etc. indicated by the voltage attenuation ratio signal sigrd, and the reference voltage value Vr, and outputs a step-down voltage signal sigvdl indicating the step-down voltage value. When generating the second mode control signal sigcm2, the first signal generation unit 69*a* in the control signal generation unit 124 outputs the second mode control signal sigcm2 with a timing different in accordance with the step-down voltage value V1, V2, V3, V4, etc. indicated by the step-down voltage signal sigvdl.

In response to the second mode control signal sigcm2 with a timing corresponding to the step-down voltage value V1, the chopper 3 undergoes control of the semiconductor switching elements Q1 to Q4 or the semiconductor switching elements Q5, Q6, to output the step-down voltage Vdl having the step-down voltage value V1. Similarly, in response to the second mode control signal sigcm2 with a timing corresponding to the step-down voltage value V2, V3, V4, etc., the chopper 3 undergoes control of the semiconductor switching elements Q1 to Q4 or the semiconductor switching elements Q5, Q6, to output the step-down voltage Vdl having the step-down voltage value V2, V3, V4, etc.

It is assumed that the flight altitude of the aircraft which is the flying object 101 provided with the motor control device 100 changes as in flight altitude characteristics 115 shown in FIG. 84. In FIG. 84, the horizontal axis indicates time, and the vertical axis indicates the flight altitude. The aircraft starts to ascend at time t40, the flight altitude value passes through h1, h2, h3 respectively at times t41, t42, t43, and the aircraft cruises at a constant altitude from time t44 to time t45. The aircraft starts to descend at time t45, the flight altitude value passes through h3, h2, h1 respectively at times t46, t47, t48, and the aircraft lands on the ground at time t49. A state from time t40 to time t44 is a first flight state Sd1, a state from time t44 to time t45 is a second flight state Sd2, and a state from time t45 to time t49 is a third flight state Sd3. In the case where the aircraft provided with the motor control device 100 flies as shown in FIG. 84, characteristics of altitude information calculated from the environmental detected information sigev outputted from the environmental information detection sensor 35 are as shown in altitude information characteristics 116 in FIG. 85, and the DC-link voltage Vlk of the chopper 3 changes as in DC-link voltage characteristics 104*a* shown in FIG. 86 or DC-link voltage characteristics 111*a* shown in FIG. 87. In FIG. 85, the horizontal axis indicates time, and the vertical axis indicates the altitude information. In FIG. 86 and FIG. 87, the horizontal axes indicate time, and the vertical axes indicate the DC-link voltage Vlk. The altitude information characteristics 116 correspond to the detected altitude information characteristics 56*a* described in embodiment 1 or the estimated altitude information characteristics 57 described in embodiment 6.

In the first flight state Sd1, when the altitude information indicates a value higher than the threshold X1, the control device 11 in the motor control device 100 of embodiment 13 changes the operation mode to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage. When the altitude information becomes higher than the threshold X1 at time ts1, the DC-link voltage Vlk changes from the step-down voltage Vdh or the distribution network voltage Vpn which is the first voltage to the step-down voltage Vdl which is the second voltage, at time ts1. The control device 11 keeps the low voltage operation of the chopper 3 in the second flight state Sd2 from time t44 to time t45. During operation in the second operation mode Md2, i.e., the low voltage mode, if, in the third flight state Sd3, the altitude information indicates a value lower than the threshold Y1, the control device 11 changes the operation mode to the first operation mode Md1, i.e., the high voltage mode, to start high voltage operation of the chopper 3, thus increasing the DC-link voltage Vlk to the step-down voltage Vdh or the distribution network voltage Vpn which is the first voltage. When the altitude information becomes lower than the threshold Y1 at time ts2, the DC-link voltage Vlk changes from the step-down voltage Vdl which is the second voltage to the step-down voltage Vdh or the distribution network voltage Vpn which is the first voltage, at time ts2. In embodiment 13, the threshold X1 is higher than the threshold Y1. A point where the altitude information in the altitude information characteristics 116 in the first flight state Sd1 becomes the threshold X1 is a mode change point P9, and a point where the altitude information in the altitude information characteristics 116 in the third flight state Sd3 becomes the threshold Y1 is a mode change point P10.

The values of the step-down voltage Vdl which is the second voltage, i.e., the step-down voltage values V1, V2, V3, V4 will be described. The relationship between the thresholds X1 and Y1 and the values of the altitude, i.e., the altitude values, is as follows. The threshold X1 is more than the altitude value h1 and less than the altitude value h2, and the threshold Y1 is less than the altitude value h1. At time ts1, the step-down voltage Vdl becomes the step-down voltage value V2. Since the threshold X1 is the altitude value h1 or more and less than the altitude value h2, the voltage attenuation ratio Rd1 becomes the voltage attenuation ratio value R2 on the basis of the data map 102*a* or the voltage attenuation ratio characteristics 103*a*. Therefore, at time ts1, the step-down voltage Vdl becomes the step-down voltage value V2 in accordance with the step-down voltage characteristics 112*a*. When the altitude information becomes the altitude value h2 at time t42, the voltage attenuation ratio Rd1 becomes the voltage attenuation ratio value R3 on the basis of the data map 102*a* or the voltage attenuation ratio characteristics 103*a*. Therefore, at time t42, the step-down voltage Vdl becomes the step-down voltage value V3 in accordance with the step-down voltage characteristics 112*a*. When the altitude information becomes the altitude value h3 at time t43, the voltage attenuation ratio Rd1 becomes the voltage attenuation ratio value R4 on the basis of the data map 102*a* or the voltage attenuation ratio characteristics 103*a*. Therefore, at time t43, the step-down voltage Vdl becomes the step-down voltage value V4 in accordance with the step-down voltage characteristics 112*a*.

In the second flight state Sd2 from time t44 to time t45, the altitude information is the altitude value h3 or more. Therefore, the step-down voltage Vdl remains the step-down voltage value V4 in accordance with the step-down voltage characteristics 112*a*. At time t45, the aircraft starts to descend. Then, at time t46, when the altitude information passes through the altitude value h3 so as to be less than the altitude value h3, the voltage attenuation ratio Rd1 becomes the voltage attenuation ratio value R3 on the basis of the data map 102a or the voltage attenuation ratio characteristics 103a. Therefore, at time t46, the step-down voltage Vdl becomes the step-down voltage value V3 in accordance with the step-down voltage characteristics 112a. At time t47, when the altitude information passes through the altitude value h2 so as to be less than the altitude value h2, the voltage attenuation ratio Rd1 becomes the voltage attenuation ratio value R2 on the basis of the data map 102a or the voltage attenuation ratio characteristics 103a. Therefore, at time t47, the step-down voltage Vdl becomes the step-down voltage value V2 in accordance with the step-down voltage characteristics 112a. At time t48, when the altitude information passes through the altitude value h1 so as to be less than the altitude value h1, the voltage attenuation ratio Rd1 becomes the voltage attenuation ratio value R1 on the basis of the data map 102a or the voltage attenuation ratio characteristics 103a. Therefore, at time t48, the step-down voltage Vdl becomes the step-down voltage value V1 in accordance with the step-down voltage characteristics 112a. At time ts2, when the altitude information becomes lower than the threshold Y1, the DC-link voltage Vlk changes from the step-down voltage Vdl which is the second voltage having the step-down voltage value V1 to the step-down voltage Vdh or the distribution network voltage Vpn which is the first voltage.

In the above description, operation of the motor control device 100 of embodiment 13 has been described using the example in which the control method in embodiment 1 is applied. However, the change method for the set value of the second voltage in embodiment 13 is also applicable to the motor control devices 100 of embodiments 2 to 12. In a case of applying the change method for the set value of the second voltage to the motor control devices 100 of embodiments 2 to 7, 10, and 11, the second voltage determination unit 120 is added in the control device 11 in the motor control device 100 of each embodiment, and the step-down voltage signal sigvdl outputted from the second voltage determination unit 120 is inputted to the first signal generation unit 69a of the control signal generation unit 68a. In a case of applying the change method for the set value of the second voltage to the motor control device 100 of embodiment 8, the second voltage determination unit 120 is added in the control device 11 in the motor control device 100 of embodiment 8, and the step-down voltage signal sigvdl outputted from the second voltage determination unit 120 is inputted to the first signal generation unit 69a of the control signal generation unit 68b. In a case of applying the change method for the set value of the second voltage to the motor control device 100 of embodiment 9, the second voltage determination unit 120 is added in the control device 11 in the motor control device 100 of embodiment 9, and the step-down voltage signal sigvdl outputted from the second voltage determination unit 120 is inputted to the first signal generation unit 69a of the control signal generation unit 68c.

The motor control device 100 of embodiment 13 is the same as the motor control devices 100 of embodiments 1 to 12 except that the set value of the second voltage in the second operation mode is changed on the basis of the flight information. Therefore, the same effects as in the motor control devices 100 of embodiments 1 to 12 are provided. In the motor control device 100 of embodiment 13, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved. In addition, in the motor control device 100 of embodiment 13, the set value of the second voltage in the second operation mode need not be set in advance and therefore it is unnecessary to adjust the set value of the second voltage when mounting the motor control device 100.

As described above, the motor control device 100 of embodiment 13 controls the motor 6 of the flying object 101 that takes off from the ground and flies. The motor control device 100 includes the step-down device 90 which receives DC power supplied from the DC distribution network 1 as input power and outputs DC power having voltage equal to or smaller than the distribution network voltage Vpn of the DC distribution network 1, the power supply device (inverter 5) which converts the DC power to AC power and outputs the AC power to the motor 6, and the control device 11 for controlling the step-down device 90 and the power supply device (inverter 5). The step-down device 90 includes the DC-output power conversion device (chopper 3) which converts the input power to DC power having voltage equal to or smaller than the distribution network voltage Vpn of the DC distribution network 1, and the output capacitor (capacitor 4) for smoothing the output voltage (DC-link voltage Vlk) of the DC-output power conversion device (chopper 3). The DC-output power conversion device (chopper 3) has the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). The control device 11 includes the second voltage determination unit 120 which determines the voltage value (step-down voltage value V1, V2, V3, V4) of the second voltage (step-down voltage Vdl) on the basis of the detected value or the estimated value (altitude value h1, h2, h3) of the flight altitude of the flying object 101, and when controlling the DC-output power conversion device (chopper 3) in the second operation mode Md2, the control device 11 outputs the control signal sigc1 in accordance with the voltage value (step-down voltage value V1, V2, V3, V4) of the second voltage (step-down voltage Vdl) determined by the second voltage determination unit 120, to the DC-output power conversion device (chopper 3). When the flying object 101 takes off from the ground, the control device 11 controls the DC-output power conversion device (chopper 3) in the first operation mode Md1, and when the control device 11 judges that flight information which is one or both of information of a motor parameter (motor parameter command detected information sigmpc, motor parameter detected information sigmp, motor parameter estimated information sigmpe) obtained along with control for the motor 6 and information of an environmental factor (environmental detected information sigev) relevant to the flight altitude of the flying object 101, satisfies a predetermined condition, or when the control device 11 has received the operation mode signal msig for which the second operation mode Md2 is selected on the basis of the flight information during control for the motor 6, the control device 11 controls the DC-output power conversion device (chopper 3) in the second operation mode Md2. With this configuration, in the motor control device 100 of embodiment 13, while the DC-output power conversion device (chopper 3) is controlled in the first operation mode Md1, when the flight information is judged to satisfy a predetermined condition, or when the operation mode signal msig for which the second operation mode Md2 is selected is received during control for the motor 6, the DC-output power conversion device (chopper 3) is controlled in the second operation mode Md2. Thus, even in a case of operating at a high altitude where the cosmic ray dose is high, reliability of the motor control device is improved.

Embodiment 14

Figure 91:
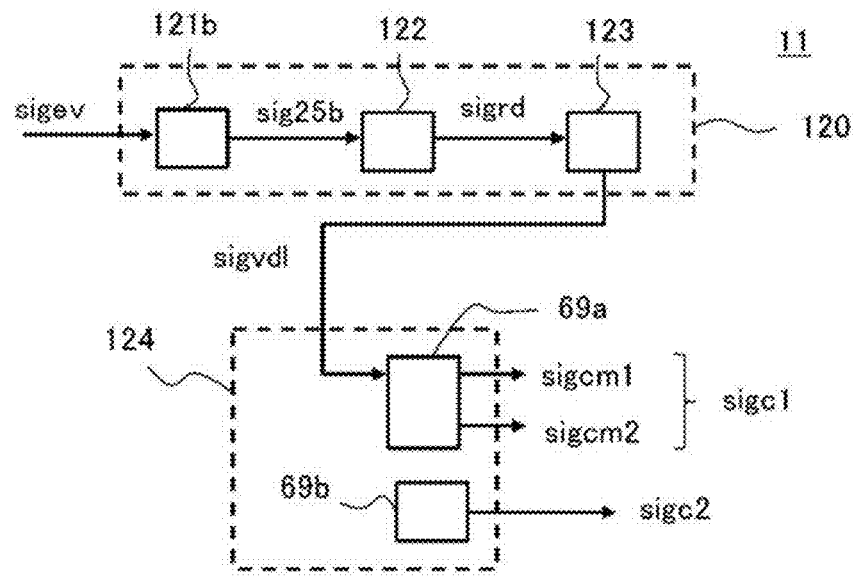
FIG. 91 shows the configuration of a control device in a motor control device according to embodiment 14.
Figure 92:
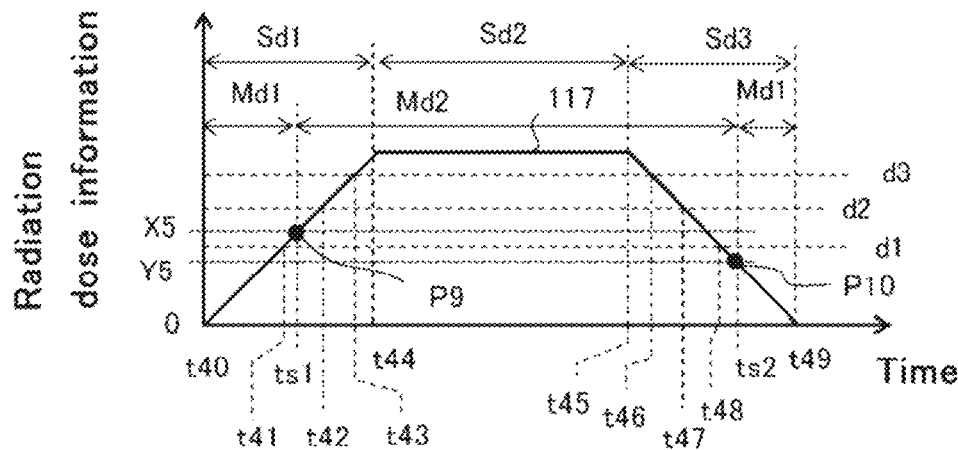
FIG. 92 shows timings of radiation dose information for explaining operation of the motor control device according to embodiment 14.
Figure 93:
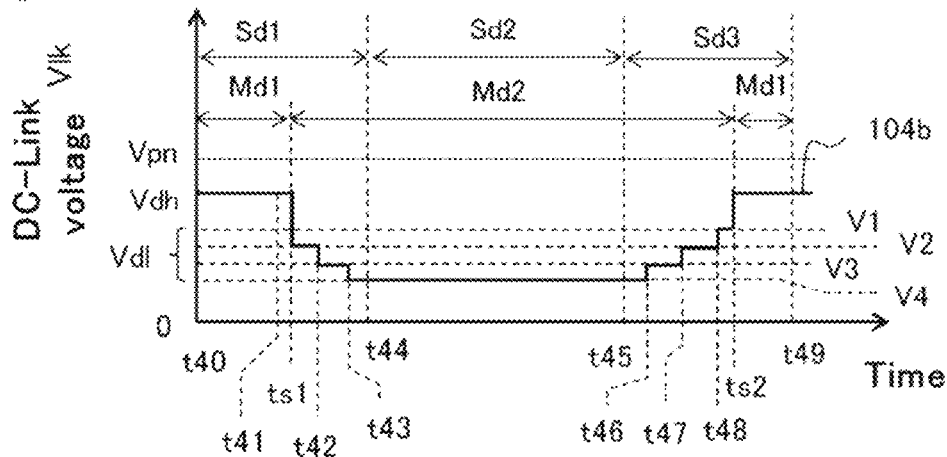
FIG. 93 shows timings of DC-link voltage in a first example for explaining operation of the motor control device according to embodiment 14.
Figure 94:
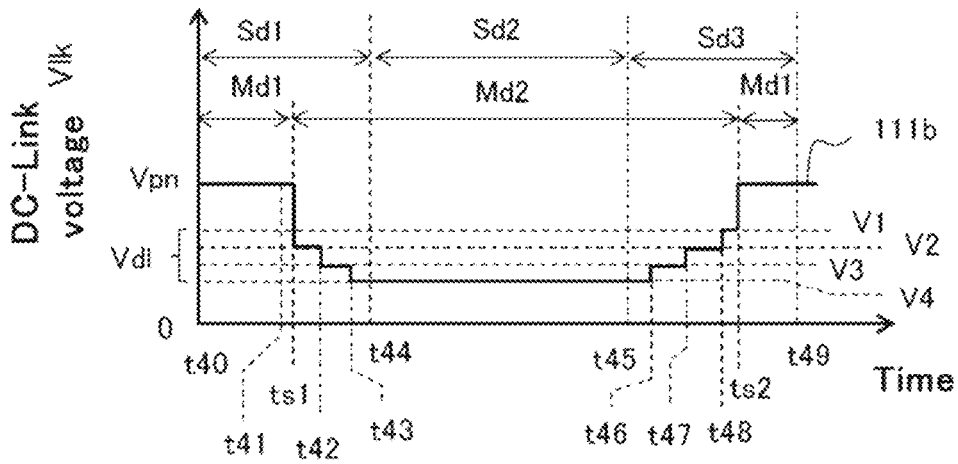
FIG. 94 shows timings of DC-link voltage in a second example for explaining operation of the motor control device according to embodiment 14.
Figure 95:
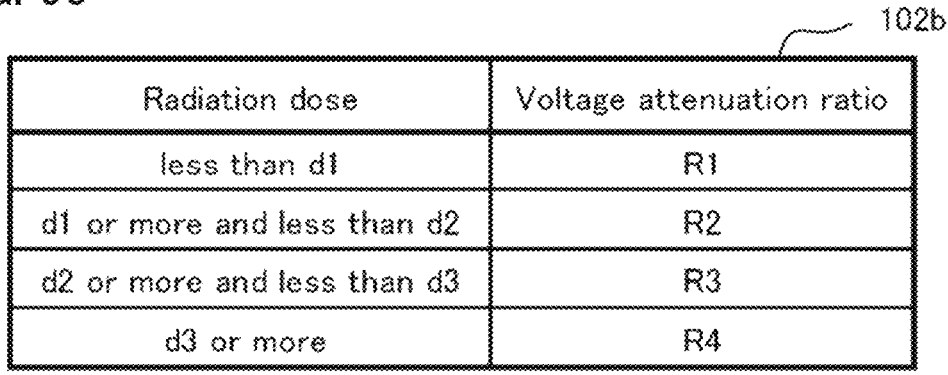
FIG. 95 shows a data map of a voltage attenuation ratio according to embodiment 14.
Figure 96:
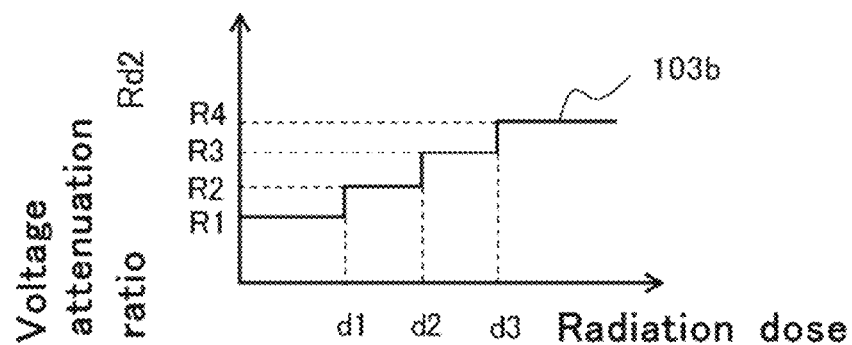
FIG. 96 shows voltage attenuation ratio characteristics according to embodiment 14.
Figure 97:
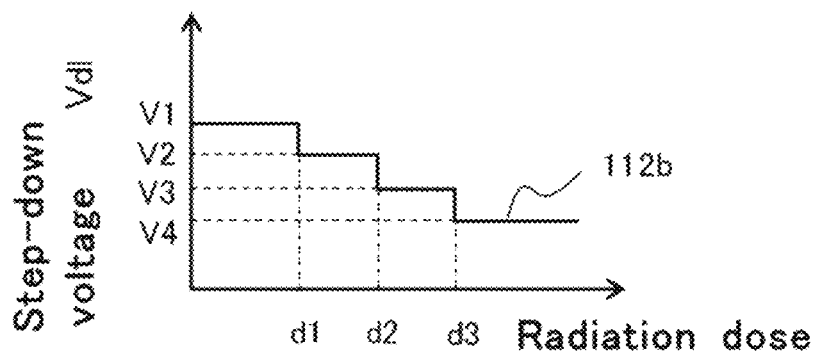
FIG. 97 shows step-down voltage characteristics according to embodiment 14.

FIG. 91 shows the configuration of a control device in a motor control device according to embodiment 14. FIG. 92 shows timings of radiation dose information for explaining operation of the motor control device according to embodiment 14. FIG. 93 shows timings of the DC-link voltage in a first example for explaining operation of the motor control device according to embodiment 14, and FIG. 94 shows timings of the DC-link voltage in a second example for explaining operation of the motor control device according to embodiment 14. FIG. 95 shows a data map of a voltage attenuation ratio according to embodiment 14. FIG. 96 shows voltage attenuation ratio characteristics according to embodiment 14, and FIG. 97 shows step-down voltage characteristics according to embodiment 14. The motor control device 100 of embodiment 14 is different from the motor control device 100 of embodiment 13 in that the set value of the second voltage for the second operation mode is changed using radiation information. Differences from the motor control device 100 of embodiment 13 will be mainly described.

The amount of cosmic rays reaching the Earth is influenced by a shielding effect of a magnetic field of the Sun, and it is said that, when solar activity is weakened, cosmic rays become more likely to reach and the cosmic ray exposure amount tends to increase. The set value of the step-down voltage Vdl which is the second voltage is determined on the basis of, for example, a detected value or an estimated value of the radiation dose in the space where the motor control device 100 is located, i.e., a detected value or an estimated value of radiation dose information of the flying object 101. The set value of the step-down voltage Vdl which is the second voltage is determined using a preset reference voltage value for the second voltage and a function or a data map that defines a voltage attenuation ratio Rd2 with respect to the detected value or the estimated value of the radiation dose information, by multiplying the reference voltage value for the second voltage and the voltage attenuation ratio Rd2. The reference voltage value for the second voltage may be a design value designed on the basis of the value of radiation dose on a date and a time set for reference designing at zero meters above sea level. An example in which the voltage attenuation ratio Rd2 has four values R1, R2, R3, R4 will be described. FIG. 95 and FIG. 96 respectively show examples of a data map 102b of the voltage attenuation ratio Rd2 and voltage attenuation ratio characteristics 103b represented by a function of the voltage attenuation ratio Rd2. FIG. 97 shows step-down voltage characteristics 112b calculated using the data map 102b or the voltage attenuation ratio characteristics 103b of the voltage attenuation ratio Rd2. The data map 102b indicates the relationship between the radiation dose and the value of the voltage attenuation ratio Rd2. In FIG. 96 and FIG. 97, the horizontal axes indicate the radiation dose. In FIG. 96, the vertical axis indicates the voltage attenuation ratio Rd2, and in FIG. 97, the vertical axis indicates the step-down voltage Vdl. The radiation dose in FIG. 95 to FIG. 97 is a detected value or an estimated value of radiation dose information outside or inside the flying object 101. The detected value of the radiation dose information is detected by the radiation sensor 24. The estimated value of the radiation dose information is estimated on the basis of information detected by, for example, the altitude sensor 21 or the environmental information detection sensor 35 other than the radiation sensor 24.

According to the data map 102b shown in FIG. 95, when the radiation dose is less than d1, the value of the voltage attenuation ratio Rd2 is R1; when the radiation dose is d1 or more and less than d2, the value of the voltage attenuation ratio Rd2 is R2; when the radiation dose is d2 or more and less than d3, the value of the voltage attenuation ratio Rd2 is R3; and when the radiation dose is d3 or more, the value of the voltage attenuation ratio Rd2 is R4. Where the reference voltage value for the second voltage is denoted by Vr, the step-down voltage Vdl is represented by Expression (2).

$$Vdl = Rd2 \times Vr \qquad (2)$$

When the value of the voltage attenuation ratio Rd2, i.e., the voltage attenuation ratio value is R1, R2, R3, R4, the value of the step-down voltage Vdl, i.e., the step-down voltage value is V1, V2, V3, V4, respectively. The magnitude relationship of the values R1 to R4 of the voltage attenuation ratio Rd2 is R1<R2<R3<R4, and the magnitude relationship of the values V1 to V4 of the step-down voltage Vdl is V1>V2>V3>V4.

A change method for the set value of the second voltage in embodiment 14 is executed by the control device 11. As shown in FIG. 91, the control device 11 of embodiment 14 includes the second voltage determination unit 120 and the control signal generation unit 124. The control device 11 of embodiment 14 is different from the control device 11 of embodiment 13 in that the altitude calculation unit 121a of the second voltage determination unit 120 is replaced with a radiation dose calculation unit 121b, and the radiation dose calculation unit 121b outputs a radiation dose signal sig25b. The control signal generation unit 124 corresponds to each of the control signal generation units 68a, 68b, 68c in embodiments 1 to 11. In FIG. 91, only the first signal generation unit 69a and the second signal generation unit 69b are shown, while the operation mode judgment unit 60 and the like in each embodiment are not shown. The second voltage determination unit 120 includes the radiation dose calculation unit 121b, the voltage attenuation ratio generation unit 122, and the step-down voltage generation unit 123. The radiation dose calculation unit 121b calculates a radiation dose value on the basis of the environmental detected information sigev, and outputs the radiation dose signal sig25b indicating the radiation dose value. The voltage attenuation ratio generation unit 122 has the data map 102b or the voltage attenuation ratio characteristics 103b. On the basis of the radiation dose value d1, d2, d3, etc. indicated by the radiation dose signal sig25b, the voltage attenuation ratio generation unit 122 outputs the voltage attenuation ratio signal sigrd indicating the voltage attenuation ratio value of the voltage attenuation ratio Rd2, using the data map 102b or the voltage attenuation ratio characteristics 103b. The step-down voltage generation unit 123 calculates the step-down voltage Vdl using Expression (2) from the voltage attenuation ratio value R1, R2, R3, R4, etc. indicated by the voltage attenuation ratio signal sigrd, and the reference voltage value Vr, and outputs the step-down voltage signal sigvdl indicating the step-down voltage value. When generating the second mode control signal sigcm2, the first signal generation unit 69*a* in the control signal generation unit 124 outputs the second mode control signal sigcm2 with a timing different in accordance with the step-down voltage value V1, V2, V3, V4, etc. indicated by the step-down voltage signal sigvdl.

In response to the second mode control signal sigcm2 with a timing corresponding to the step-down voltage value V1, the chopper 3 undergoes control of the semiconductor switching elements Q1 to Q4 or the semiconductor switching elements Q5, Q6, to output the step-down voltage Vdl having the step-down voltage value V1. Similarly, in response to the second mode control signal sigcm2 with a timing corresponding to the step-down voltage value V2, V3, V4, etc., the chopper 3 undergoes control of the semiconductor switching elements Q1 to Q4 or the semiconductor switching elements Q5, Q6, to output the step-down voltage Vdl having the step-down voltage value V2, V3, V4, etc.

It is assumed that the flight altitude of the aircraft which is the flying object 101 provided with the motor control device 100 changes as in flight altitude characteristics 115 shown in FIG. 84. In the case where the aircraft provided with the motor control device 100 flies as shown in FIG. 84, characteristics of radiation dose information calculated from the environmental detected information sigev outputted from the environmental information detection sensor 35 are as shown in radiation dose information characteristics 117 in FIG. 92, and the DC-link voltage Vlk of the chopper 3 changes as in DC-link voltage characteristics 104*b* shown in FIG. 93 or DC-link voltage characteristics 111*b* shown in FIG. 94. In FIG. 92, the horizontal axis indicates time, and the vertical axis indicates the radiation dose information. In FIG. 93 and FIG. 94, the horizontal axes indicate time, and the vertical axes indicate the DC-link voltage Vlk. The radiation dose information characteristics 117 correspond to the detected radiation dose information characteristics 56*j* described in embodiment 5 or estimated radiation dose information characteristics. The radiation dose values d1, d2, d3 are radiation dose values respectively corresponding to the altitude values h1, h2, h3.

In the first flight state Sd1, when the radiation dose information indicates a value higher than the threshold X5, the control device 11 in the motor control device 100 of embodiment 14 changes the operation mode to the second operation mode Md2, i.e., the low voltage mode, to start low voltage operation of the chopper 3, thus reducing the DC-link voltage Vlk from the step-down voltage Vdh or the distribution network voltage Vpn which is the first voltage to the step-down voltage Vdl which is the second voltage. When the radiation dose information becomes higher than the threshold X5 at time ts1, the DC-link voltage Vlk changes from the step-down voltage Vdh or the distribution network voltage Vpn which is the first voltage to the step-down voltage Vdl which is the second voltage, at time ts1. The control device 11 keeps the low voltage operation of the chopper 3 in the second flight state Sd2 from time t44 to time t45. During operation in the second operation mode Md2, i.e., the low voltage mode, if, in the third flight state Sd3, the radiation dose information indicates a value lower than the threshold Y5, the control device 11 changes the operation mode to the first operation mode Md1, i.e., the high voltage mode, to start high voltage operation of the chopper 3, thus increasing the DC-link voltage Vlk to the step-down voltage Vdh or the distribution network voltage Vpn which is the first voltage. When the radiation dose information becomes lower than the threshold Y5 at time ts2, the DC-link voltage Vlk changes from the step-down voltage Vdl which is the second voltage to the step-down voltage Vdh or the distribution network voltage Vpn which is the first voltage, at time ts2. In embodiment 14, the threshold X5 is higher than the threshold Y5. A point where the radiation dose information in the radiation dose information characteristics 117 in the first flight state Sd1 becomes the threshold X5 is a mode change point P9, and a point where the radiation dose information in the radiation dose information characteristics 117 in the third flight state Sd3 becomes the threshold Y5 is a mode change point P10.

The values of the step-down voltage Vdl which is the second voltage, i.e., the step-down voltage values V1, V2, V3, V4 will be described. The relationship between the thresholds X5 and Y5 and the values of the radiation dose, i.e., the radiation dose values, is as follows. The threshold X5 is more than the radiation dose value d1 and less than the radiation dose value d2, and the threshold Y5 is less than the radiation dose value d1. At time ts1, the step-down voltage Vdl becomes the step-down voltage value V2. Since the threshold X5 is the radiation dose value d1 or more and less than the radiation dose value d2, the voltage attenuation ratio Rd2 becomes the voltage attenuation ratio value R2 on the basis of the data map 102*b* or the voltage attenuation ratio characteristics 103*b*. Therefore, at time ts1, the step-down voltage Vdl becomes the step-down voltage value V2 in accordance with the step-down voltage characteristics 112*b*. When the radiation dose information becomes the radiation dose value d2 at time t42, the voltage attenuation ratio Rd2 becomes the voltage attenuation ratio value R3 on the basis of the data map 102*b* or the voltage attenuation ratio characteristics 103*b*. Therefore, at time t42, the step-down voltage Vdl becomes the step-down voltage value V3 in accordance with the step-down voltage characteristics 112*b*. When the radiation dose information becomes the radiation dose value d3 at time t43, the voltage attenuation ratio Rd2 becomes the voltage attenuation ratio value R4 on the basis of the data map 102*b* or the voltage attenuation ratio characteristics 103*b*. Therefore, at time t43, the step-down voltage Vdl becomes the step-down voltage value V4 in accordance with the step-down voltage characteristics 112*b*.

In the second flight state Sd2 from time t44 to time t45, the radiation dose information is the radiation dose value d3 or more. Therefore, the step-down voltage Vdl remains the step-down voltage value V4 in accordance with the step-down voltage characteristics 112*b*. At time t45, the aircraft starts to descend. Then, at time t46, when the radiation dose information passes through the radiation dose value d3 so as to be less than the radiation dose value d3, the voltage attenuation ratio Rd2 becomes the voltage attenuation ratio value R3 on the basis of the data map 102*b* or the voltage attenuation ratio characteristics 103*b*. Therefore, at time t46, the step-down voltage Vdl becomes the step-down voltage value V3 in accordance with the step-down voltage characteristics 112*b*. At time t47, when the radiation dose information passes through the radiation dose value d2 so as to be less than the radiation dose value d2, the voltage attenuation ratio Rd2 becomes the voltage attenuation ratio value R2 on the basis of the data map 102*b* or the voltage attenuation ratio characteristics 103*b*. Therefore, at time t47, the step-down voltage Vdl becomes the step-down voltage value V2 in accordance with the step-down voltage characteristics 112*b*. At time t48, when the radiation dose information passes through the radiation dose value d1 so as to be less than the radiation dose value d1, the voltage attenuation ratio Rd2 becomes the voltage attenuation ratio value R1 on the basis of the data map 102b or the voltage attenuation ratio characteristics 103b. Therefore, at time t48, the step-down voltage Vdl becomes the step-down voltage value V1 in accordance with the step-down voltage characteristics 112b. At time ts2, when the radiation dose information becomes lower than the threshold Y5, the DC-link voltage Vlk changes from the step-down voltage Vdl which is the second voltage having the step-down voltage value V1 to the step-down voltage Vdh or the distribution network voltage Vpn which is the first voltage.

The motor control device 100 of embodiment 14 is the same as the motor control device 100 of embodiment 13 except that the set value of the second voltage in the second operation mode is changed on the basis of the radiation dose information which is the flight information. Therefore, the same effects as in the motor control device 100 of embodiment 13 are provided. In the motor control device 100 of embodiment 14, during operation at a high altitude which occupies a most period in operation of the flying object 101, voltages applied to the semiconductor elements composing the inverter 5, i.e., the semiconductor switching elements Q7 to Q12, can be reduced. Thus, the failure rate due to a single event that occurs on the semiconductor elements composing the inverter 5 is reduced, and electric discharge in devices of the motor control device 100 can be suppressed, so that reliability of the motor 6 and the motor control device 100 including the inverter 5 is improved. In addition, in the motor control device 100 of embodiment 14, the set value of the second voltage in the second operation mode need not be set in advance and therefore it is unnecessary to adjust the set value of the second voltage when mounting the motor control device 100. In the motor control device 100 of embodiment 14, also when the cosmic rays increase due to the state of solar activity, the second voltage can be reduced in accordance with increase in the cosmic rays. Therefore, with the motor control device 100 of embodiment 14, reliability of the motor 6 and the motor control device 100 including the inverter 5 is more improved than in the motor control device 100 of embodiment 13.

As described above, the motor control device 100 of embodiment 14 controls the motor 6 of the flying object 101 that takes off from the ground and flies. The motor control device 100 includes the step-down device 90 which receives DC power supplied from the DC distribution network 1 as input power and outputs DC power having voltage equal to or smaller than the distribution network voltage Vpn of the DC distribution network 1, the power supply device (inverter 5) which converts the DC power to AC power and outputs the AC power to the motor 6, and the control device 11 for controlling the step-down device 90 and the power supply device (inverter 5). The step-down device 90 includes the DC-output power conversion device (chopper 3) which converts the input power to DC power having voltage equal to or smaller than the distribution network voltage Vpn of the DC distribution network 1, and the output capacitor (capacitor 4) for smoothing the output voltage (DC-link voltage Vlk) of the DC-output power conversion device (chopper 3). The DC-output power conversion device (chopper 3) has the first operation mode Md1 for outputting the first voltage (step-down voltage Vdh or distribution network voltage Vpn) and the second operation mode Md2 for outputting the second voltage (step-down voltage Vdl) lower than the first voltage (step-down voltage Vdh or distribution network voltage Vpn). The control device 11 includes the second voltage determination unit 120 which determines the voltage value (step-down voltage value V1, V2, V3, V4) of the second voltage (step-down voltage Vdl) on the basis of the detected value or the estimated value (radiation dose value d1, d2, d3) of the radiation dose of radiation showering to the flying object 101, and when controlling the DC-output power conversion device (chopper 3) in the second operation mode Md2, the control device 11 outputs the control signal sigc1 in accordance with the voltage value (step-down voltage value V1, V2, V3, V4) of the second voltage (step-down voltage Vdl) determined by the second voltage determination unit 120, to the DC-output power conversion device (chopper 3). When the flying object 101 takes off from the ground, the control device 11 controls the DC-output power conversion device (chopper 3) in the first operation mode Md1, and when the control device 11 judges that flight information which is one or both of information of a motor parameter (motor parameter command detected information sigmpc, motor parameter detected information sigmp, motor parameter estimated information sigmpe) obtained along with control for the motor 6 and information of an environmental factor (environmental detected information sigev) relevant to the flight altitude of the flying object 101, satisfies a predetermined condition, or when the control device 11 has received the operation mode signal msig for which the second operation mode Md2 is selected on the basis of the flight information during control for the motor 6, the control device 11 controls the DC-output power conversion device (chopper 3) in the second operation mode Md2. With this configuration, in the motor control device 100 of embodiment 14, while the DC-output power conversion device (chopper 3) is controlled in the first operation mode Md1, when the flight information is judged to satisfy a predetermined condition, or when the operation mode signal msig for which the second operation mode Md2 is selected is received during control for the motor 6, the DC-output power conversion device (chopper 3) is controlled in the second operation mode Md2. Thus, even in a case of operating at a high altitude where the cosmic ray dose is high, reliability of the motor control device is improved.

The semiconductor switching elements Q1 to Q12 may be silicon semiconductor elements made from silicon, or wide bandgap semiconductor elements made from a wide bandgap semiconductor material having a greater bandgap than silicon. Examples of the wide bandgap semiconductor material include silicon carbide (SiC), a gallium nitride based material including gallium nitride (GaN), and diamond. In a case where the semiconductor switching elements Q1 to Q12 are semiconductor elements made from a wide bandgap semiconductor material, i.e., wide bandgap semiconductor elements, the switching speed is faster and switching loss is smaller than in a case of silicon semiconductor elements. Further, the wide bandgap semiconductor elements are higher in withstand voltage and heat resistance than the silicon semiconductor elements. Therefore, in the case where the semiconductor switching elements Q1 to Q12 are wide bandgap semiconductor elements, a heatsink or the like serving as a cooler for the semiconductor switching elements Q1 to Q12 can be downsized or such a heatsink or the like may be unnecessary.

In the above examples, one or a plurality of kinds among altitude information of the flying object, outside air pressure information outside the flying object, air component concentration information outside the flying object, outside air temperature information outside the flying object, and radiation dose information of radiation showering to the flying object, are used as information of an environmental factor.

However, information of an environmental factor is not limited thereto. Information of an environmental factor may be complex information generated from some of the above kinds of information. For example, complex information 1 which is complex information generated from the altitude information and the radiation dose information whose characteristics have an upward convex shape is information obtained by summing these kinds of information that are weighted. Weighting coefficients for the altitude information, the outside air pressure information, the air component concentration information, the outside air temperature information, and the radiation dose information are defined as k1, k2, k3, k4, and k5, respectively. The characteristics of the complex information 1 can be represented as characteristics in which the detected altitude information characteristics 56a multiplied by k1 and the detected radiation dose information characteristics 56j multiplied by k5 are summed. Complex information 2 which is complex information generated from the outside air pressure information, the air component concentration information, and the outside air temperature information whose characteristics have a downward convex shape is information obtained by summing these kinds of information that are weighted. The characteristics of the complex information 2 can be represented as characteristics in which the detected outside air pressure information characteristics 56d multiplied by k2, the detected air component concentration information characteristics 56e multiplied by k3, and the detected outside air temperature information characteristics 56i multiplied by k4 are summed. In a case of generating complex information from information of an environmental factor whose characteristics have an upward convex shape and information of an environmental factor whose characteristics have a downward convex shape, increase and decrease of the information value may be inverted to match one of these two shapes to another one so that the shapes of these characteristics are uniformed, and then the respective kinds of information may be weighted and summed, whereby complex information having an upward convex shape or a downward convex shape can be generated.

In the above description, as the motor parameter command which is an example of information of a motor parameter, one or a plurality of kinds among the motor speed command, the motor output command, the motor AC voltage command, the motor current command, and the motor torque command are used. However, the present disclosure is not limited thereto. The motor parameter command may be complex information generated from some of the above kinds of information. In the above description, as the motor parameter detected information which is an example of information of a motor parameter, one or a plurality of kinds among the detected motor speed information, the detected motor output information, the detected motor AC voltage information, the detected motor current information, and the detected motor torque information are used. However, the present disclosure is not limited thereto. The motor parameter detected information may be complex information generated from some of the above kinds of information. In the above description, as the estimated information of a motor parameter which is an example of information of a motor parameter, one or a plurality of kinds among the estimated motor speed information, the estimated motor output information, and the estimated motor torque information are used. However, the present disclosure is not limited thereto. The estimated information of a motor parameter may be complex information generated from some of the above kinds of information. Further, complex information of information of motor parameters may be complex information generated from a motor parameter command for the motor, motor parameter detected information of the motor, and motor parameter estimated information of the motor. Such complex information of information of motor parameters can be generated in the same manner as the complex information of information of environmental factors.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF REFERENCE CHARACTERS

1 DC distribution network
3 chopper (DC-output power conversion device)
4 capacitor (output capacitor)
5 inverter (power supply device)
6 motor
8 reactor
11 control device
19 outside air temperature sensor
20 outside air pressure sensor
21 altitude sensor
22 air component concentration sensor
23 operating panel
24 radiation sensor
34 display
35 environmental information detection sensor
36a altitude indication
36b motor output indication
36c outside air pressure indication
36d air component concentration indication
36e outside air temperature indication
36f radiation dose indication
36g motor speed indication
36h motor AC voltage indication
36i motor current indication
36j motor torque indication
36k judgment result indication
361 priority information indication
37 selection switch
38 motor parameter sensor
41p high-potential-side input terminal
41s low-potential-side input terminal
42p high-potential-side output terminal
42s low-potential-side output terminal
51 permission switch
52, 53 motor
55a oxygen concentration sensor
55b nitrogen concentration sensor
55c carbon dioxide concentration sensor
64 observer
70 motor parameter command sensor
71a motor speed command sensor 71b motor output command sensor
71c motor AC voltage command sensor
71d motor current command sensor
71e motor torque command sensor
73a motor speed sensor
73b motor output sensor
73c motor AC voltage sensor
73d motor current sensor
73e motor torque sensor
80 inverter (power supply device)
90 step-down device
91 driving device
100 motor control device
101 flying object
102a, 102b data map
103a, 103b voltage attenuation ratio characteristics (function)
120 second voltage determination unit
121a altitude calculation unit
121b radiation dose calculation unit
d1, d2, d3 radiation dose value
dataA, dataB, dataC detected value
dataS motor parameter information value
ensig change permission signal
esig1 estimated altitude information
fa switching frequency
fb switching frequency
fs switching frequency
h1, h2, h3 altitude value
m connection point
Md1 first operation mode
Md2 second operation mode
msig operation mode signal
R1, R2, R3, R4 voltage attenuation ratio value
Rd1, Rd2 voltage attenuation ratio
sig8 detected information
sig9 detected information
sig10 detected information
sig11 detected information
sig12 detected information
sig13a, sig13b, sig13c detected information
sig19a, sig19b, sig19c, sig19d, sig19e detected information
sig20a, sig20b, sig20c, sig20d, sig20e detected information
sig21a, sig21b, sig21c estimated information
sig25a altitude signal
sig25b radiation dose signal
sigc1 control signal
sigev environmental detected information
sigmp motor parameter detected information
sigmpc motor parameter command detected information
sigmpe motor parameter estimated information
Q1, Q2, Q3, Q4 semiconductor switching element
Q5, Q6, Q7, Q8 semiconductor switching element
Q9, Q10, Q11, Q12 semiconductor switching element
V1, V2, V3, V4 step-down voltage value
Vlk DC-link voltage (output voltage)
Vdl step-down voltage (second voltage)
Vdh step-down voltage (first voltage)
Vpn distribution network voltage
Vr reference voltage value
X, X*, XA, XB, XC threshold
Y, Y*, YA, YB, YC threshold
Z, Za, Zb, Zc threshold
Za1 Za2, Za3, Za4, Za5 threshold
Zb1, Zb2, Zb3, Zb4, Zb5 threshold
Zc1, Zc2, Zc3 threshold
W, Wa, Wb, Wc threshold
Wa1, Wa2, Wa3, Wa4, Wa5 threshold
Wb1, Wb2, Wb3, Wb4, Wb5 threshold
Wc1, Wc2, Wc3 threshold

The invention claimed is:

1. A motor control device for controlling a motor of a flying object that takes off from a ground and flies, the motor control device comprising:
a step-down device which receives DC power supplied from a DC distribution network as input power and outputs DC power having voltage equal to or smaller than distribution network voltage of the DC distribution network;
a power supply device which converts the DC power to AC power and outputs the AC power to the motor; and
a control device for controlling the step-down device and the power supply device, wherein
the step-down device includes a DC-output power conversion device which converts the input power to DC power having voltage equal to or smaller than the distribution network voltage of the DC distribution network, and an output capacitor for smoothing output voltage of the DC-output power conversion device,
the DC-output power conversion device has a first operation mode for outputting first voltage and a second operation mode for outputting second voltage lower than the first voltage,
when the flying object takes off from the ground, the control device controls the DC-output power conversion device in the first operation mode, and
when the control device judges that flight information which is one or both of information of a motor parameter obtained along with control for the motor and information of an environmental factor relevant to a flight altitude of the flying object satisfies a predetermined condition, or when the control device has received an operation mode signal for which the second operation mode is selected on the basis of the flight information during control for the motor, the control device controls the DC-output power conversion device in the second operation mode.

2. The motor control device according to claim 1, further comprising an environmental information detection sensor for detecting the information of the environmental factor, wherein
the flight information is the information of the environmental factor,
in a state in which the DC-output power conversion device is controlled in the first operation mode, when the control device judges that an information value based on the information of the environmental factor has passed through a first environmental threshold, the control device controls the DC-output power conversion device in the second operation mode, and
in a state in which the DC-output power conversion device is controlled in the second operation mode, when the control device judges that the information value based on the information of the environmental factor has passed through a second environmental threshold, the control device controls the DC-output power conversion device in the first operation mode.

3. The motor control device according to claim 2, wherein the environmental information detection sensor is any of an altitude sensor for detecting altitude information of the flying object, an outside air pressure sensor for detecting outside air pressure information outside the flying object, an air component concentration sensor for detecting air component concentration information outside the flying object, an outside air temperature sensor for detecting outside air temperature information outside the flying object, or a radiation sensor for detecting radiation dose information of radiation showering to the flying object, and the information of the environmental factor is estimated altitude information obtained by estimating an altitude from any of the outside air pressure information, the air component concentration information, the outside air temperature information, or the radiation dose information detected by the environmental information detection sensor, or is the altitude information detected by the altitude sensor.

4. The motor control device according to claim 2, wherein the information of the environmental factor is any of altitude information of the flying object, outside air pressure information outside the flying object, air component concentration information outside the flying object, outside air temperature information outside the flying object, or radiation dose information of radiation showering to the flying object, or complex information generated from a plurality of these kinds of information.

5. The motor control device according to claim 1, wherein the flight information is the information of the motor parameter, in a state in which the DC-output power conversion device is controlled in the first operation mode, when the control device judges that an information value based on the information of the motor parameter is smaller than a first parameter threshold, the control device controls the DC-output power conversion device in the second operation mode, and in a state in which the DC-output power conversion device is controlled in the second operation mode, when the control device judges that the information value based on the information of the motor parameter is greater than a second parameter threshold greater than the first parameter threshold, the control device controls the DC-output power conversion device in the first operation mode.

6. The motor control device according to claim 5, wherein the information of the motor parameter is a motor parameter command for the motor, the control device includes a motor parameter command sensor for detecting the motor parameter command, the motor parameter command is any of a motor speed command, a motor output command, a motor AC voltage command, a motor current command, or a motor torque command, or complex information generated from a plurality of these kinds of information, and the first parameter threshold is a first parameter command threshold, and the second parameter threshold is a second parameter command threshold.

7. The motor control device according to claim 5, wherein the information of the motor parameter is motor parameter detected information of the motor, the motor control device further comprises a motor parameter sensor for detecting the motor parameter detected information, the motor parameter detected information is any of detected motor speed information, detected motor output information, detected motor AC voltage information, detected motor current information, or detected motor torque information, or complex information generated from a plurality of these kinds of information, and the first parameter threshold is a first parameter detection threshold, and the second parameter threshold is a second parameter detection threshold.

8. The motor control device according to claim 5, wherein the information of the motor parameter is motor parameter estimated information of the motor, the control device includes an observer for outputting the motor parameter estimated information, the motor parameter estimated information is any of estimated motor speed information, estimated motor output information, or estimated motor torque information, or complex information generated from a plurality of these kinds of information, and the first parameter threshold is a first parameter estimation threshold, and the second parameter threshold is a second parameter estimation threshold.

9. The motor control device according to claim 1, further comprising an environmental information detection sensor for detecting the information of the environmental factor, wherein the flight information is the information of the motor parameter and the information of the environmental factor, in a state in which the DC-output power conversion device is controlled in the first operation mode, when the control device judges that an information value based on the information of the environmental factor has passed through a first environmental threshold, the control device determines a judgment result as environmental second operation mode judgment, and when the control device judges that the information value based on the information of the environmental factor has not passed through the first environmental threshold, the control device determines a judgment result as environmental first operation mode judgment, in a state in which the DC-output power conversion device is controlled in the second operation mode, when the control device judges that the information value based on the information of the environmental factor has passed through a second environmental threshold, the control device determines a judgment result as the environmental first operation mode judgment, and when the control device judges that the information value based on the information of the environmental factor has not passed through the second environmental threshold, the control device determines a judgment result as the environmental second operation mode judgment, when the judgment result based on the information of the environmental factor is the environmental first operation mode judgment and the control device judges that an information value based on the information of the motor parameter is smaller than a first parameter threshold, the control device controls the DC-output power conversion device in the second operation mode, and when the judgment result based on the information of the environmental factor is the environmental second operation mode judgment and the control device judges that the information value based on the information of the motor parameter is greater than a second parameter threshold greater than the first parameter threshold, the control device controls the DC-output power conversion device in the first operation mode.

10. The motor control device according to claim 1, further comprising an environmental information detection sensor for detecting the information of the environmental factor, wherein the flight information is the information of the motor parameter and the information of the environmental factor, in a state in which the DC-output power conversion device is controlled in the first operation mode, when the control device judges that an information value based on the information of the motor parameter is smaller than a first parameter threshold, the control device determines a judgment result as internal second operation mode judgment, and when the control device judges that the information value based on the information of the motor parameter is not smaller than the first parameter threshold, the control device determines a judgment result as internal first operation mode judgment, in a state in which the DC-output power conversion device is controlled in the second operation mode, when the control device judges that the information value based on the information of the motor parameter is greater than a second parameter threshold greater than the first parameter threshold, the control device determines a judgment result as the internal first operation mode judgment, and when the control device judges that the information value based on the information of the motor parameter is not greater than the second parameter threshold, the control device determines a judgment result as the internal second operation mode judgment, when the judgment result based on the information of the motor parameter is the internal first operation mode judgment, the control device controls the DC-output power conversion device in the first operation mode, when the judgment result based on the information of the motor parameter is the internal second operation mode judgment, and in a state in which the DC-output power conversion device is controlled in the first operation mode, the control device judges that an information value based on the information of the environmental factor has passed through a first environmental threshold, the control device controls the DC-output power conversion device in the second operation mode, and when the judgment result based on the information of the motor parameter is the internal second operation mode judgment, and in a state in which the DC-output power conversion device is controlled in the second operation mode, the control device judges that the information value based on the information of the environmental factor has passed through a second environmental threshold, the control device controls the DC-output power conversion device in the first operation mode.

11. The motor control device according to claim 1, wherein on the basis of a plurality of kinds of the flight information for which priorities are set, when a first condition is satisfied, the control device controls the DC-output power conversion device in the second operation mode, and when the first condition is not satisfied, the control device controls the DC-output power conversion device in the first operation mode, and when a second condition is satisfied, the control device controls the DC-output power conversion device in the first operation mode, and when the second condition is not satisfied, the control device controls the DC-output power conversion device in the second operation mode, the first condition is that, in a state in which the DC-output power conversion device is controlled in the first operation mode, whether or not each information value based on the flight information has passed through a first flight information threshold is judged in accordance with the priority, and the information value based on the flight information corresponding to a selected priority has passed through the first flight information threshold, and the second condition is that, in a state in which the DC-output power conversion device is controlled in the second operation mode, whether or not each information value based on the flight information has passed through a second flight information threshold is judged in accordance with the priority, and the information values based on all kinds of the flight information for which the priorities are set have passed through the respective second flight information thresholds.

12. The motor control device according to claim 1, further comprising an operating panel connected to the control device, wherein the operating panel includes either a first switch for permitting change of the DC-output power conversion device to the second operation mode or a second switch for selecting the first operation mode or the second operation mode, when a change permission signal outputted from the first switch indicates permission, the control device uses both of the first operation mode and the second operation mode for control of the DC-output power conversion device, and when the second switch selects the first operation mode, the control device controls the DC-output power conversion device in the first operation mode, and when the second switch selects the second operation mode, the control device controls the DC-output power conversion device in the second operation mode.

13. The motor control device according to claim 1, wherein the second voltage is 0.25 times or more and 0.75 times or less of the first voltage.

14. The motor control device according to claim 1, wherein the DC-output power conversion device is a chopper, the first voltage is the distribution network voltage of the DC distribution network, the chopper includes, between a high-potential-side input terminal, and a low-potential-side input terminal and a low-potential-side output terminal, one high-potential-side semiconductor switching element or a plurality of high-potential-side semiconductor switching elements connected in series, and one low-potential-side semiconductor switching element or a plurality of low-potential-side semiconductor switching elements connected in series, the chopper includes a reactor between a high-potential-side output terminal and a connection point between the one or plurality of high-potential-side semiconductor switching elements and the one or plurality of low-potential-side semiconductor switching elements, and in the first operation mode, the one or plurality of high-potential-side semiconductor switching elements are controlled to be on and the one or plurality of low-potential-side semiconductor switching elements are controlled to be off.

15. The motor control device according to claim 1, wherein
- the control device includes a second voltage determination circuitry for determining a voltage value of the second voltage on the basis of a detected value or an estimated value of the flight altitude of the flying object, or on the basis of a detected value or an estimated value of a radiation dose of radiation showering to the flying object, and
- when controlling the DC-output power conversion device in the second operation mode, the control device outputs a control signal in accordance with the voltage value of the second voltage determined by the second voltage determination circuitry, to the DC-output power conversion device.

* * * * *